US012303807B2

(12) United States Patent
Luthe et al.

(10) Patent No.: US 12,303,807 B2
(45) Date of Patent: May 20, 2025

(54) PARTICLE FILTER WITH ULTRASOUND DEVICE

(71) Applicant: SMART MATERIAL PRINTING B.V., Enschede (NL)

(72) Inventors: Gregor Luthe, Gronau (DE); Silke Schaefers, Neuenkirchen (DE); Niels Ten Thije, Enschede (NL)

(73) Assignee: SMART MATERIAL PRINTING B.V., Enschede (NL)

( * ) Notice: Subject to any disclaimer, the term of this patent is extended or adjusted under 35 U.S.C. 154(b) by 652 days.

(21) Appl. No.: 17/285,895

(22) PCT Filed: Oct. 14, 2019

(86) PCT No.: PCT/EP2019/000293
§ 371 (c)(1),
(2) Date: Apr. 15, 2021

(87) PCT Pub. No.: WO2020/078577
PCT Pub. Date: Apr. 23, 2020

(65) Prior Publication Data
US 2021/0341370 A1    Nov. 4, 2021

(30) Foreign Application Priority Data
Oct. 18, 2018    (DE) .......................... 102018008259.9

(51) Int. Cl.
 *B01D 21/28*    (2006.01)
 *B01D 49/00*    (2006.01)
 (Continued)

(52) U.S. Cl.
 CPC ......... *B01D 21/283* (2013.01); *B01D 49/006* (2013.01); *B01D 51/08* (2013.01); *G01N 15/0618* (2013.01)

(58) Field of Classification Search
 CPC . B01D 21/283; B01D 49/006; G01N 15/0618
 See application file for complete search history.

(56) References Cited

U.S. PATENT DOCUMENTS 4,108,759 A    8/1978  Young
4,307,964 A    12/1981 Dudgeon et al.
(Continued)

FOREIGN PATENT DOCUMENTS

CA    2097070    5/1992
CN    1334755    2/2002
(Continued)

OTHER PUBLICATIONS

Epo translation of WO 2017/154804 (Year: 2017).*
(Continued)

*Primary Examiner* — Stephen Hobson
(74) *Attorney, Agent, or Firm* — Weiss & Arons LLP

(57) ABSTRACT

Filter installations for suspended matter in flowing fluids, including filtration methods, uses and equipment and plants with filter installations. A device reducing the specific particle count of suspended matter by means of an energy input using ultrasound waves stabilized with electronic feedback loops and their harmonics in the fluids or in objects attached thereto. A flow pipe having a wall, which, on its outer side, its inner side, and/or in the wall has pairs of mutually opposite exciters of longitudinal waves and their harmonics, and/or reflectors, opposite the exciters of the flow pipe to a filter, which keeps the specific particle counts of the suspended matter in the filtered fluids to below the detectable limit.

4 Claims, 30 Drawing Sheets

(51) Int. Cl.
  *B01D 51/08* (2006.01)
  *G01N 15/06* (2006.01)

(56) References Cited

U.S. PATENT DOCUMENTS

| | | | |
|---|---|---|---|
| 4,759,775 A | 7/1988 | Peterson et al. | |
| 4,893,886 A * | 1/1990 | Ashkin | G01N 15/10 |
| | | | 359/350 |
| 5,225,089 A | 7/1993 | Benes et al. | |
| 5,527,460 A * | 6/1996 | Trampler | B01J 19/10 |
| | | | 210/198.1 |
| 5,769,913 A * | 6/1998 | Gallego Juarez | B01J 19/10 |
| | | | 96/389 |
| 5,827,350 A | 10/1998 | Magill et al. | |
| 5,902,487 A | 5/1999 | Pickering et al. | |
| 5,902,489 A | 5/1999 | Yasuda et al. | |
| 5,902,849 A | 5/1999 | Heucher et al. | |
| 6,224,652 B1 | 5/2001 | Caperan et al. | |
| 6,322,614 B1 | 11/2001 | Tillmans | |
| 6,447,574 B1 | 9/2002 | Frier, Jr. et al. | |
| 7,493,816 B1 * | 2/2009 | Petrovic | G08B 17/10 |
| | | | 340/630 |
| 7,674,620 B2 | 3/2010 | Totey et al. | |
| 7,674,630 B2 * | 3/2010 | Siversson | B01D 21/283 |
| | | | 436/177 |
| 8,454,716 B2 | 6/2013 | Sedillo | |
| 9,079,127 B2 * | 7/2015 | Chen | B01D 43/00 |
| 2002/0194988 A1 | 12/2002 | Betting et al. | |
| 2003/0200864 A1 * | 10/2003 | Meegan, Jr. | B01D 51/08 |
| | | | 96/389 |
| 2004/0226437 A1 | 11/2004 | Stenersen et al. | |
| 2006/0037915 A1 * | 2/2006 | Strand | B01D 49/006 |
| | | | 210/748.05 |
| 2006/0037916 A1 * | 2/2006 | Trampler | B01D 43/00 |
| | | | 422/128 |
| 2008/0181828 A1 | 7/2008 | Kluck | |
| 2009/0283480 A1 | 11/2009 | Schadler et al. | |
| 2011/0171090 A1 | 7/2011 | Johnson et al. | |
| 2012/0267288 A1 * | 10/2012 | Chen | B01D 21/283 |
| | | | 209/143 |
| 2012/0325727 A1 * | 12/2012 | Dionne | C02F 1/36 |
| | | | 209/155 |
| 2013/0277316 A1 * | 10/2013 | Dutra | B01D 21/283 |
| | | | 210/194 |
| 2014/0033808 A1 * | 2/2014 | Ding | C12M 47/04 |
| | | | 73/61.75 |
| 2015/0111277 A1 * | 4/2015 | Hamman | A61M 1/3693 |
| | | | 422/534 |
| 2015/0265961 A1 | 9/2015 | Davey et al. | |
| 2016/0008532 A1 * | 1/2016 | Fiering | A61M 1/3693 |
| | | | 210/666 |
| 2016/0030660 A1 * | 2/2016 | Sun | A61M 1/3687 |
| | | | 210/748.05 |
| 2016/0059206 A1 | 3/2016 | Chen et al. | |
| 2016/0287778 A1 * | 10/2016 | Leach | B01D 21/283 |
| 2016/0339360 A1 * | 11/2016 | Lipkens | B01D 17/0202 |
| 2016/0363579 A1 * | 12/2016 | Gilmanshin | B01L 3/502715 |
| 2017/0175509 A1 * | 6/2017 | Abdel-Fattah | C02F 1/36 |
| 2017/0191022 A1 * | 7/2017 | Lipkens | C12M 29/02 |
| 2017/0321208 A1 * | 11/2017 | Lipkens | C12N 1/02 |
| 2018/0201629 A1 * | 7/2018 | Rubio Martinez | B01J 20/226 |
| 2018/0346348 A1 | 12/2018 | Collins et al. | |
| 2019/0060811 A1 | 2/2019 | Reuben | |
| 2019/0070528 A1 * | 3/2019 | Luthe | B01D 43/00 |
| 2020/0009286 A1 | 1/2020 | Zarcone et al. | |
| 2021/0341370 A1 | 11/2021 | Luthe et al. | |
| 2022/0220005 A1 * | 7/2022 | Lindqvist | G01J 1/429 |

FOREIGN PATENT DOCUMENTS

| | | | | |
|---|---|---|---|---|
| CN | 1334897 | | 2/2002 | |
| CN | 1982781 | | 6/2007 | |
| CN | 102183033 | | 9/2011 | |
| CN | 104363996 | | 2/2015 | |
| CN | 204619662 | | 9/2015 | |
| CN | 205669422 | U | 11/2016 | |
| CN | 108093625 | | 5/2018 | |
| CN | 108368737 | | 8/2018 | |
| DE | 19513603 | | 10/1996 | |
| DE | 19846115 | A1 | 4/2000 | |
| DE | 69705226 | | 9/2001 | |
| DE | 69628389 | | 4/2004 | |
| DE | 102009036948 | | 2/2011 | |
| DE | 102016002599 | A1 * | 9/2017 | B01D 21/283 |
| EP | 0923410 | | 6/2001 | |
| EP | 0773055 | | 5/2003 | |
| EP | 3916315 | | 12/2021 | |
| FR | 3058644 | | 5/2018 | |
| GB | 460795 | | 2/1937 | |
| JP | S59154151 A | | 9/1984 | |
| JP | 07047259 | | 2/1995 | |
| JP | H09122480 | | 5/1997 | |
| JP | 2004042044 | | 2/2004 | |
| JP | 2004261761 A * | | 9/2004 | |
| JP | 2014151260 A * | | 8/2014 | |
| JP | 2018-134612 | | 8/2018 | |
| KR | 101442486 | | 9/2014 | |
| RU | 2740899 | | 1/2021 | |
| WO | 92/09354 A1 | | 6/1992 | |
| WO | 2011/152796 A1 | | 12/2011 | |
| WO | WO-2013087247 A1 * | | 6/2013 | B01D 49/006 |
| WO | WO-2017132694 A1 * | | 8/2017 | B01D 17/04 |
| WO | WO-2017153038 A2 * | | 9/2017 | B01D 21/283 |
| WO | WO-2017154804 A1 * | | 9/2017 | B01D 51/08 |
| WO | WO2020/078577 | | 4/2020 | |
| WO | WO2020/164792 | | 8/2020 | |

OTHER PUBLICATIONS

Larzelere "New and Novel Technologies in Particulate Filtration" Naval Surface Warfare Center, Dahlgren Division published 2006 (Year: 2006).*
"HEPA" Wikipedia published Sep. 19, 2015 accessed at <https://en.wikipedia.org/w/index.php?title=HEPA&oldid=681842084> (Year: 2015).*
Epo translation of DE102016002599 (Year: 2017).*
International Search Report for International Application No. PCT/EP2019/000293 filed on Oct. 14, 2019 on behalf of Smart Material Printing B.V. Mail Date: Jan. 22, 2020. 6 pages (English + Original).
Lee, K. W., et al., "On the Minimum Efficiency and the Most Penetrating Particle Size for Fibrous Filters" Journal of the Air Pollution Control Association, vol. 30, No. 4, Apr. 1980, pp. 377-381.
Oberdörster, G., et al., "Nanotoxicology, An Emerging Discipline Evolving from the Studies of Ultrafine Particles", Environmental Health Perspectives, vol. 113 (7), Jul. 2005, 823-839.
Oberdörster, G., et al., "Toxicology of nanoparticles: A historical perspective", Nanotoxicology, Mar. 2007, 1 (1): 2-25.
State Intellectual Property Office of People's Republic of China, Office Action in Chinese Patent Application No. 201780027747.8, Jul. 18, 2022 (uncertified English language translation attached).
European Patent Office, Examination Report in European Patent Application No. 19797980.0, Jul. 18, 2022 (uncertified and machine generated English language translation attached).
United States Patent and Trademark Office, Office Action in U.S. Appl. No. 16/082,521, Jul. 11, 2022.
Australian Government—IP Australia, Examination Report No. 1 in Australia Patent Application No. 2017229176, Nov. 30, 2021.
State Intellectual Property Office of People's Republic of China, First Office Action in Chinese Patent Application No. 201980081404.9, Mar. 25, 2022 (uncertified English language translation).
State Intellectual Property Office of People's Republic of China, First Office Action in Chinese Patent Application No. 201780027747.8, Aug. 19, 2020 (uncertified English language translation).

(56) References Cited

OTHER PUBLICATIONS

State Intellectual Property Office of People's Republic of China, Second Office Action in Chinese Patent Application No. 201780027747.8, May 10, 2021 (uncertified English language translation).
State Intellectual Property Office of People's Republic of China, Third Office Action in Chinese Patent Application No. 201780027747.8, Sep. 29, 2021 (uncertified English language translation).
State Intellectual Property Office of People's Republic of China, Fourth Office Action in Chinese Patent Application No. 201780027747.8, Feb. 21, 2022 (uncertified English language translation).
Korean Intellectual Property Office, Office Action in Korean Application No. 10-2018-7028414, Oct. 28, 2021 (uncertified English language translation).
Japan Patent Office, Office Action in Japanese Patent Application No. 2018-547927, Feb. 17, 2021 (uncertified English language translation).
Japan Patent Office, Office Action in Japanese Patent Application No. 2018-547927, Jul. 13, 2021 (uncertified English language translation).
Sergey Kapishnikov, et al, "Continuous particle size separation and size sorting using ultrasound in microchannel," Journal of Statistical Mechanics: Theory and Experiment, vol. 2006, Issue 01, p. 01012, IOP Publishing Ltd, https://doi.org/10.1088/1742-5468/2006/01/P01012, Jan. 2006.
Vladimir N. Khmelev et al., "The Limits of Fine Particle Ultrasonic Coagulation," Symmetry 2021, 13, 1607, https://doi.org/10.3390/sym13091607, MDPI (https://www.mdpi.com/journal/symmetry), Sep. 1, 2021.
Hou et al., "Possibilities of Using Ultrasonic Resonators in the Purification of Nuclear Aerosol Particles," Proceedings of the 24th International Conference on Nuclear Engineering, ICONE24. American Society of Mechanical Engineers, 2016.
United States Patent and Trademark Office, Office Action in U.S. Appl. No. 17/678,291, May 5, 2022.
German Patent and Trade Mark Office, Office Action for German Patent Application No. 102016002599.9, Nov. 15, 2016 (German language original and partial uncertified English translation).
German Patent and Trade Mark Office, Office Action for German Patent Application No. 102016002600.6, Dec. 2, 2016 (German language original and partial uncertified English translation).
European Patent Office (as International Searching Authority), Written Opinion for International Application No. PCT/EP2005/000285, Sep. 25, 2017 (German language original and uncertified English translation).
Brazil Patent and Trademark Office, Office Action for Brazilian Patent Application No. BR112018067809-0, May 6, 2021 (Portuguese language original and partial uncertified English translation).
United States Patent and Trademark Office, Office Action in U.S. Appl. No. 16/082,521, Sep. 21, 2021.
Eurasian Patent Office, Office Action in Eurasian Patent Application No. 202191015, Jan. 28, 2022 (uncertified English language translation).
Eurasian Patent Office, Office Action in Eurasian Patent Application No. 20189196031, Jan. 29, 2020 (uncertified English language translation).
Eurasian Patent Office, Office Action in Eurasian Patent Application No. 20189196031, May 29, 2020 (uncertified English language translation).
Eurasian Patent Office, Office Action in Eurasian Patent Application No. 20189196031, May 12, 2021 (uncertified English language translation).
Eurasian Patent Office, Office Action in Eurasian Patent Application No. 20189196031, Dec. 23, 2021 (uncertified English language translation).
European Patent Office (as International Searching Authority), International Search Report for International Application No. PCT/EP2017/000285, Sep. 25, 2017 (German language original and uncertified English translation).
International Preliminary Report on Patentability in Application No. PCT/EP2017/000285, Sep. 11, 2018 (English translation and German language original).
International Preliminary Report on Patentability in Application No. PCT/EP2019/000293, Apr. 14, 2021 (English translation).
International Search Report and Written Opinion in International Application No. PCT/CA2023/051011, Oct. 10, 2023.

\* cited by examiner

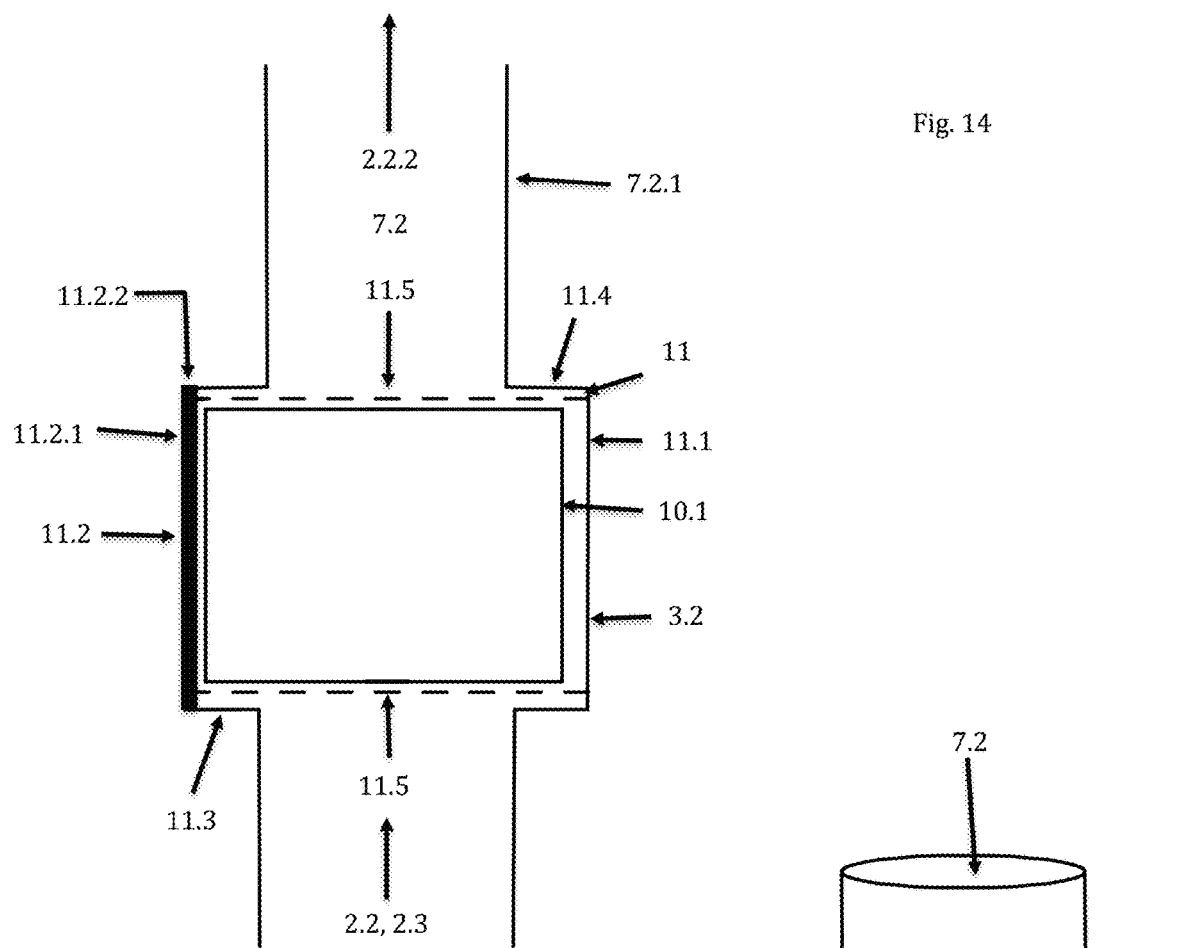
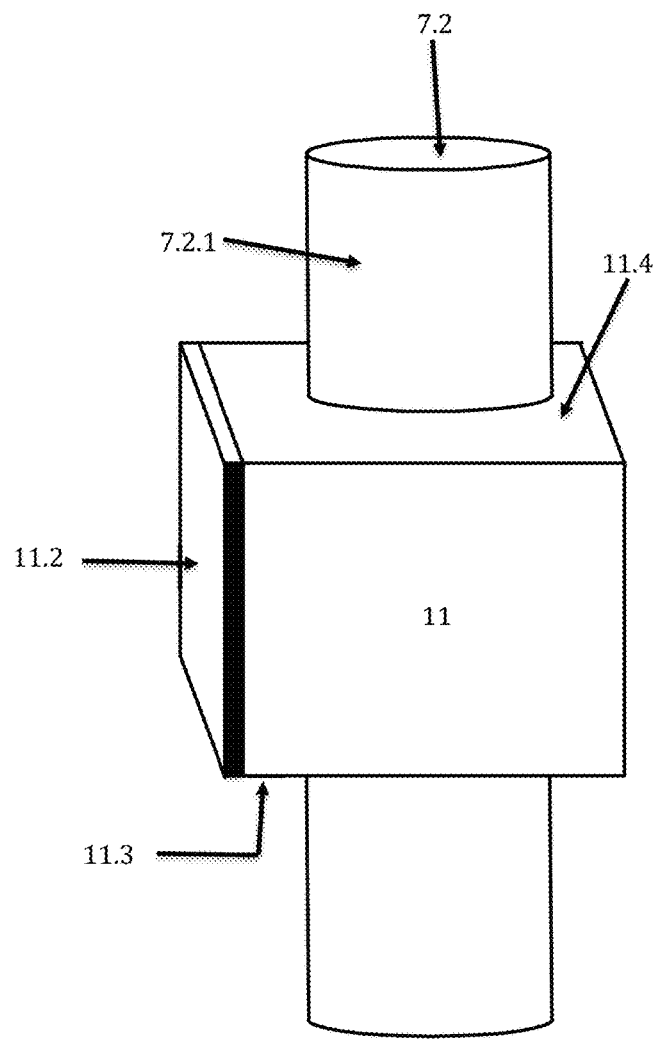
Fig. 14
Fig. 15

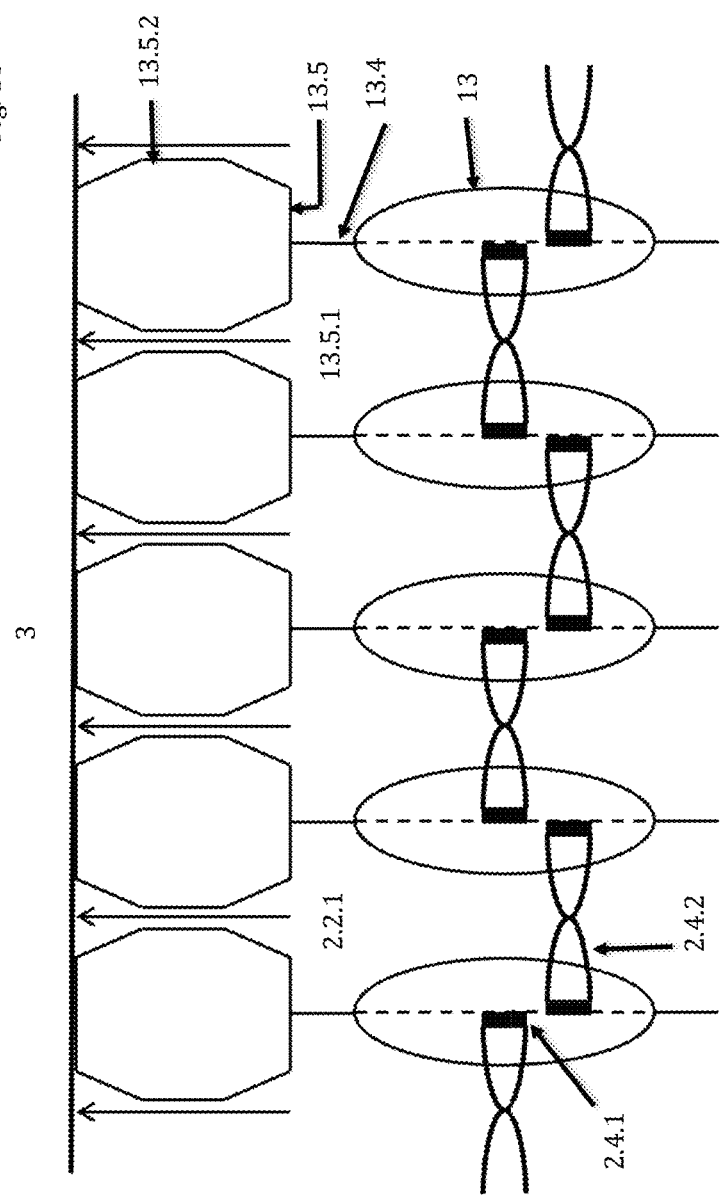
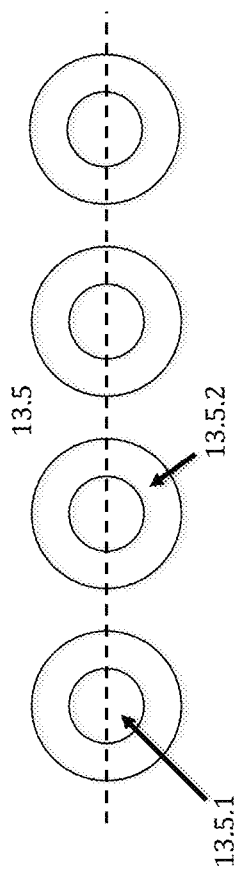
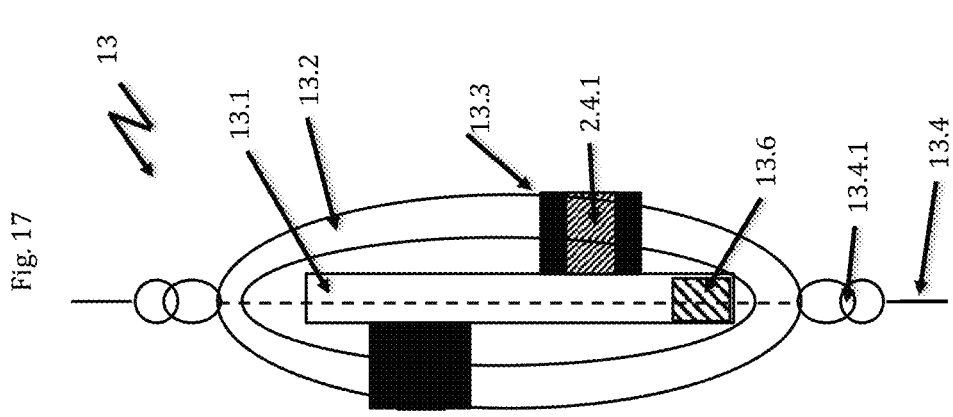

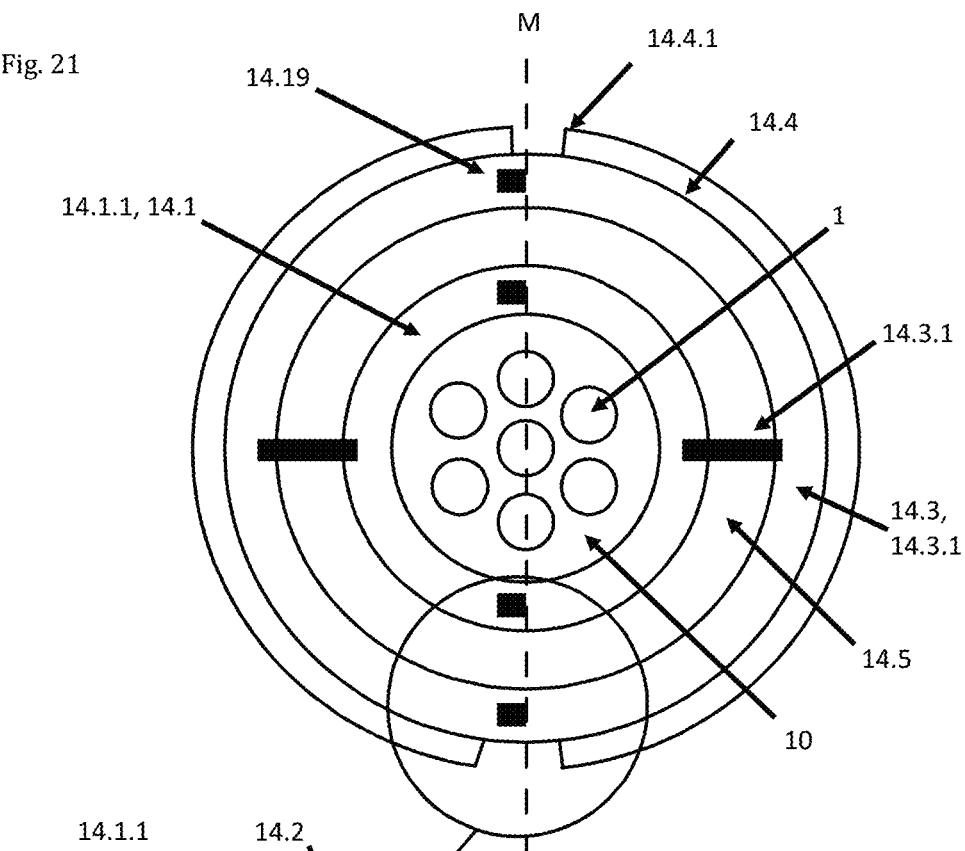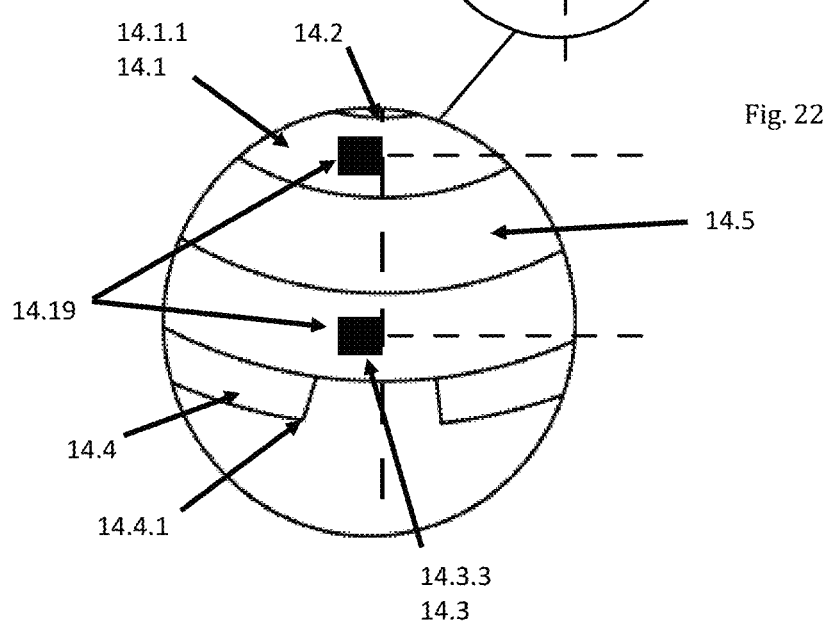

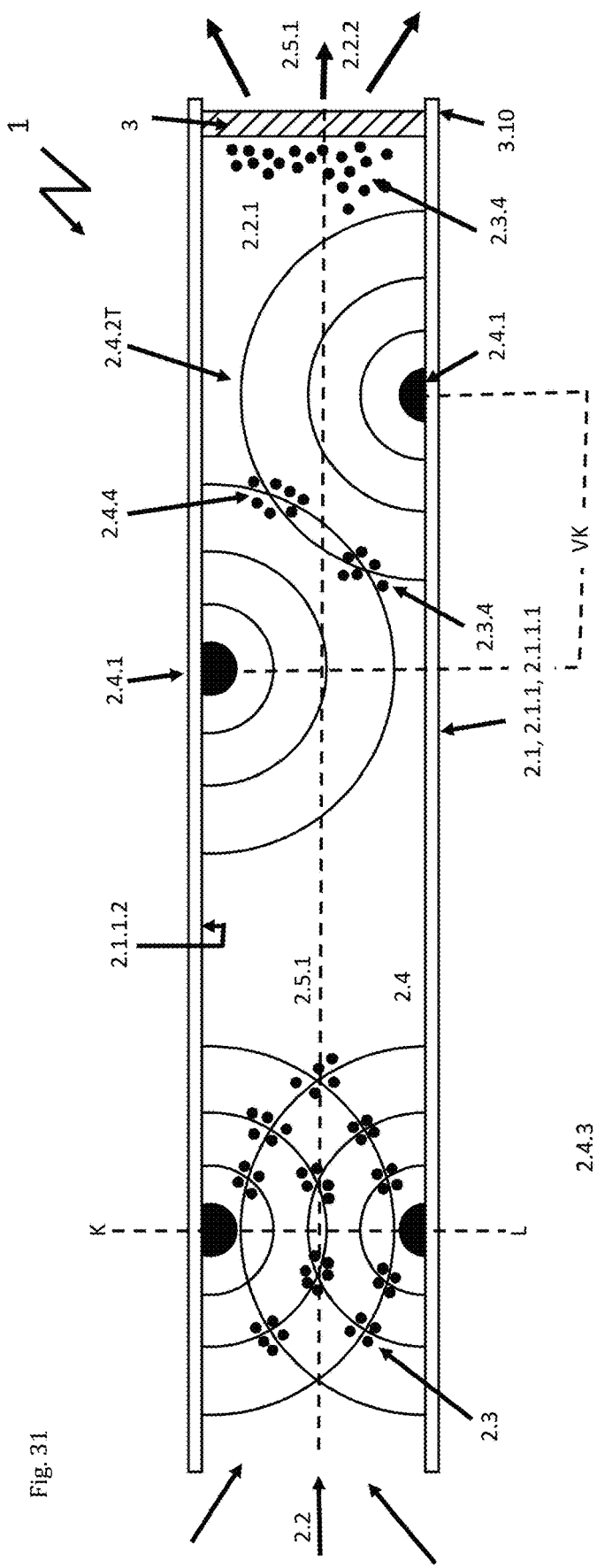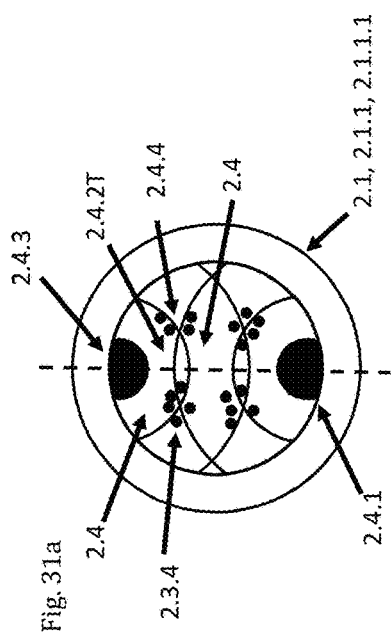
Fig. 31
Fig. 31a

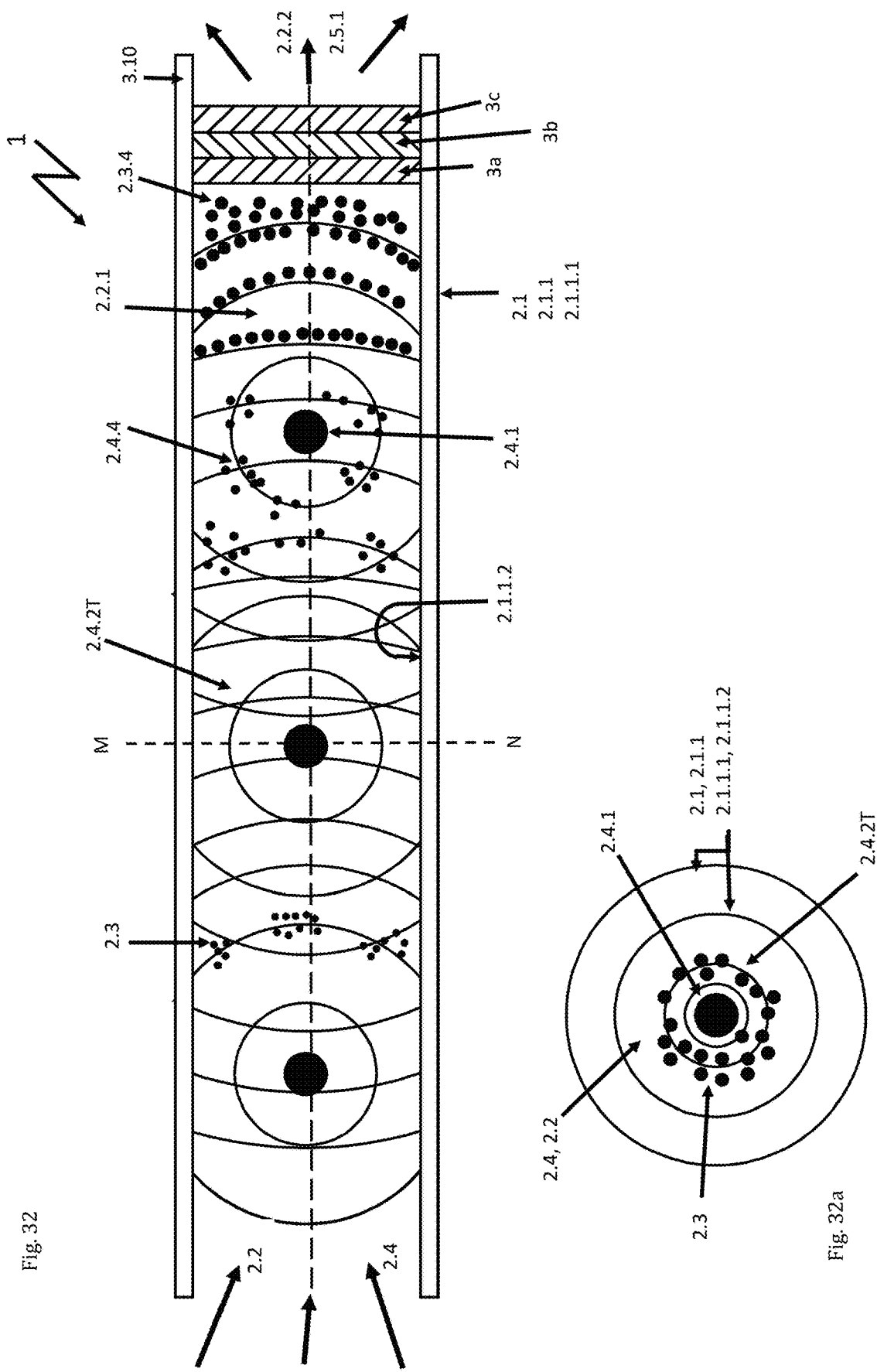

PARTICLE FILTER WITH ULTRASOUND DEVICE

CROSS-REFERENCE TO RELATED APPLICATIONS

The present application is the U.S. National Stage of International Patent Application No. PCT/EP2019/000293 filed on Oct. 14, 2019 which, in turn, claims priority to German Patent Application No. 10 2018 008 259.9 filed on Oct. 18, 2018.

The present invention relates to filter systems for suspended matter with particle sizes from 400 pm to ≤500 µm and for noxae.

The present invention also relates to filtration methods for removing suspended matter with particle sizes of from 400 pm to ≤500 µm and noxae from gaseous, liquid and gel-like fluids.

Furthermore, the present invention relates to the use of the said filter system and the filtration method for the removal of environmentally harmful, unhealthy, and/or toxic suspended matter with particle sizes from 400 pm to ≤500 µm from the fluids in a wide variety of technological fields.

Last but not least, the present invention relates to equipment and systems that contain said filter systems.

STATE-OF-THE-ART

Filters for suspended matter are filters for separating particulate matter from the air. They belong to the depth filters and separate suspended matter particles with an aerodynamic diameter smaller than 1 µm. They are used, to filter out bacteria and viruses, mite eggs and mite excretions, dusts, aerosols, smoke particles, fine dust or ultra-fine dust.

According to their separation efficiency they can be categorized as,

High-performance particle filter (EPA=Efficient Particulate Air Filter), smallest filterable particle size: 100 nm,
Suspended matter filters (HEPA=High-Efficiency Particulate Air Filter), smallest filterable particle size: 100 nm,
High-performance suspended particulate matter filter (ULPA=Ultralow Penetration Air Filter), smallest filterable particle size: 50 nm,
Medium filter, smallest filterable particle size: 300 nm:
Pre-filter, smallest filterable particle size: 1000 nm, and
Automobile cabin filters, smallest filterable particle size: 500 nm.

Therefore, there are no filters available for the range from 1 nm to 50 nm.

Depending on the particle size, the filter effect is based on the following effects:

Diffusion effect: Very small particles (particle size 50 nm to 100 nm) do not follow the gas flow but rather have a trajectory similar to Brownian motion due to their collisions with the gas molecules and thus collide with the filter fibers, to which they adhere. This effect is also referred to as the diffusion regime.

Blocking effect: Smaller particles (particle size 100 nm to 500 nm) that follow the gas flow around the fiber stick to it when they come too close to the filter phase. This effect is also known as the interception regime.

Inertia effect: Larger particles (particle size 500 nm to >1 µm do not follow the gas flow around the fiber, but collide with it due to the inertia and stick to it. This effect is also known as the inertial impact regime.

In the particle size range from 100 nm to 500 nm, the diffusion effect and the blocking effect to occur together. In the particle size range of 500 nm to >1 µm, the inertia effect and the blocking effect also occur together.

According to the filtration effects, particles with the particle size of 200 nm to 400 nm are the most difficult to separate. They are also designated as MMPS=most penetrating particle size. The filter efficiency drops to 50% in this size range. Larger and smaller particles separate better due to their physical properties. EPA, HEPA and UPLA are classified according to their efficiency for these grain sizes using a test aerosol made from di-2-ethylhexyl sebacate (DENS). K. W. Lee and B. Y. H. Liu give formulas in their article "On the Minimum Efficiency and the Most Penetrating Particle Size for Fibrous Filters" in the Journal of the Air Pollution Control Association, Volume 30, No. 4, Apr. 9, 1980, Pages 377 to 381, which formulas make it possible to calculate the minimum efficiency and MMPS for fiber filters due to the diffusion effect and the inertia effect. The results showed that MMPS decreases with increasing filtration speed and with increasing fiber volume fraction and increases with increasing fiber size.

However, the fact that there are no filters for nanoparticles with an average particle size $d_{50}$ of 1 nm to <50 nm available is also particularly critical. It is precisely these particles that are easily deposited in the bronchi and alveoli and generally have the highest mortality and toxicity. Therefore, they can cause diseases such as asthma, bronchitis, arteriosclerosis, arrhythmia, dermatitis, autoimmune diseases, cancer, Crohn's disease or organic failure.

This is particularly critical since the depth filters or the suspended particle filters are used in medical areas such as operating rooms, intensive care units and laboratories, as well as in clean rooms, in nuclear technology and air washers.

Another problematic technology in this regard are electrostatic precipitators for electrical gas cleaning, electrical dust filters or electrostats, which are based on the separation of particles from gases using the electrostatic principle. The separation in the electrostatic precipitator can take place in five separate steps:

1. Release of electrical charges, mostly electrons,
2. Charging of the dust particles in the electrical field or ionizer,
3. Transport of the charged dust particles to the collecting electrode,
4. The adhesion of the dust particles to the collecting electrode, and
5. Removal of the dust layer from the collecting electrode.

However, it is not possible to completely separate particles in the nanometer range, so that there is a risk of contamination with respirable particles in the vicinity of such systems.

These electric dust filters are often used in exhaust gas treatment. Amines, carbon dioxide, ammonia, HCl, hydrogen sulfide and other toxic gases are thereby removed from the exhaust gas flow with the help of membranes. Since the electric dust filters cannot completely remove the finest particles, they damage the membranes and lower their separation efficiency.

For details on toxicology, reference is made to the review articles by Günter Oberdörster, Eva Oberdörster and Jan Oberdörster, "Nanotoxicology, An Emerging Discipline Evolving from the Studies of Ultrafine Particles", in Environmental Health Perspectives, Volume 113 (7), 2005, 823-839 and Gunter Oberdörster, Vicki Stone and Ken Donaldson, "Toxicology of nanoparticles: A historical perspective", Nanotoxicology, March 2007; 1 (1): 2-25.

An aggregation device for separating and/or cleaning aerosols and solid particles and fibers from gases and solid particles and fibers from liquid materials by means of acoustophoresis is known from the international patent application WO 2017/153038 A2, comprising
(I) a conveying means selected from the group consisting of a conveyor belt, a liquid pressure, a liquid column and a liquid wave of the liquid material, sound waves modulated in the conveying direction, a centrifugal force, a centripetal force, a Coriolis force, gravitation, an injector, a Venturi, a diffusor, a liquid multiplier, a gas multiplier, a Dyson, a jacket turbine, a delta wing concentrator, a ring Venturi, a Magnus effect turbine, a Berwian or Berlin wind power plant, a passive and an active convection, effusion and diffusion, for receiving and/or conveying an aerosol and/or off the liquid materials in a conveying direction into the aggregating device,
(II) at least one exciter for generating an acoustic soundwave, which is intended to act on the aerosol and/or the liquid materials, and
(III) a means for separating a first material part containing condensed liquids and/or aggregated solids from the aerosol and/or from the liquid materials,
and their use for carrying out acoustiophoretic methods. An air filter, in particular, a HEPA, is connected upstream and/or downstream of the aggregating device.

The known aggregating device has a high separation rate, but there is still the risk that the separation rate or the filtration efficiency will be significantly reduced if a particularly large number of suspended matter or suspended particles with MMPS are present in the gas. No measures are disclosed as to how these MMPS particles can be filtered efficiently, i.e. to more than 99%. In addition, no measures are disclosed as to how particles with particle sizes in the range from 1 nm to 50 nm can be filtered, since these are not intercepted by ULPA or by EPA and HEPA.

A method and a device for the removal of molecules and dirt particles are known from the American patent U.S. Pat. No. 5,769,913, in which method and device a polluted gas flow is passed through shock waves containing moisture, whereby dirt particles and molecules are changed or grown, and can thus be separated from the gas flow. The patent also points out that the electrostatic precipitators are largely ineffective in separating particles of a particle size <2 to 3 µm.

An acoustic chamber having a cross-section of 0.5×0.5 m and a length of 2 m is known from the American patent U.S. Pat. No. 5,769,913, in which aerosol streams of 1000 to 2000 m³/hour flow through four plate shaped exciters with a diameter of 48 cm transmitting radiation of an energy of 300 W/exciter. The exciters are arranged in groups, along the chamber walls or alternately. Without assigned reflectors, the effective acoustic energy is about half of the emitted energy in the order of magnitude of 150. W/exciter. This means that the total energy acting on the aerosol stream is 600 W. The power level inside the chamber is greater than 160 dB. In this way, an enlargement by one order of magnitude to 1 to 10 µm is reached with frequencies of 20 kHz with aerosols with particles of 0.2 to 2 µm and concentrations 0.1 to 4 g/m³. This enlargement is crucial for the filterability through electrostatic filters since these are only effective for particle sizes >5 µm.

A device for the absorption of particles in a gas flow is known from the German patent application DE 198 46 115 A1, which comprises a resonance tube arranged in the flow field of the gas flow with a sound source for generating a standing pressure wave. The standing pressure wave intercepts the particles from the gas flow that is passed through, after which they are discharged through devices for removing the particles.

An acoustic chamber for the treatment of exhaust gases is known from the international patent application WO 92/09354. The exhaust gases flow along the chamber axis in a straight line through the chamber, in which they are exposed to an acoustic field. The chamber has a regular polygonal cross-section with 2k sides in which there are k sound sources. The axes of the sound sources include an angle of 180°/k when projected onto a cross-sectional area. The sound sources are assigned to a respective side wall. The emitted sound waves are therefore reflected several times from the walls of the chamber before they hit an inclined reflector at the end of the chamber. This creates standing waves with different frequencies that intercept the fine particles in the exhaust gas flow. The variable k is 2 or 3. Frequencies <25 kHz are used.

OBJECT OF THE INVENTION

The present invention was therefore based on the object of proposing filter systems, with which suspended matter with an average particle size $d_{50}$ of 400 pm to 500 µm can be removed from fluids, in particular from gases, especially from the air, with an effectiveness of >80%. In addition, the filter systems and the filtration methods carried out with them should be usable in numerous scientific, technical and medical fields.

Solution According to the Invention

Accordingly, filter systems for suspended matter with the particle size of 400 pm to ≤500 µm in flowing fluids having a volume flow of $10^{-2}$ mL/sec to $10^5$ mL/sec has been found, the filter systems each comprising at least one device for the ≥80% reduction in the specific particle number (N/Vt) of suspended solids of a particle size from 400 pm to 50 nm and/or for the ≥80% reduction in the specific particle number (N/Vt) of suspended particles with an MPPS (most penetrating particle size)-particle sizes ≥200 nm to ≤400 nm in flowing fluids and/or in objects through which the fluids can flow and which are fixed in the fluids and are selected from the group consisting of fluid-permeable membranes, foams, nets, threads and fabrics, by way of an energy input of from 0.25 W to 1 kW by at least one standing acoustic ultrasonic field having a power level of 40 to 250 dB of standing, modulated and non-modulated ultrasonic longitudinal waves and their harmonics and/or ultrasonic transfers waves and their harmonics with a frequency of 1 kHz to 800 MHz, so that flowing fluids with suspended matter with a specific particle number (N/Vt) below the detection limit and up to <0.1% as well as with suspended solids with particle sizes from ≥50 nm to ≤200 nm and a specific particle number (N/Vt) >99%, and/or with suspended solids with particle sizes ≥400 nm to 500 µm and a specific particle number (N/Vt) >99% are obtainable, the device further comprising at least one wall-free flow area and/or at least one flow tube with a closed wall (2.1.1), which encloses or enclose at least one flow channel for flowing through at first all of the fluids and it is further course all of the treated fluids, whereby
the at least one wall-less flow area (i) has at least two pairs of mutually associated and mutually opposing exciters or exciter-receivers of ultrasonic waves and/or at least two pairs of an exciter or exciter-receiver of ultrasonic waves and an associated, opposing reflector, the imaginary connecting lines between the respective pairs intersecting at an angle of 90°, and/or has (ii) at least two centrally arranged exciters of ultrasonic waves for generating the at least one standing acoustic ultrasonic field and the at least one flow tube (i) has at least two pairs of mutually associated and mutually opposing exciters or exciter receivers of ultrasonic waves and/or at least two pairs of one exciter or exciter receiver of ultrasonic waves and an opposing reflector assigned to the exciter or exciter receiver which are arranged on the outside and/or the insight and/or in the respective closed wall itself in such a way that the imaginary connecting line between the respective pairs intersect at an angle of 90° and/or has (ii) at least two centrally arranged exciters of ultrasonic waves were generating the at least one standing acoustic ultrasonic field, and stabilizing the at least one standing acoustic ultrasonic field by means of at least one feedback loop, furthermore at least one electric device for generating, monitoring and stabilizing the at least one ultrasonic field by means of at least one feedback is also present, at least one conveying device for a volume flow of $10^{-2}$ mL/sec to $10^5$ mL/sec for the fluids in and through the at least one flow pipe and/or the at least one wall-less flow area is present, furthermore, at least one fluid connection of the at least one flow pipe and/or of the at least one wall-less flow area with at least one filter with a smallest filterable particle size of 50 nm to 1000 nm through which the fluids can flow is also present, after which the specific particle numbers (N/Vt) of the suspended solids and the filtered fluids emerging from the filter systems are each below the detection limit or up to 0.1%, wherein N=number of particles, V=volume [m³], t=[h], and the percentages given above in each case are based on the respective specific starter numbers (N/Vt) of the respected suspended matter=100%.

In the following, this filter system is referred to as "filter system according to the invention".

In addition, the filtration method was found which comprises the steps I to V:

(I) Fluids that contain suspended solids with a particle size of 400 pm to ≤500 μm are transported into and conveyed with a volume flow of $10^{-2}$ mL/sec to $10^5$ mL/sec through at least one flow pipe and/or at least one, in particular one wall-free flow area of at least one, in particular one device with the aid of at least one, in particular one conveying device, wherein the at least one, in particular one flow tube is enclosed by a closed wall.

(II) In the flowing fluids and/or in the objects through which the fluids flow and which are fixed in the fluids, at least one, in particular, one standing acoustic ultrasonic field with the power level 40 to 250 dB and an energy input into the at least one, in particular one, flow channel of 0.25 W to 1 kW is generated by means of standing modulated and/or non-modulated ultrasonic longitudinal waves and their harmonics and/or of ultrasonic transverse waves and their harmonics, wherein in the case of the at least one, in particular one, wall-free flow area, the at least one, in particular one, ultrasonic field is generated by (i) at least two, in particular at least three pairs of mutually associated and mutually opposing exciters or exciter-receivers of ultrasonic waves and/or by at least two, in particular at least three pairs of an exciter or exciter-receiver of ultrasonic waves and an associated, opposing reflector, whose imaginary connecting lines between the respective pairs intersect at an angle of 90°, and/or by (ii) at least two, in particular at least three centrally arranged exciters of ultrasonic waves, in the case of the at least one, in particular, one flow tube, the at least one, in particular one ultrasonic field is generated by (i) at least two, in particular at least three pairs of mutually associated and opposing exciters or exciter-receivers of ultrasonic waves and/or at least two, in particular at least three pairs of one exciter or exciter-receiver of ultrasonic waves and/or one opposing reflector assigned to the exciter or exciter-receiver, which exciters, exciter-receivers and/or reflectors are located on the outside and/or the inside and/or in the respective closed wall itself and which are arranged in such a way that the imaginary connecting line between the respective pairs intersect at an angle of 90°, and/or by (ii) at least two, in particular at least three centrally arranged exciters of ultrasonic waves, wherein the at least one, in particular one standing, acoustic, ultrasonic field is generated, monitored, modulated and stabilized with at least one electronic device for generating feedback loops and wherein the fluids and, in the further course of the flow tube, the treated fluids are conveyed with a volume flow of $10^{-2}$ mL/sec to $10^5$ mL/sec, by at least one, in particular one conveying device in conveying direction through the at least one, in particular one flow tube and/or the at least one, in particular one wall-free flow area, through at least one, in particular one fluid connection of the at least one, in particular one flow to and/or the at least one, in particular one wall-free flow area to at least one, in particular one filter with a smallest filterable particle size of from 50 nm to 1000 nm, through which the fluids flow, wherein the flowing fluids containing suspended matter having a particle size from 1 nm to ≤50 nm and a specific particle number (N/Vt) ≤20% and/or containing suspended matter having MPPS-(most penetrating particle size) particle sizes from ≥200 nm to ≤400 nm and a specific particle number (N/Vt) ≤20% as well as containing suspended matter having particle sizes of ≥50 nm to ≤200 nm and a specific particle number (N/Vt) ≥80% and/or containing suspended matter having particle sizes ≥400 nm to ≤500 μm are formed by condensation, aggregation, agglomeration, compression, separation, precipitation, impact, impaction, accretion and detachment, addition of particles of a particle size ≥400 nm to ≤500 μm and/or by concentration changes of constituents of the suspended matter.

(III) The Fluids, and in the further course of the flow tube, the treated fluids are conveyed by at least one, in particular one conveying device in conveying direction into and through the at least one, in particular one flow tube and/or through the at least one, in particular one wall-free flow area, through at least one, in particular one fluid connection from the at least one, in particular one flow tube, and/or from the at least one, in particular one wall-free flow area to at least one, in particular one filter having a smallest filterable particle size of 50 nm to 1000 nm, which filter is perfused by the fluids, whereby the treated flowing fluids containing suspended matter having a particle size of from 400 pm to ≤50 nm and a specific particle number (N/Vt) ≤20%, preferably ≤10%, more preferably ≤5% and in particular ≤1%, and/or containing suspended particles having MPPS-particle sizes of ≥200 nm to ≤400 nm and a specific particle number (N/Vt) ≤20%, preferably ≤10%, more preferably ≤5% and in particular ≤1% and/or containing suspended matter having a particle size ≥400 nm to 500 µm and a specific particle number (N/Vt) ≥80%, preferably ≥90%, more preferably ≥95% and in particular ≥99% are formed.

(IV) The suspended matter is separated from the flowing fluids by the at least one, in particular one filter, whereupon the filtered fluids exiting through at least one, in particular one fluid connection with the filter having at least one, in particular one discharge device, contain suspended matter in various particle sizes and in specific particle numbers (N/Vt) below the relevant limit of detection and/or up to 0.1%, wherein N=particle number, V=volume [m$^3$],t=time [h] and the percentages are based on the respective specific starter numbers (N/Vt) of the suspended matter.

(V) Alternatively or in addition, the said suspended matter is conveyed before and/or after the at least one filter out of the at least one, in particular one flow channel into at least one, particular one branch of the at least one, in particular one flow tube and/or the at least one, in particular one wall-free flow area with the help of ultrasonic shock waves and/or superimpositions of standing ultrasonic longitudinal waves with their harmonics conveyed further to at least one filter, in particular two filters and filtered.

In the following, the aforementioned filtration method is referred to as the "filtration method of the invention".

Furthermore, the use of the filter systems of the invention and of the filtration method of the invention for the removal of organic, inorganic, and/or biogenic, liquid, gel-like and/or solid suspended matter of a particle size of 400 pm to ≤500 µm from liquid, gel-like and/or gaseous fluids was found, which use is designated as the "the use according to the invention".

Last but not least, equipment and devices were found which comprise at least one filter system of the invention and are designated in the following as the "equipment and devices of the invention".

Advantages of the Invention

In view of the prior art, it was surprising and not foreseeable for the person skilled in the art that the object on which the invention was based could be achieved with the aid of the filter systems of the invention, the filtration method of the invention, the use according to the invention and the equipment and devices of the invention.

It was particularly surprising that the filter systems of the invention and the filtration method of the invention could be used in so many different scientific, technical and medical fields. In addition, the filter systems of the invention and the filtration method of the invention could not only be used on an industrial or clinical scale, but also in private households or in medical practices, dental practices, analytical laboratories or chemical laboratories. They proved to be extremely efficient and were able to filter suspended matter, which could not or only very poorly be filtered by the prior art methods, from gaseous and/or liquid fluids within an efficiency of >99%, based on the respective specific starter numbers (N/Vt) of the respective suspended matter. They were therefore, ideally suited for applications in which the avoidance of health risks is very important.

In particular, suspended matter having particle size of 400 pm to 50 nm and MPPS-particles could be removed without any problems from liquid, gaseous and gel-like fluids with an efficiency of >99%.

An additional essential advantage of the filter system of the invention was that it could also be used in the micrometer range for example in labs-on-a-chip.

Additional advantages emerge from the following description.

DETAILED DESCRIPTION OF THE INVENTION

The filter system of the invention is used for the next to complete or complete removal of suspended matter with a particle size of 400 pm to 500 µm, preferably of 1 nm to 100 µm, more preferably 1 nm to 10 µm and in particular 1 nm to 5 µm from flowing fluids of a volume flow of $10^{-2}$ mL/sec to $10^5$ mL/sec by an energy input of 0.25 W to 1 kW by means of ultrasonic waves having a frequency of 1 kHz to 800 MHz and a power level of 40 to 250 dB.

In particular, the fluids are air, industrial gases, raw gases, medical gases, exhaust gases, water, wastewater, organic solvents, solutions, edible oils, lubricating oils, gear oils, crude oils, foodstuffs, coolants, dispersions, suspensions and emulsions.

The suspended matter is present in aerosols, suspensions and/or emulsions and/or as solids, gels, aerosols, suspensions and/or emulsions.

In particular, the suspended matter can be finely divided turbid matter, liquid waste, digestate, animal waste, liquid manure, slaughterhouse waste, excrement, kitchen waste, biowaste, radioactive and non-radioactive, organic, inorganic, organic-inorganic and/or by biogenic particles, cigarette smoke, cigar smoke, electric cigarette smoke, fiber materials, biogas plant waste, coating agents, coating residues, sludge, effluent, colors, varnishes, sealants, polymer waste, macromolecules, acidic aerosols, gas bubbles generated by cavitation in fluids, viruses and microorganisms, eggs of insects, parts of insects, fine dust generated by traffic, shipping traffic and air traffic, fire, welding, biomechanical abrasion, by leaks in systems, by restructuring measures, by wood processing, by stone processing as well as building fires, forest fires, peat fires, pipeline fires, crude oil production plants, mines, coal beds and chemical plants, by mechanical and chemical decomposition, explosions, eruptions of volcanoes, reactor accidents and sandstorms.

The filter system of the invention is intended for the filtration of suspended matter with a particle size of 400 pm to 500 µm in flowing fluids with a volume flow of $10^{-2}$ mL/sec to $10^5$ mL/sec. The filter systems of the invention comprise at least one, in particular one device for the ≥80% reduction in the specific number of particles (N/Vt) of suspended matter with MPPS (most penetrating particle sizes) particle sizes of ≥200 nm to ≤400 nm in the flowing fluids and/or in the objects, through which the fluids can flow and which are fixed in the fluids and which are selected from the group consisting of fluid-permeable, vibrating membranes, foams, nets, threads and fabrics, the reduction being caused by an energy input of 0.25 W to 1 kW from at least one standing acoustic ultrasonic field with a power level of 40 to 250 dB of standing, modulated and non-modulated ultrasonic longitudinal waves and their harmonics and/or ultrasonic transverse waves and their harmonics of the frequency of 1 kHz to 800 MHz so that flowing fluids with suspended matter having a specific particle number (N/Vt) below the limit of detection up to <0.1%, and/or with suspended matter having a particle size of ≥50 nm to ≤200 nm and a specific particle number (N/Vt) >99% and/or with suspended matter having a particle size of ≥400 nm to 500 µm and a specific particle number (N/Vt) >99% are obtained.

The device to be used according to the invention further comprises at least one in particular one flow tube with a closed wall which encloses or encircles at least one, in particular one flow channel for the passage first of the fluids and then of the treated fluids.

The at least one, in particular one flow tube comprises (i) at least two, in particular at least three pairs of mutually associated and opposing exciters and/or exciter-receivers of ultrasonic waves and/or at least two, in particular at least three pairs of an exciter or exciter-receiver of ultrasonic waves and an opposing reflector assigned to the exciter or exciter-receiver, which exciters, exciter-receivers and/or reflectors are arranged on the outside and/or the insight and/or in the respective closed wall itself in such a way that the imaginary connecting lines between the respective pairs are at an angle of 90°, and/or comprises (ii) at least two centrally arranged exciters of ultrasonic waves for generating the at least one standing acoustic ultrasonic field.

Furthermore, there is at least one in particular one electronic device for generating, monitoring and stabilizing the at least one, in particular one standing acoustic ultrasonic field by means of at least one feedback loop.

In addition, there is at least one, in particular one conveying device for a volume flow of $10^{-2}$ mL/sec to $10^5$ mL/sec of the fluids in and through the at least one flow pipe and/or the at least one wall-free flow area.

Last but not least, there is at least one, in particular one fluid connection of the at least one, in particular one flow tube and/or the at least one, in particular one wall-free flow area with at least one filter or with at least two filters having a smallest filterable particle size of 50 nm to 1000 nm through which the fluids can flow, after which the specific particle numbers (N/Vt) of the suspended matter in the filtered fluids exiting the filter systems are in each case below the limit of detection or up to <0.1%, wherein N=number of particles, V=volume [$m^3$], t=[h], and the percentages given above in each case are based on the respective specific starter numbers (N/Vt) of the respected suspended matter=100%.

The standing modulated and non-modulated ultrasonic waves can be combined with ultrasonic shock waves.

Preferably, the exciters of longitudinal waves and their harmonics, preferably of compression waves and their harmonics and in particular of ultrasonic waves and their harmonics are MEMS (microelectromechanical systems), loudspeakers, vibrating membranes, piezoelectric loudspeakers, sound converters, virtual sound sources, moving coils, magnetic or static loudspeakers, ribbon, foil and jet tweeters or horn drivers, bending wave converters, plasma loudspeakers, electromagnetic loudspeakers, exciters, ultrasonic converters and phantom sound sources.

Preferably, the sound sources are sound-decoupled from their mountings and vibration-decoupled.

If at least one, in particular one wall-free flow area is used, it is surrounded by sound sources, which are preferably sound-decoupled and vibration-decoupled from their holders.

Preferably, the reflectors are selected from the group consisting of flat, concave and convex sound reflectors.

According to the invention, the objects fixed in the flow channel are selected from the group consisting of fluid-permeable vibrating membranes, foams, nets, threads and fabrics. The fixed objects can be plastic membranes, plastic fabrics, textile fabrics, gauze, glass fiber fleece, needle felt, paper filters, ceramic filters, glass filters, sintered metal filters and open pore foams. These materials can also be in the form of particles, in particular spherical particles with a particle size in the range of from 500 μm to 2 mm, with which the flow channel is filled.

Preferably, the at least one, in particular one filter with the smallest filterable particle size of 50 nm to 1000 nm is selected from the group consisting of high-performance EPA particle filters, HEPA filters, ULPA high-performance filters, medium filters, tube filters without pressure loss, pre-filters, automotive interior filters, cake filters, crossflow filters, flexible filters, rigid filters, industrial (Siebec) filters, fleeces, backwash filters, water filters, precoat filters, room filters, bed filters, magnetic filters, graphene filters, Venturi washers, gas separators, gas scrubbers, SCR catalysts and OCR catalysts, wherein the materials are selected from the group consisting of etched metals, sintered metals, metal foams, metal threads, metal wool, plastic fabrics, plastic foams, papers, cardboard, cellulose threads, cellulose fabrics, cellulose wools, lignin threads, lignin wools, lignin fabrics, natural fibers, natural wool, natural fiber fabrics, natural fiber, knitted fabrics, natural material foams, sponges, glass fibers, glass wool, glass frits, ceramic fibers, ceramic fabrics, ceramic wool, ceramic foams, boron fibers and stone fibers as well as composite materials of at least two of the aforementioned materials.

Preferably, the at least one, in particular one conveying device is selected from the group consisting of a liquid pressure, a liquid column and a liquid wave of a liquid fluid, wind, soundwaves modulated in the conveying direction, a centrifugal force, a centripetal force, a Coriolis force, gravitation, an injector, a venturi, a diffuser, a liquid multiplier, a gas multiplier, a Dyson, a fan, a jacket turbine, a delta wing concentrator, a ring venturi, a magnus effect turbine, a Berwian or Berlin wind turbine, a passive and active convection, effusion and diffusion. In particular, gas multipliers, Dysons, ventilators, liquid multipliers and ring venturis are used.

In particular, the preferred embodiment of the filter system according to the invention, at least one, in particular one device is connected to the at least one, in particular one flow pipe and/or to the at least one, in particular one wall-free flow area, with the aid of which particles having a particle size of 400 pm to 500 μm can be metered into the flow channel. In this way, this shifts the particle size distributions of the suspended solids into size ranges in which the particles can be filtered particularly effectively.

In a further embodiment of the filter system according to the invention, at least one, in particular one fluid connection is formed between the at least one, in particular one flow pipe in at least one, in particular one Venturi pipe section with a fluid-permeable wall.

The wall of the at least one, in particular one Venturi pipe section is fluid-permeable due to at least four, preferably at least five, more preferably at least ten, and in particular at least twenty openings, in particular, circular openings, which are arranged in a circle around the wall. The at least one, in particular one Venturi pipe section preferably comprises at least two, preferably at least three, more preferably at least four and in particular at least five of these, circular arrangements. In addition, an annular adjustment plate, which is inclined against the flow direction, preferably inclined at an angle of 30° to 70°, and in particular at an angle of 60°, is attached in front of each circular arrangement on the inside of the fluid-permeable wall. The annular contact plates work according to the Venturi principle and direct the suspended matter and parts of the fluids into the openings in the fluid-permeable wall to at least one, in particular one filter, which surrounds the at least one in particular one Venturi pipe section in the form of a cuff, which, in turn, is enclosed at a distance from at least one, in particular one closed wall so that at least one, in particular one collecting gap for the filtered fluid is formed. The at least one, in particular one closed wall has at least one, in particular one fluid connection with at least one, in particular one outlet device or with at least one, in particular one chimney for the discharge of the filtered fluid.

In this embodiment, the fluid emerging from the at least one, in particular one filter is collected in the at least one in particular one collecting gap and is discharged directly via at least one, in particular one outlet device and/or is fed back via at least one, in particular one recirculation and at least one, in particular one outlet opening into the fluid flowing in the at least one, in particular one extension of the at least one, in particular one flow tube. Or the filtered fluid emerging from the at least one, in particular one filter is fed directly via at least one, in particular one fluid connection into at least one, in particular one outlet opening and/or via at least one, in particular one recirculation and at least one, in particular one outlet opening into the at least one, in particular one extension into the fluid flowing in the at least one, in particular one extension of the at least one, in particular one flow tube.

In a preferred embodiment, the structure consisting of at least one, in particular one part of the at least one, in particular one part of the collecting gap with at least one part, in particular one part of the recirculation can be removed from the filter system of the invention. To this end, the joints can be fastened with circumferential flange connections with elastomeric seals and encompassing clamps. After the separation and the removal of the parts, the at least one, in particular one sleeve-shaped, used filter can be exchanged for at least one, in particular one, fresh filter.

Alternatively, the at least one, in particular one Venturi pipe section can be enclosed by at least one, in particular one outwardly closed, cuff-shaped collecting gap for collecting and supplying the fluid via at least one, in particular one collecting pipe to at least one, in particular one filter. Preferably, the at least one, in particular one filter is preferably located in a fluid-tight filter housing which has at least one, in particular one of the flange connections described above. The filter can lie on top of at least one, in particular one perforated plate, and/or be covered by at least one, in particular one perforated plate. At least one, in particular one coarse filter can also be located on the filter, which coarse filter catches any detached filter material so that it does not contaminate the filtered fluid flowing out.

In this embodiment, the filtered fluid can be returned to the at least one, in particular one extension via at least one, in particular one recirculation as described above. Or, the filtered fluid is diverted in some other way.

In a further embodiment, the clear span of the at least one, in particular one flow tube narrows steadily and/or abruptly in the flow direction so that the dead volume of the fluids that is free or essentially free of suspended matter is reduced.

In yet another embodiment, the suspended matter and the particles are diverted before and/or after the at least one, in particular one filter of the at least one, in particular one flow channel into at least one, in particular one branch of the at least one, in particular one flow pipe and/or of the at least one, in particular one, wall-free flow region with the aid of shock waves and/or superimpositions of standing longitudinal waves with their standing harmonics and then filtered by means of at least one filter.

In addition, the filter system according to the invention described above can be stored vibration-free, equipped to be airworthy, mobile and/or floatable, whereby it has suction and blowers or no suction and blowers.

The filter system according to the invention is preferably used for the filtration method according to the invention, which comprises the following method steps I to V:

(I) Fluids that contain suspended solids with a particle size of 400 pm to 500 μm are conveyed into and through at least one flow pipe and/or at least one, in particular one wall-free flow area of at least one, in particular one device with a volume flow of $10^{-2}$ mL/sec to $10^5$ mL/sec with the aid of at least one, in particular one conveying device, wherein the at least one, in particular one flow pipe is enclosed by a closed wall.

(II) In the flowing fluids and/or in the objects through which the fluids flow and which are fixed in the fluids at least one, in particular one standing acoustic ultrasonic field with a power level of 40 dB or 250 dB and an energy input into the at least one, in particular, one flow channel of 0.25 W to 1 kW is generated, which standing acoustic ultrasonic field consists of standing, modulated and non-modulated ultrasonic longitudinal waves and their harmonics and/or ultrasonic transverse waves and their harmonics, where In the case of the at least one, in particular one wall-free flow area, the at least one, in particular, one ultrasonic field is generated by (i) at least two, in particular at least three pairs of mutually associated and mutually opposing exciters or exciter-receivers of ultrasonic waves and/or by at least two, in particular, at least three pairs of an exciter or exciter-receiver of ultrasonic waves and an associated, opposing reflector, which are arranged on the outside and/or the inside and/or in the respective closed wall itself so that the imaginary connecting line of which between the respective pairs intersect at an angle of 90°, and/or is generated by (ii) at least two, in particular, at least three centrally arranged exciters of ultrasonic waves, wherein the at least one, in particular one standing acoustic ultrasonic field is generated, money toward, modulated and stabilized with at least one electronic device for generating feedback loops and wherein the fluids, and in the further course of the flow channel, the treated fluids are conveyed with a volume flow of $10^{-2}$ mL/sec to $10^5$ mL/sec by way of at least one, in particular, one conveying device in conveying direction into and through the at least one, in particular one flow pipe and/or the at least one, in particular one wall-free flow area, through at least one, in particular one fluid connection of the at least one, in particular one flow pipe and/or the at least one, in particular one wall-free flow area to at least one, in particular one filter having a smallest filterable particle size of 50 nm to 1000 nm and being perfused by the fluids, wherein flowing fluids with suspended matter having particle sizes of 1 nm to ≤50 nm and a specific particle number (N/Vt) ≤20% and/or with suspended matter having MPPS (most penetrating particle size) particle sizes ≥200 nm to ≤400 nm and a specific particle number (N/Vt) ≤20% as well as suspended matter having particle sizes of ≥50 nm to ≤200 nm and a specific particle size (N/Vt) of ≥80% and/or with suspended matter having particle sizes ≥400 nm to ≤ 500 μm and a specific particle number (N/Vt) ≥80% are formed by condensation, aggregation, agglomeration, compression, separation, precipitation, impact, collision, accretion and detachment, addition of particles with a particle size >400 nm to ≤500 μm and/or concentration changes of the constituents of the suspended matter.

(III) The fluids and, in the further course of the flow channel, the treated fluids are passed through at least one, in particular one conveying device in a conveying direction into and through the at least one, in particular, one flow pipe and/or the at least one, in particular one wall-free flow area, through at least one, in particular one fluid connection from the at least one, in particular one flow pipe and/or the at least one, in particular one wall-free area to at least one, in particular one filter having a smallest filterable particle size of 50 nm to 1000 nm and being perfused by the fluids, whereby the treated flowing fluids containing suspended matter having particle sizes of 1 nm to ≤50 nm and a specific particle number (N/Vt) ≤20%, preferably ≤10%, more preferably ≤5% and in particular ≤1% and/or with suspended matter having MPPS (most penetrating particle size) particle sizes ≥200 nm to ≤400 nm and a specific particle number (N/Vt) ≤20%, preferably ≤10%, more preferably ≤5% and in particular ≤1 as well as suspended matter having particle sizes of ≥50 nm to ≤200 nm and a specific particle size (N/Vt) of ≥80%, preferably ≥90%, more preferably ≥95% and in particular ≥99% and/or with suspended matter having particle sizes ≥400 nm to ≤ 500 µm and a specific particle number (N/Vt) ≥80%, preferably ≥90%, more preferably ≥95% and in particular ≥99% are formed by condensation, aggregation, agglomeration, compression, separation, precipitation, impact, collision, accretion and detachment, addition of particles with a particle size >400 nm to ≤500 µm and/or concentration changes of the constituents of the suspended matter.

(IV) This suspended matter is separated from the flowing fluids by at least one, in particular one filter, after which the fluids emerging from the at least one, in particular one filter with the at least one, in particular one outlet device via the at least one, in particular one fluid connection contain the suspended matter of different particle sizes in specific particle numbers (N/Vt) below the respective detection limit and/or up to 0.1%, wherein N=particle number, V=volume [m$^3$], t=time [h], and the percentages are based on the respective specific starter numbers (N/Vt) of the respective suspended matter=100%.

(V) As an alternative or in addition, the said suspended matter is diverted, before and/or after the at least one filter out of the at least one, in particular one flow channel in at least one, in particular one branch of the at least one, in particular one flow pipe and/or of the at least one, in particular one wall-free flow area by means of ultrasonic shock waves and/or superimpositions of standing ultrasonic longitudinal waves with their standing harmonics and supplied to at least one, in particular to one additional filter and filtered.

In a further embodiment, the filtered fluids are returned to the at least one, in particular one filter system at least once, and the filtration method is repeated at least once.

The filter systems according to the invention and the filtration method according to the invention can be used with advantage in all technical, scientific and medical fields.

Thus, the filter systems according to the invention and the filtration method according to the invention can basically be used for the removal of organic, inorganic, and/or biogenic, gaseous, liquid, and/or solid suspended matter with a particle size of 400 pm to ≤500 µm and/or for the removal of other molecularly dispersed noxae from liquid, and/or gaseous fluids, and/or can be used for the chemical conversion in these fluids.

The fluids can be air, industrial gases, raw gases, medical gases, exhaust gases, water, wastewater, organic solvents, solutions, edible oils, lubricating oils, gear oils, crude oils, foods, coolants, gels, dispersions, suspensions, and/or emulsions.

The suspended matter can be finely divided turbid matter, liquid waste, digestate, animal waste, liquid manure, slaughterhouse waste, swill, excrement, kitchen waste, biowaste, radioactive and non-radioactive, organic, inorganic, organic-inorganic and/or biogenic particles, cigarette smoke, cigar smoke, electric cigarette smoke, fiber materials, biogas plant waste, surface coating agents, paint residues, sewage sludge, effluent, paints, varnishes, sealing materials, polymer waste, macromolecules, acidic aerosols, mercury vapors, gas bubbles formed by cavitation in fluids, cells, organelles, blood cells, viruses and microorganisms, prions, seeds, insect eggs, parts of insects, flour, dust, fine dust occurring in road traffic, welding, soldering, mechanical abrasion, leaks in systems, renovation work, woodworking, stone methoding and building fires, forest fires, peat fires, fires in pipelines, crude oil production plants, natural gas production plants, mines, coal seams and chemical plants, explosions, volcanic eruptions, reactor accidents and sand storms.

To name just a few examples, the filter systems according to the invention and the filtration method according to the invention can be used for the coagulation of protein, for the repression of gels, increasing the reaction rate of chemical reactions, the destruction of microorganisms, the recycling and cleaning, the drying and/or cooling of indoor air, the recycling as well as cleaning, trying, and/or cooling of air in air-conditioning systems, fume cupboards, clean rooms, and positive or negative pressure chambers, the recycling and cleaning, drying and/or cooling of air, gases and liquids for medical and veterinary use, the cleaning of cell cultures, the recycling and cleaning, drying, and/or cooling of the atmosphere in manned spacecraft, the recycling and cleaning, drying and/or cooling of the air in automobiles, trucks, buses, trains, ships, airplanes, animal barns and toilet facilities, the recycling and cleaning of exhaust gases from internal combustion engines, the cleaning of the atmosphere, the collecting of gaseous, solid and liquid terrestrial samples, the collecting of atmospheric samples up to and in the stratosphere, the collecting of gaseous, solid and liquid planetary and atmospheric samples on planets with an atmosphere, the radioactive decontamination, the extraction of liquid water from the earth atmosphere, the protection of filter membranes, water filters and gas filters from suspended matter, the dissolution and detachment of filter cakes from filters and membranes, as well as the post-cleaning of exhaust gases from electrical dust collectors, Venturi scrubbers, optical separators, gas separators, gas scrubbers, SCR catalysts, OCR catalysts and electrostats.

To name a few examples, the filter systems according to the invention can be used in and on devices for increasing the speed of chemical reactions, in and on dust curtains, in and on devices for clinical and extra-clinical intensive care and respiratory care, in lower anesthesia devices, in and on devices for the conversion of ammonia and NOx in nitrogen, in and on devices for the ventilation of clean rooms, airlocks, fume cupboards, negative and overpressure chambers, him in and on gas masks and breathing masks, in and on devices for the protection against viruses, microorganisms, insect eggs and insect parts, in and on devices to protect against smog, VOC, car exhaust fumes, dust, aerosols and combustion gases, in and on cigarettes, cigars and electric cigarettes, in and on vacuum cleaners, in and on suction systems for welding torches, laser cutters and grinding devices, in and on the exhaust systems of combustion engines, in and on devices for protection against welding spatter, welding mist, spray paint overspray and dust explosions, in and on ventilation systems of remote barns and toilet facilities, and in devices, apparatuses and systems for removing fine dust and noxious substances from chemical abrasion, from leaks in systems, during renovation work, in woodworking, in stone processing as well as in waste incineration, building fires, forest fires, peat fires, fires in pipelines, crude oil production systems, natural gas production systems, mines, coal seams and chemical plants, mechanical and chemical decomposition, explosions, volcanic eruptions, reactor accidents and sandstorms, in and on aircrafts, in and on remote-controlled robotic vehicles for collecting dust samples on earth and on other celestial objects with atmospheres and for radioactive decontamination, in and on systems for extracting water from the atmosphere, in and on systems with electrical dust collectors and electrostats, in and on electrical appliances, washing machines, tumble dryers, refrigerators, upright freezers and freezer chests, PCs, laptops, notebooks, iPads, servers, in and on plant-based air purifiers as well as in and on passively floating or powered above and underwater swimming devices for collecting micro plastics in seawater, lakes and rivers.

With the aid of the filter systems according to the invention and of the filtration method according to the invention molecularly dispersed noxae such as partially halogenated and perhalogenated organic compounds, sulfur dioxide, sulfur trioxide, sulfuric acid, hydrochloric acid, hydrogen cyanide, sulfur hexafluoride and other gaseous fluorides, NOx, nitrous gases, nitrous oxide, ammonia, amines, phosphines, phosgene, pseudohalogens, halogens, halogen oxides, peroxides, peroxide radicals, radioactive compounds and nuclides, oxygen radicals and ozone can be removed.

Overall, the equipment and systems according to the invention which contain the filter systems according to the invention offer the advantages described above. As examples can be mentioned, roads, bridges, buildings, air conditioning systems, clinics, medical devices, laboratories, cleanroom laboratories, power plants, nuclear power plants, incineration plants, chemical plants, gas separation plants, nuclear engineering plans, means of transport on land, on water, in the air, in the underground and under water as well as in interiors of spacecraft, satellites and space stations.

The above list of uses, equipments and systems are exemplary and not conclusive. On the basis of the teaching according to the invention, the person skilled in the art can readily suggest further uses, equipment and systems.

BRIEF DESCRIPTION OF THE FIGURES

In the following, the filter system 1 according to the invention, the filtration method according to the invention and their uses according to the invention are explained in more detail by way of example, with reference to the FIGS. 1 to 35. The FIGS. 1 to 35 are schematic representations which are intended to illustrate the core features of the filter systems according to the invention, the filtration method according to the invention and their uses, according to the invention and, therefore, do not have to be drawn true to scale. It is shown in representations not true to scale in:

FIG. 1a a plan view of a cross-cut through the device 2 along the cutting line A-B;

FIG. 14 plan view of the longitudinal cut through a box-shaped receiving device 11 for the rack frame 10 in a barn ventilation chimney 8;

FIG. 15 a perspective view of the box-shaped receiving device 11 according to FIG. 14;

FIG. 17 a plan view of the longitudinal cut through a fluid-tight, two-sided arrangement, 13 of one exciter-receiver 2.4.1 in each case;

FIG. 18 a plan view of the longitudinal cut through a quipu-shaped arrangement 13a according to FIG. 17, with hanging wires 13.4, a Venturi support plate 13.5 and a filter 3;

FIG. 19 a plan view from above onto the Venturi carrier plate 13.5 according to FIG. 18;

FIG. 21 a plan view of a cross-cut along with cutting line EF through the self-sufficient vertical water extraction system 14 according to FIG. 20;

FIG. 22 a plan view of an enlarged detail V of the cross-cut E-F according to FIG. 21;

FIG. 29a a plan view of a cross-cut through the flow pipe 2.1 of the filter system 1 according to FIG. 29;

FIG. 30a a plan view of a cross-cut through a flow pipe 2.1 of a filter system 1;

FIG. 31 a plan view of the longitudinal cut through a flow pipe 2.1 of a filter system 1 with exciters 2.4.1 that emit ultrasonic transverse waves 2.4.2T;

FIG. 31a a plan view of the cross-cut of the flow tube 2.1 of FIG. 31 along the cutting line KL;

FIG. 32 a plan view of a longitudinal cut through the flow tube 2.1 with exciters 2.4.1 arranged along its centerline and emitting ultrasonic transverse waves 2.4.2T;

Figure 1:
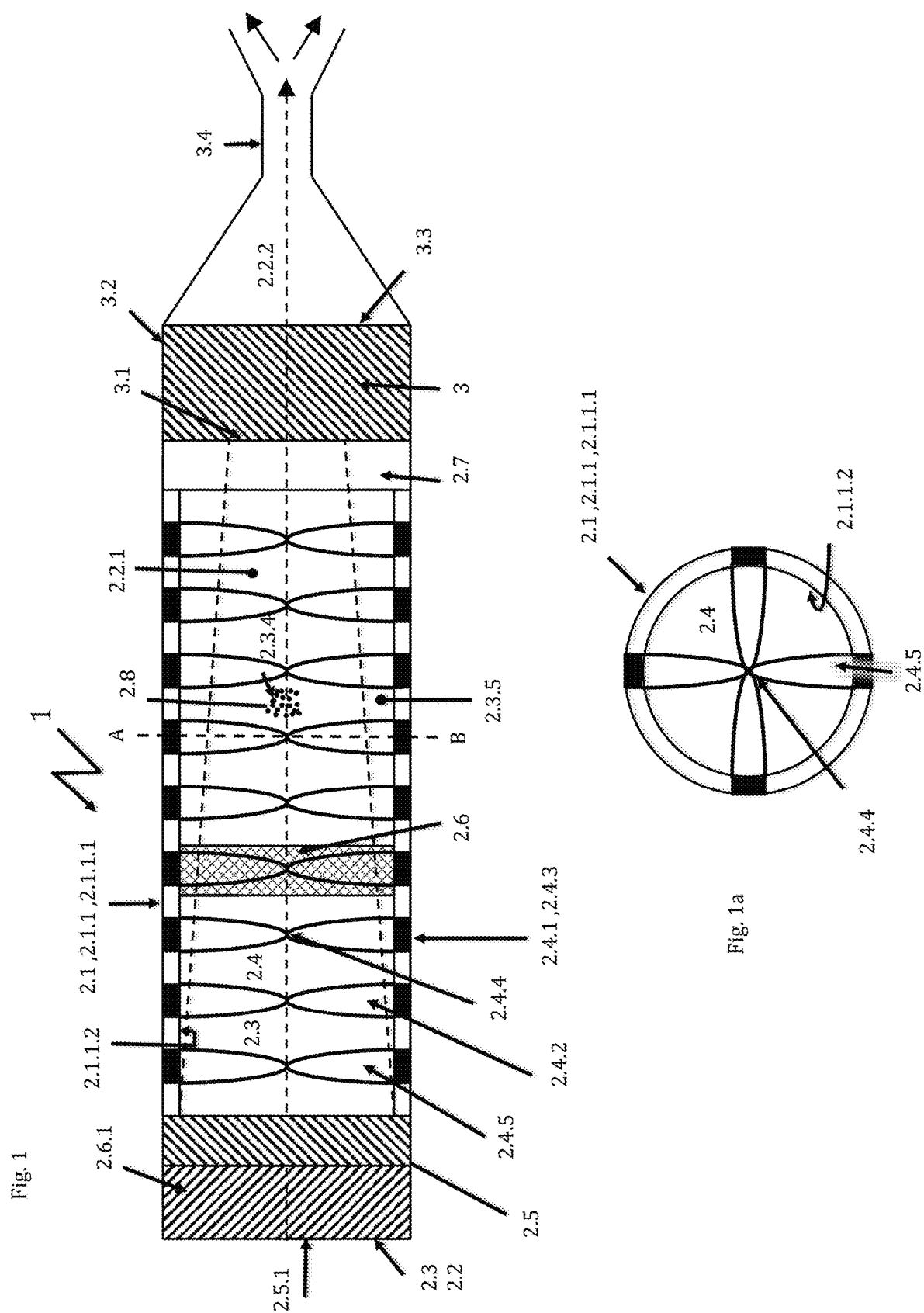
FIG. 1 a plan view of a longitudinal cut through a filter system 1 according to the invention with the device 2 for reducing specific particle numbers N/Vt [particle number/ $m^3 \cdot h$], and a filter 3.

In the FIGS. 1 to 35, the reference symbols have the following meaning:

1 Filter system
1a-1j Installation positions of filter systems 1 in exhaust systems 4 for diesel and gasoline engines.
1k-1n Installation positions of filter systems in ventilators and anesthesia machines 5
1t-1v Installation positions of filter systems 1 in the circulating air cleaner 9 inside a cattle barn.
1w-1z Installation positions of filter systems 1 in barn roofs 12
2 Device for reducing the specific numbers of particles N/Vt [number of particles/m³·h]
2.1 Wall-free flow area
2.1.1 Closed wall of the flow tube 2.1
2.1.1.1 Outer side of the closed wall 2.1.1
2.1.1.2 Inner side of the closed wall 2.1.1
2.1.2 Extension
2.1.2.1 External thread through the inlet opening 2.1.2.2 of the extension 2.1.2
2.1.2.2 Entry opening of the extension 2.1.2
2.1.2.3 Fluid-tight abutting edge "Edge of the wall 2.1.2.4 of the extension 2.1.2//Venturi pipe section 2.7.1 without pressure-loss"
2.1.2.4 Wall of the extension 2.1.2
2.1.3 Annular gap
2.1.3.1 Clear span of 2.1.3.
2.1.3.2 Plastic hose
2.1.4 Clear span of 2.1
2.1.5 Clip-on connection
2.1.6 Prefilter, output filter
2.1.7 External thread at the end of the flow tube 2.1
2.1.8 Branch of the flow pipe 2.1
2.1.9 Through-flow filter tube parallel to the flow tube 2.1
2.1.10 Filter tube reinforced against shock waves 2.4.2S and branching off from the flow tube 2.1
2.2 Flowing fluid
2.2.1 Flowing fluid having a very low specific particle number N/Vt of MPPS particles 2.3.2 and suspended matter 2.3.1
2.2.2 Filtered fluid
2.2.3 Drained fluid purified by ultrasonic waves and their harmonics
2.2.4 Drained fluid purified by shock waves 2.4.2S
2.3 Suspended matter of a particle size of 400 pm to ≤500 μm
2.3.1 Suspended matter of a particle size of 400 pm to ≤50 nm
2.3.2 MPPS particles of a particle size of ≥200 nm to ≤400 nm
2.3.3 Suspended matter of a particle size of ≥50 nm to ≤200 nm
2.3.4 Suspended matter of a particle size of ≥400 nm to 500 μm
2.3.5 Particle-free or particle-depleted dead volume of the fluids 2.2 and 2.2.1
2.4 Flow channel in the flow pipe or flow area 2.1
2.4.1 Exciter or exciter-receiver of standing and/or modulated ultrasonic longitudinal waves and/or ultrasonic transverse waves and/or their harmonics 2.4.2
2.4.1S Ultrasonic shock wave generator
2.4.2 Standing modulated and non-modulated ultrasonic longitudinal waves and ultrasonic transverse waves and their standing and non-standing harmonics; standing acoustic ultrasonic field
2.4.2S Ultrasonic shock waves
2.4.2T Ultrasonic transverse waves.
2.4.2Ü Superposition of standing ultrasonic longitudinal waves with their non-standing harmonics.
2.4.3 Reflector
2.4.4 Wave knot
2.4.5 Wave antinode
2.5 Conveyor device for the fluids 2.2, 2.2.1 and 2.2.2
2.5.1 Flow direction, conveying direction
2.5.2 Inlet pipe
2.6 Object, which can be perfused by the fluids 2.2 and which is fixed therein
2.7 Fluid Connection of the flow pipe 2.1 with the filter 3
2.7.1 Venturi pipe section with no pressure loss.
2.7.2 Fluid-permeable wall of the Venturi pipe section 2.7.1
2.7.3 Annular adjustment plate inclined against the flow direction 2.5.1
2.7.4 Circular outlet opening for the fluid 2.2.1
2.7.5 Recirculation pipe of the fluid 2.2.2 into the extension 2.1.2
2.7.5.1 Recirculation pipe elbow
2.7.5.2 Vertical part of the recirculation pipe
2.7.5.3 Bend into the horizontal line
2.7.5.4 Horizontal part of the recirculation pipe 2.7.5 within the extension 2.1.2
2.7.6 Circumferential collecting gap for collecting and feeding the filtered fluid 2.2.2 to the fluid connection 3.9 or to the chimney 3.9
2.7.7 Circumferential collecting gap for collecting and feeding the fluid 2.2.1 2A. Collecting pipe 2.7.8
2.7.8 Collecting pipe for feeding the fluids 2.2.1 to the filter 3
2.8 Device for metering particles 2.3.4 with a particle size >400 nm to 500 μm into the flow channel 2.4, dosing device, metering device
2.8.1 Storage vessel
3 Filter
3a-3e Filters with different separation efficiencies 3.1 Inlet opening for the fluid 2.2.1 into the filter housing 3.2
3.1.1 Internal thread corresponding to the external thread 2.1.7
3.2 Filter housing
3.2.1 Perforated plate
3.2.2 Perforated plate
3.2.3 Coarse filter
3.3 Outlet opening, outlet opening for the filtered fluid 2.2.2 for entry into the Venturi nozzle 3.4
3.3.1 Internal thread around the outlet opening 3.3
3.4 Outlet for the fluid 2.2.2, Venturi nozzle
3.4.1 External thread on the Venturi nozzle 3.4 for screwing into the internal thread 3.3.1
3.5 Venturi nozzle outlet 3.4
3.6 Sleeve filter
3.6.1 Tongue-and-groove joint
3.7 Cuff-shaped closed wall around the filter 3.6
3.7.1 Cylindrical housing.
3.7.1.1 Vertical part of the wall 3.7
3.7.1.2 Horizontal part of the wall 3.7
3.7.2 Internal thread around the opening 3.7.3 for the entry of the airflow 2.2.1 into the pressure loss-free Venturi pipe section 2.7.1
3.7.3 Protruding annular reinforcement around the inlet opening 3.7.4 as a carrier of the internal thread 3.7.2 to accommodate the external thread 2.1.7
3.7.4 Inlet opening.
3.7.4.1 Fluid-tight abutting edge "pressure loss-free Venturi pipe section//End edge of the wall 2.1.1 of the flow pipe 2.1"
3.7.5 Outlet opening
3.7.5.1 Protruding annular reinforcement around the outlet opening 3.7.5 as the carrier of the internal thread 3.7.2 to accommodate the external thread 2.1.7
3.8 Removal part of the apparatus for removing the cuff-shaped filter section.
3.8.1 Circumferential flange connection.
3.8.1.1 Elastomeric seal
3.8.1.2 The flange connection 3.8.1 encompassing clamps
3.9 Fluid connection (chimney) for the recirculation 2.7.5 of the filtered air 2.2.2 into the extension 2.1.2
3.9.1 Circumferential flange connection in the recirculation pipe 2.7.5
3.9.1.1 Elastomeric seal
3.9.1.2 Circumferential clamping ring encompassing the flange connection 3.9.1
3.10 Outlet pipe.
3.10.1 Pressure-loss-free tube filter
4 Exhaust system for gasoline and diesel engines
4.1 Connection of the exhaust system 4 to a petrol engine
4.2 Soot filter and connection of the exhaust system 4 to a diesel engine
4.3 Downpipe
4.4 Catalyst
4.5 Front silencer
4.6 Muffler
4.7 Pipes
4.8 Exhaust outlet
5 Lung ventilator or anesthesia device
5.1 Air dosing
5.2 Inspirer
5.2.1 Breathing tube.
5.2.1.1 Goose gargle
5.2.1.2*a* Bypass 1
5.2.1.2*b* Bypass 2
5.2.1.2*c* Bypass 3
5.3 Expirator
5.4*a* Ventilation filter
5.4*b* Ventilation filter
5.4*a*.1 Dosing connection
5.4*b*.2 Dosing connection
5.5 Breathing mask
5.5.1 Connection piece for 5.2 and 5.3
6 Respiratory mask
6.1 Mouth and nose cover
6.2 Flexible holder
6.3 Flexible edge
6.4 Expirator with a check valve 6.4.1
6.4.1 Check valve
6.5 Clip-on holder made of hard rubber
6.5.1 Reinforcement ring made of hard rubber
6.6 Powerpack
7 Barn ventilation chimney
7.1 Diffuser
7.1.1 Annular entry slit
7.2 Ventilation pipe.
7.2*a* Upper part of the ventilation pipe 7.2
7.2*b* Lower part of the ventilation pipe 7.2
7.2.1 Non-insulated pipe wall.
7.2.2 Push-in connection 7.2*a*-7.2*b*
7.3 Pipe clamp
7.4 Fan
7.4.1 Fastening strut
7.5 Ventilation flaps
7.5.1 Flap wing
7.5.2 Air vent
7.6 Air inlet opening
7.7 Lateral inlet nozzle
7.8 Water collecting tray
7.8.1 Detachable retaining chain
7.9 Roof
8 Insulated barn ventilation chimney
8.1 Isolated ventilation pipe
8.1.1 Insulation
8.1.2 Pipe wall
8.2 Air supply from the roof space
8.2.1 Roof space air
9 Circulating air cleaner in the animal barn
9.1 Pedestal
9.1*a* Long pedestal
9.1*b* Short pedestal
9.2 Water drainage channel
9.3 Water drainage pipe
9.4 Drip net
9.4.1 Semicircular fastening clamp rings for the drip nets 9.4
9.5 Pipe wall
9.6 Perforated plate
9.7 Tub-shaped support
10 Rack, rack frame
10.1 Outer wall
10.2 Web, web plate
10.3 Circular opening
10.4 Protruding bracket
11 Box-shaped receptacle for the rack frame 10
11.1 Vertical wall of the receptacle 11
11.2 Lockable, vertical service door
11 Door leaf
11.2.2 Hinge
11.3 All-around floor
11.4 All-around ceiling
11.5 Perforated plate
12 Barn roof hood 12.1 Transparent dome
12.1.1 Exhaust air gap
12.2 Aluminum struts
12.3 Aluminum Z-purlin
12.4 Aluminum wind deflector
12.5 Aluminum storm bracket
13 Fluid-tight two-sided arrangement of one exciter-receiver 2.4.1 of standing and/or modulated longitudinal waves and/or their harmonics. 2.4.2
13.1 Circuit board
13.2 Fluid-tight plastic capsule with a flow profile
13.3 Silicone adhesive
13.4 Hanging wire
13.4.1 Eye connection
13.5 Venturi carrier plate
12.5.1 Venturi fluid passage
13.5.2 Venturi funnel wall
13.6 Power pack
14 Self-sufficient vertical water extraction system for arid areas
14.1 Vertical tube made from two vertical tube halves 14.1.1
14.1.1 Vertical tube half
14.2 Abutting edge
14.3 Circumferential chimney wall made of two halves of a pipe
14.3.1 Collecting struts between the circumferential chimney wall 14.3 and the vertical wooden pipe 14.1
14.3.2 Vertical abutting edge of the two vertical halves of a pipe
14.3.3 Vertical half of the chimney wall 14.3
14.4 Photovoltaic
14.4.1 Vertical abutting edge of the photovoltaic device 14.4
14.5 Chimney, stack
14.5.1 Circumferential entrance funnel
14.6 Removable canopy
14.7 Circumferential pre-filter
14.8 Circumferential horizontal protrusion
14.9 Drop protection
14.10 Circumferential retaining ring for the water collecting vessel 14.14
14.11 Horizontal fan
14.12 Drainer threads
14.13 Water
14.14 Water collecting vessel
14.15 Supporting ring of the water collecting vessel, 14.14 on the circumferential retaining ring 14.10
14.16 Drainpipe
14.17 Discharge tap, drainage faucet
14.17.1 Water pipe
14.18 Power pack
14.19 Tongue-and-groove press-on closures
14.20 Outlet for the dried air 2.2.2
14.21 Perforated plate
14.22 Sensor and actuator
14.23 Float
14.24 Insulation
15 Self-sufficient, horizontal water extraction system installed in slanted position
15.1 Container with a box-shaped cross-cut for the filter system 1
15.1.1 Flat wall of the top, the bottom and one vertical side of 15.1
15.2 Air multiplier (Dyson)
15.3 Transition from the box-shaped cross-cut to the round cross-cut of the Dyson 15.2
15.3.1 Perforated plate
15.3.2 Dried exhaust air.
15.4 Funnel-shaped enlarged suction opening, collecting funnel
15.5 Stone chip protecting grill
15.6 Pre-filter.
15.7 Square perforated plate for holding the filter systems 1
15.7.1 Recesses for holding the edges of the square perforated plate 15.7 on the walls 15.1.1 of the top, the bottom and one vertical side
15.8 Pedestal
15.9 Drainage threads for the condensed water 15.12
15.9.1 Adhesive fastening of the drainage threads 15.9
15.10 Drainpipe for the condensed water
15.11 Insulated canister with double walls.
15.11.1 Float guide
15.11.2 Evacuated double wall
15.11.3 Pressure equalization with check valve
15.12 Collected condensed water
15.13 Horizontally movable vertical side wall
15.13.1 Handle
15.13.2 Lower sliding profile
15.13.3 Upper sliding profile
15.14 Support plate
16 Flying machine
16.1 Flying machine without its own drive
16.2 Self-propelled flying machine
16.2.1 Propeller
16.2.2 Angle adjustable drive
16.2.3 Rigid linkage, connecting body
16.3 Collecting funnel.
16.4 Suction and blower, air multiplier, Dyson
16.5 Suspension for the filter system 1
16.5.1 Connecting strut
16.6 Bracket on the flying machine 16.1
16.7 Actuator, rotary motor
16.8 Rotating bar
16.9 Side rudder
16.10 Stabilizer
16.11 Elevator
16.12 Servo motor
16.12.1 Axis of rotation him
17 Remote controlled robot vehicle with filter system 1
17.1 Individually controllable balloon wheel
17.2 Individually controllable electric motor
17.3 Platform with independent suspension
17.4 Electric motors, power supplies, computers and actuators
17.4.1 Forward headlights, webcam and laser
17.4.2 Sidelights, laser and retractable webcam
17.4.3 Sidelights
17.4.4 Reverse lights, lasers and retractable webcam
17.4.5 Front look-down headlights and front retractable webcam
17.4.6 Rear look-down headlights and rear retractable webcam
17.5 Flexible extended gripper
17.6 Actuators
17.7 Extendable telescopic poles
17.8 Joints
17.9 Flexible data lines
17.9.1 Terminal strip
17.10 Analyzer unit
17.11 Six-sided headlight, night vision and webcam and laser arrangement, all movable in X-Y-Z direction
17.12 Transmitter and receiver 17.12.1 Parabolic antenna movable in X-Y-Z direction
17.12.2 Decoder and memory
18 Electrostat, electrostatic filter plate with wire electrode 18.1
18.1 Wire electrode
18.2 Spray electrodes
18.3 Separation of the electrically charged dust particles
18.4 Dust layer
18.4.1 Detached dust layer
18.5 Separator electrode
18.6 Rapper, tapping mechanism
18.7 Electrically insulating wall
18.8 Electrically insulating perforated plate
19 Fresh air tree
19.1 Disk-shaped, leaf-green colored cover
19.2 Inclined, circumferential, leaf-green colored drip edge
19.3 Vertical slot as a suction opening protected by a fly screen
19.4 Intake area for air 2.2 with suspended matter 2.3
19.5 Purified air outlet area 2.2.2
19.5.1 Circumferential disc slightly inclined to the ground 19.8
19.6 Precisely fitting push-in fastening
19.7 Hollow support tube as a "trunk"
19.8 Ground
20 Plant pot as an air purifier
20.1 Plant.
20.1.1 Tubers
20.1.2 Root system
20.2 Pot
20.2.1 Root-permeable floor
20.3 Potting soil
20.4 Support pin
20.4.1 Support pin with the semicircular cross-cut on the inside of the cachepot 20.5
20.4.2 Corresponding support pin with a circular cross-cut attached to the outside of the pot 20.2
20.5 Planter, cachepot
20.5.1 Holder for the ultrasonic exciter 2.4.1
20.5.2 Opening
20.6 Circumferential air duct
20.7 Biochar filter, VOC filter
A-B Cut through the filter system 1 according to FIG. 1 along the cutting line AB
C-D Cut through the filter system 1 according to FIG. 2, along the cutting line CD
E-F Cut through the rack frame 10 according to FIG. 12 along the cutting line EF
G-H Cut through the water extraction system 14 according to FIG. 20 along the cutting line GH
G Flowing exhaust gas from a biomass heating plant.
I-J Cut through the water extraction system 15 according to the FIG. 23 along the cutting line IJ
K-L Cut through the filter system 1 according to FIG. 31 along the cutting line KL
M-N Cut through the filter system 1 according to FIG. 32 along the cutting line MN
U Subsurface or substructure
V Enlarged cut of the connection area of the filter system 14 according to the FIGS. 20 and 21
VK Offset configuration of the loudspeakers 2.4.1.
W Main direction of the wind
← → Direction of flow of the fluids

DETAILED DESCRIPTION OF THE FIGURES

Preliminary Remark

For the sake of clarity, only the components essential to the invention are shown in the following FIGS. 1 to 35. The peripherals necessary for carrying out the invention contained customary and known, electronic, electrical, mechanical, pneumatic and hydraulic devices such as computers, computer chips, power sources, power lines, electric motors, lamps, cameras, webcams, lasers, exciters and receivers, power packs, batteries, accumulators, measuring and controlling devices, actuators, sensors, powder dosing or metering devices, manometers, spectrometers, gas chromatographs, mass spectrometers, microscopes, particle counters, feed pumps, vacuum pumps, mechanical grippers and exciters for remote monitoring.

FIG. 1

Trial of Concept

Here and in the following, N denotes the particle number, V denotes the volume in cubic meter and t denotes the time in hours in the designation of the specific particle number N/Vt.

The percentages relating to the specific particle numbers N/Vt relate to the respective specific starter numbers N/Vt corresponding to 100%.

The filter system 1 comprised a device 2 for reducing the specific particle number N/Vt of fine dust particles 2.3.1 with particle sizes from 1 nm to 50 nm to more than 99% and for reducing the specific particle number N/Vt of fine dust particles 2.3.2 with MPPS (most penetrating particle size) ≥200 nm to ≤400 nm by more than 99% in the air, 2.2, so that air 2.2.1 resulted that contained the fine dust particles 2.3.1 and 2.3.2 with a specific particle number N/Vt of <0.1% each and dust particles 2.3.4 and 2.3.5 with the particle size of 800 nm to 300 μm with the specific particle number N/Vt >99.8.

The device 2 comprised flow tube 2.1 made of impact-resistant ABS (acrylonitrile-butadiene-styrene copolymer) having a length of 20 cm and a flow channel with a clear span 2.1.4 of 4 cm with a closed wall 2.1.1 with a thickness of 5 mm. Eight pairs of opposing piezoelectric ultrasonic exciters 2.4.1 of the type MCUSD14A40S0RS from multi-comp (central frequency: 40 kHz; power level: 90 dB) were glued fluid-tight into the closed wall 2.1.1 with polydimethylsiloxane adhesive, so that the imaginary connecting line between each pair corresponded to the imaginary average line of the clear span 2.1.4. The piezoelectric ultrasonic exciters 2.4.1 had a circular outline with a diameter of 1.4 mm. They were arranged in a line at a distance of 15 mm from each other. The first pair of piezoelectric ultrasonic exciters 2.4.1 was at the distance of 5 mm from the start of the flow tube, seen in the conveying direction 2.5 of the flowing fluids 2.2, the last pair of piezoelectric ultrasonic exciters had a distance of 5 mm to the end of the flow tube 2.1, seen in the conveying direction 2.5 of the flowing fluids 2.2. In the same way, eight further pairs of opposing piezoelectric ultrasonic exciters 2.4.1 were embedded into the closed wall 2.1.1 so that their imaginary connecting lines intersected with the imaginary corresponding connecting lines of the other eight pairs 2.4.1 at an angle of 90°. The knots 2.4.4 of the standing ultrasonic waves 2.4.2 that were emitted by the crosswise arranged eight pairs were thus in the center of the flow tube 2.1. All piezoelectric ultrasound emitters 2.4.1 were embedded in the closed wall 2.1.1 in such a way that they aligned with the inner side 2.1.1.2 as planar as possible so that no undesired turbulence formed in the area of the essentially particle-free dead volume 2.4.6.

The standing ultrasonic waves were generated, monitored and adjusted by feedback loops using an electronic device.

Starting at 25 mm from the beginning of the flow tube 2.1, four sampling devices for extinction particle counters (not shown) were arranged in a line at the distance of 50 mm from each other. Devices from RR Reinraum ELEKTRONIK GmbH, Wiernsheim, were used. Furthermore, a so-called Luers-lock system for connection of a gravimetric high-precision microdoser 2.8 from MCP, France, was arranged at a distance of 75 mm from the end of the flow tube. With the aid of this metering device, particles 2.3.5 with particle sizes of >400 nm to 500 μm could be fed into the flowing fluid 2.2 containing the suspended matter 2.3. The nanoparticles and/or microparticles used were particles with a surface that particularly easily absorbed and/or adsorbed and/or attached to gases and liquids as well as other nanoparticles and microparticles and thus promoted the agglomeration of the particles, which agglomeration resulted in easily filterable flowing fluid 2.2 with a very low specific particle number N/Vt of MPPS particles 2.3.2 and fine dust particles. In this way, the particle size distribution of the collective of the fine dust particles 2.3.1, 2.3.2, 2.3.3 and 2.3.4 could be shifted to higher particle sizes as a whole.

Nanoparticles and microparticles of biochar, activated carbon, single-walled and multi-wall nanotubes, nanocones, fullerenes, zeolites, phyllosilicates, especially bentonites and aerogels were tested. Of these materials, nanoparticles and microparticles of biochar proved to be the most effective with regard to the uptake of noxious substances in the adhesion. And agglomeration of fine dust particles.

The particle size of the fine dust particles 2.3 in the flowing air 2.2 to be cleaned were determined with the aid of electron microscopic recordings and dynamic light scattering QELS (quasi elastic elastic light scattering). The particle size is of the collective ranged from 3 nm to 800 nm. The particle sizes showed an asymmetrical monomodal distribution with a maximum with a specific particle number N/Vt of $2\times10^7/m^3\cdot h$ at 350 nm. However, this particle size was exactly in the MPPS range of from ≥200 nm to ≤400 nm. The collective also had a specific particle number N/Vt of $2\times10^6/m^3\cdot h$ at the particle size of 50 nm and a specific particle size N/Vt of $2\times10^5/m^3\cdot h$ the particle size of 3 nm. This posed a particularly difficult filtration problem.

The fine dust particles 2.3 came from the abrasion of automobile tires on asphalt. Due to this, the composition was very homogeneous and included elastomer particles, carbon black particles, metal particles, filler particles, dye particles, pigment particles, smoke particles and asphalt particles. In addition, the air 2.2 contained certain molecularly dispersed noxae as are typical for car exhaust gases, such as NOx, sulfur dioxide, oxygen radicals, ozone and ammonia as determined by gas chromatography-mass spectrometry coupling.

The air from a busy street contaminated in this way was sucked in during rush hour by a sound-insulated high-performance fan protected by a coarse filter and blown into the flow pipe 2.1 via a pre-filter 2.1.6. The course filter prevented larger parts such as leaves, shredded paper, cigarette filters, plastic parts and/or grains of sand from entering. The pre-filter 2.6.1 caught larger particles in the millimeter range. In the flow tube 2.1, the air had a flow velocity in the flowing direction 2.5.1 of about 7 m/s.

The standing ultrasonic waves 2.4.2 generated by the piezoelectric ultrasonic exciters 2.4.1 collected the majority of the fine dust particles 2.3 in the wave nodes 2.4.4. The sound pressure caused them to agglomerate and aggregate, thus increasing their particle size. A large part of the fine dust particles 2.3.1 with the particle size of 1 nm to ≤50 nm migrated into the antinodes in the direction of the inside 2.1.1.2 of the closed wall 2.1 and accumulated on the surface of the piezoelectric ultrasonic exciters 2.4.1. When particle sizes ≥50 nm (fine dust particles 2.3.2, 2.3.3, 2.3.4) were reached, the particles were detached again by the airflow 2.2 and collected again in the wave nodes 2.4.4. As a result of these dynamic methods, the conical area of the airflow 2.2, in which the fine dust particles 2.3.2, 2.3.3 and 2.3.4 were transported in the flow direction 2.5.1 narrowed so that a dead volume 2.3.5, which was depleted or free from fine dust particle 2.3.2, 2.3.3 and 2.3.4 was formed.

With the help of a gravimetric high-precision microdoser 2.8 from MCP, France, biochar particles 2.3.4 with a particle size of from 800 nm to 100 μm having a specific particle number N/Vt of $2.5\times10^4/m^3\cdot h$ were continuously metered into the center of the flow channel 2.4. They acted as anchor particles and increased the absorption and adsorption of noxious substances, and the aggregation and agglomeration of the dust particles 2.3.1, 2.3.2, 2.3.3 and 2.3.4. This resulted in a collective of particles with particle sizes 2.3.4 from 800 nm to 300 μm. The particle collective 2.3.4 had a bimodal distribution with two maxima at 1.2 μm and 150 μm and could already be removed from the airflow 2.2.1 with a medium filter 3 with an efficiency of 99.99%. For the purpose of filtration, the end of the flow tube 2.1 was provided with an external thread 2.1.7 with two turns which was used to establish the fluid connection 2.7 between the flow tube 2.1 at the opening 3.1 of the tubular filter housing 3.2 for the filter 3. The tubular filter housing 3.2 had a corresponding internal thread 3.1.1 in its opening 3.1, which encompass the external thread 2.1.7. The wall of the filter housing 3.2 also consisted of impact-resistant, scratch-resistant ABS with a thickness of 5 mm. This resulted in a clear span 3.1.2 of 50 mm. Seen in the flow direction 2.5.1, the tubular filter housing 3.2 was 100 mm long so that filter discs 3 with the thickness of 90 mm and a diameter of 50 mm could be inserted. For this purpose, the tubular filter housing 3.2 was removed from the filter system 1.

An internal thread 3.3.1 with two turns was arranged around the outlet opening 3.3 for the filtered fluid 2.2.2. The matching external thread 3.4.1 of the Venturi nozzle 3.4 was screwed into these internal thread 3.3.1. In the space in front of the narrowing of the Venturi nozzle 3.4, gas detection pumps and Drager tubes were used to examine whether noxious substances were still present in the filtered air 2.2.2. Furthermore, a particle counter from RR Reinraum ELEKTROTECHNIK GmbH, Wiernsheim, was used, to determine whether particles were still present. These measurements could also be carried out at the outlet nozzle, 3.5 of the Venturi nozzle 3.4.

The suction effect of the Venturi nozzle 3.4 supported the high-performance fan, with which the contaminated air 2.2 was sucked into the filter system.

The following filter materials were tested:

High-performance particle filter (EPA=Efficient Particulate Air filter), smallest filterable particle size: 100 nm, High-performance particle filter (ULPA=Ultra Low Penetration Air filter), smallest filterable particle size: 50 nm, Medium filter, smallest filterable particle size: 300 nm,
Pre-filter, smallest filterable particle size: 1000 nm, and
Car interior filter, smallest filterable particle size: 500 nm.

The test results showed that in all cases, the concentration of the particles in the filtered air 2.2.2 was below the detection limit. In this sense, the filtered air 2.2.2 was free of particles.

The filter system 1 could be supplied computer controlled with electricity.

Surprisingly, noxious substances such as NOx, sulfur dioxide, ozone and ammonia could no longer be detected, which was once again confirmed by gas chromatographic and mass spectrometric measurements.

The air 2.2.2 purified in this way could even be used for clean rooms.

Further Embodiments of the Filter System 1 According to the FIG. 1

The filter system 1 according to FIG. 1 was modified in various ways in that objects 2.6, through which air 2.2, 2.2.1 could flow, were fixed in the flow channel 2.4 so that the standing ultrasonic waves 2.4.2 penetrated these objects 2.6. In another embodiment, the permeable objects 2.6 were fixed between the standing ultrasonic waves 2.4.2. In the third embodiment, the two previous embodiments were combined with one another. As a result of these modifications, additional separation effects were brought about by the ultrasonic vibrations, so that the efficiency of the aggregation, the agglomeration, the condensation, the separation and precipitation, the compression, the collisions and the impacts, as well as the growth and the detachment, as for example, for certain particle sizes of the modified filter system 1 could be significantly and specifically increased.

The following materials were used as the permeable object 2.6:

Plastic membranes,
plastic fabrics,
textile fabrics, gauze,
fiberglass fleece,
needle felt,
paper filters,
ceramic filters,
glass filters,
sintered metal filters and
open-cell foams.

These materials were also used in the form of particles 2.6, in particular spherical particles 2.6 with a particle size in the range of from 500 μm to 2 mm, with which the flow channel 2.4 was filled.

The Use as a Flow Reactor

The flow channel 2.4 of the filter system 1 according to FIG. 1 was filled with a bed of catalysts particles made of tungsten trioxide and silicon dioxide. The catalyst particles were set in intensive motion by the standing ultrasonic waves 2.4.2 emitted by the ultrasonic sources 2.4.1. Propyne was blown into the oscillating catalyst bed as fluid 2.2.2, wherein it was converted into but-2-ene and ethylene (fluid 2.2.1). The olefin mixture 2.2.1 was passed through the filter 3 into the outlet opening 3.3 and to the outlet 3.4, from where it entered the cooling system for condensation.

The abrasion or dust caused by the intensive movements of the catalyst particles with particle sizes of 500 nm to 900 nm was caught in the filter 3 and could be reprocessed. As a result, the olefin mixture 2.2.1 did not contain any suspended solids 2.3.

Figure 2:
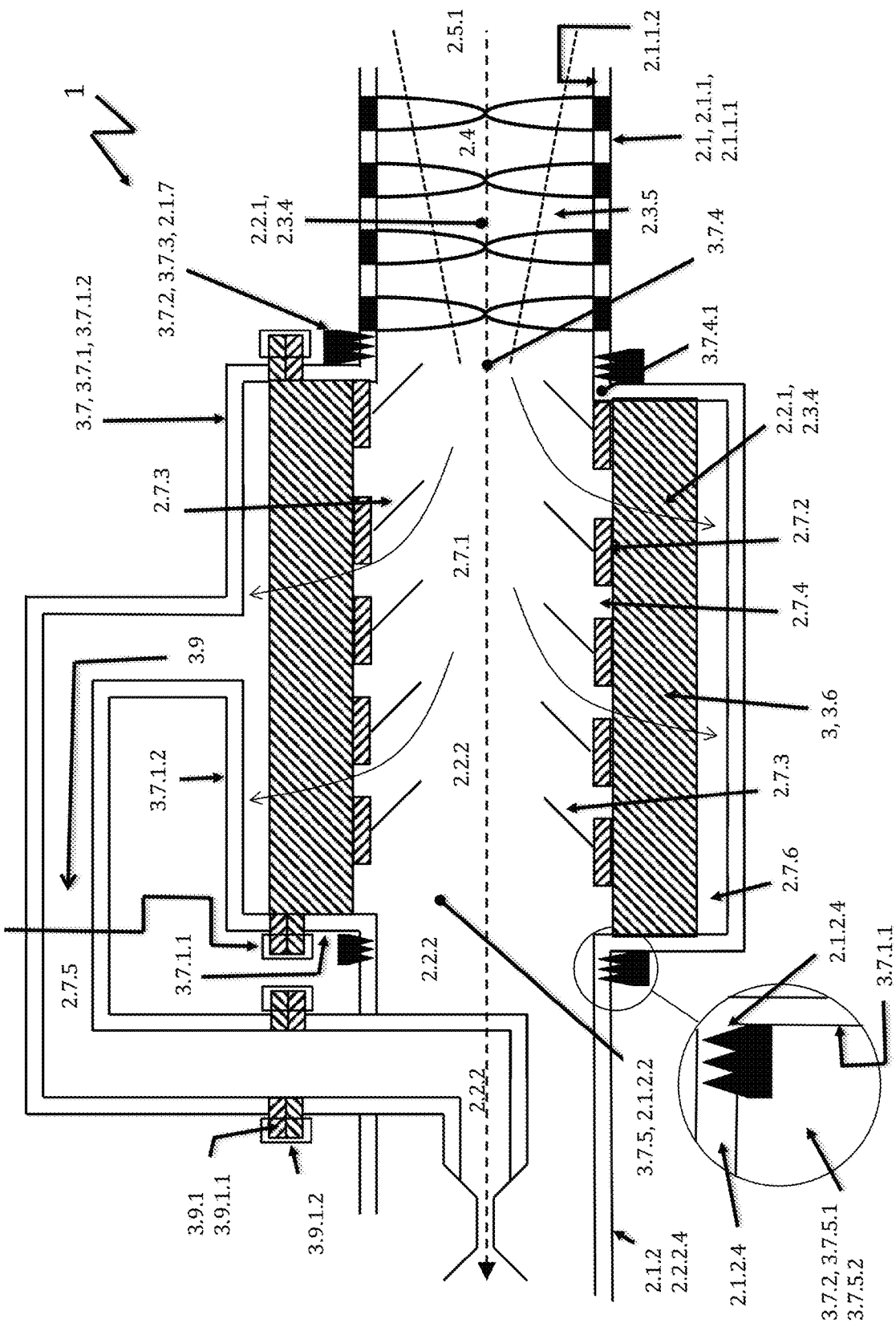
FIG. 2 a plan view of a longitudinal cut through a filter system 1 according to the invention with a pressure loss-free Venturi pipe section 2.7.1 and outlet openings for the fluid 2.2.1 of the cuff-shaped filter 3.6.
Figure 3:
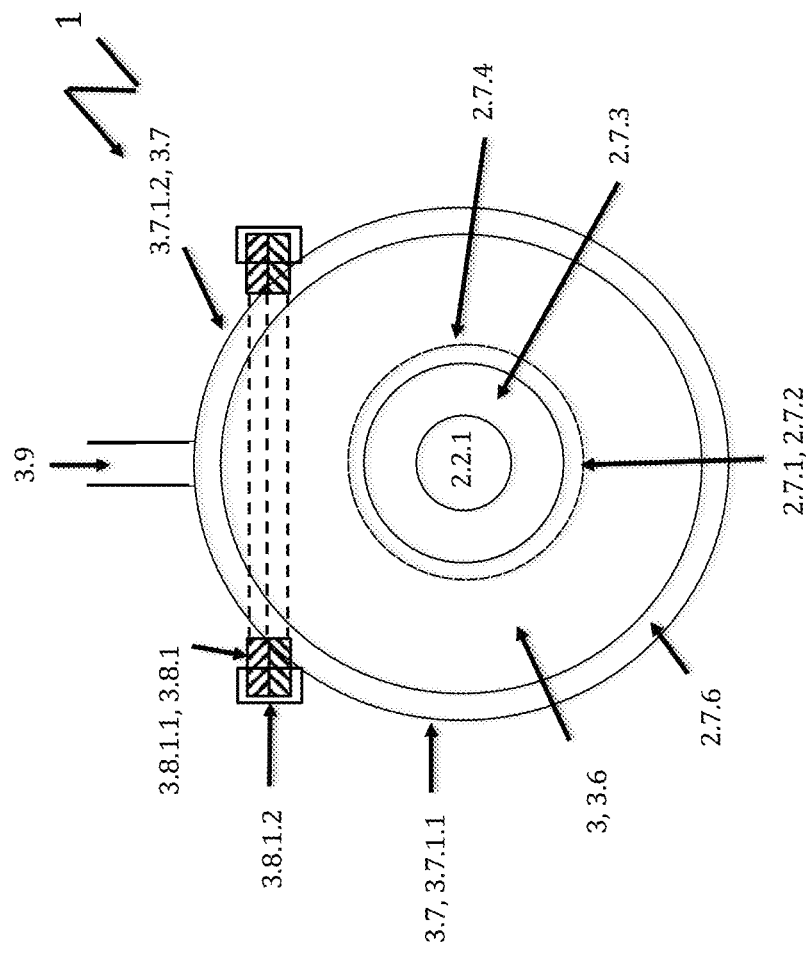
FIG. 3 a plan view of a cross-cut of the filter system 1 according to the invention, according to FIG. 2.
Figure 4:
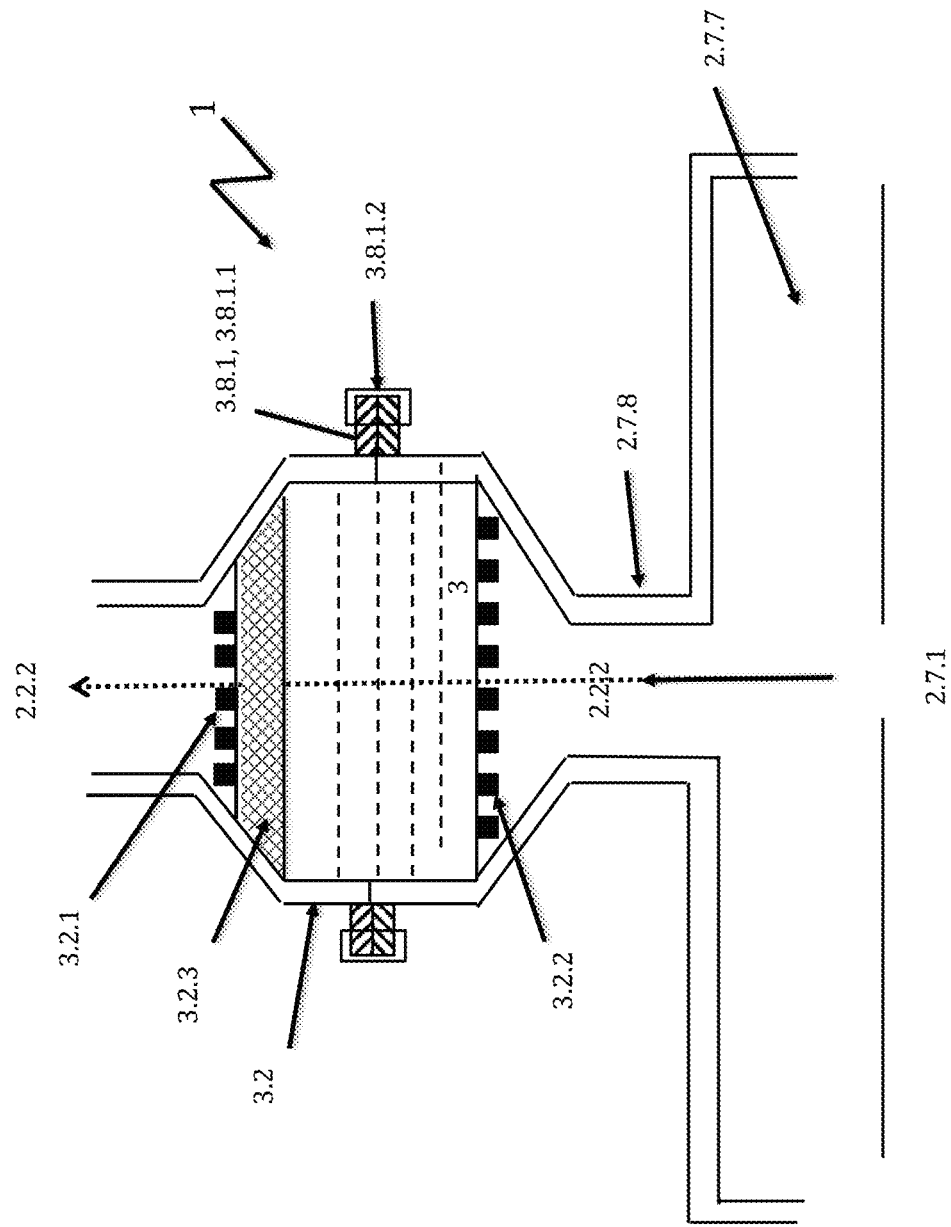
FIG. 4 a plan view of a longitudinal cut through a filter system 1 with a pressure loss-free Venturi pipe cut 2.7.1 and a collecting pipe 2.7.7 for supplying the fluid 2.2.1 to the filter 3.
Figure 5:
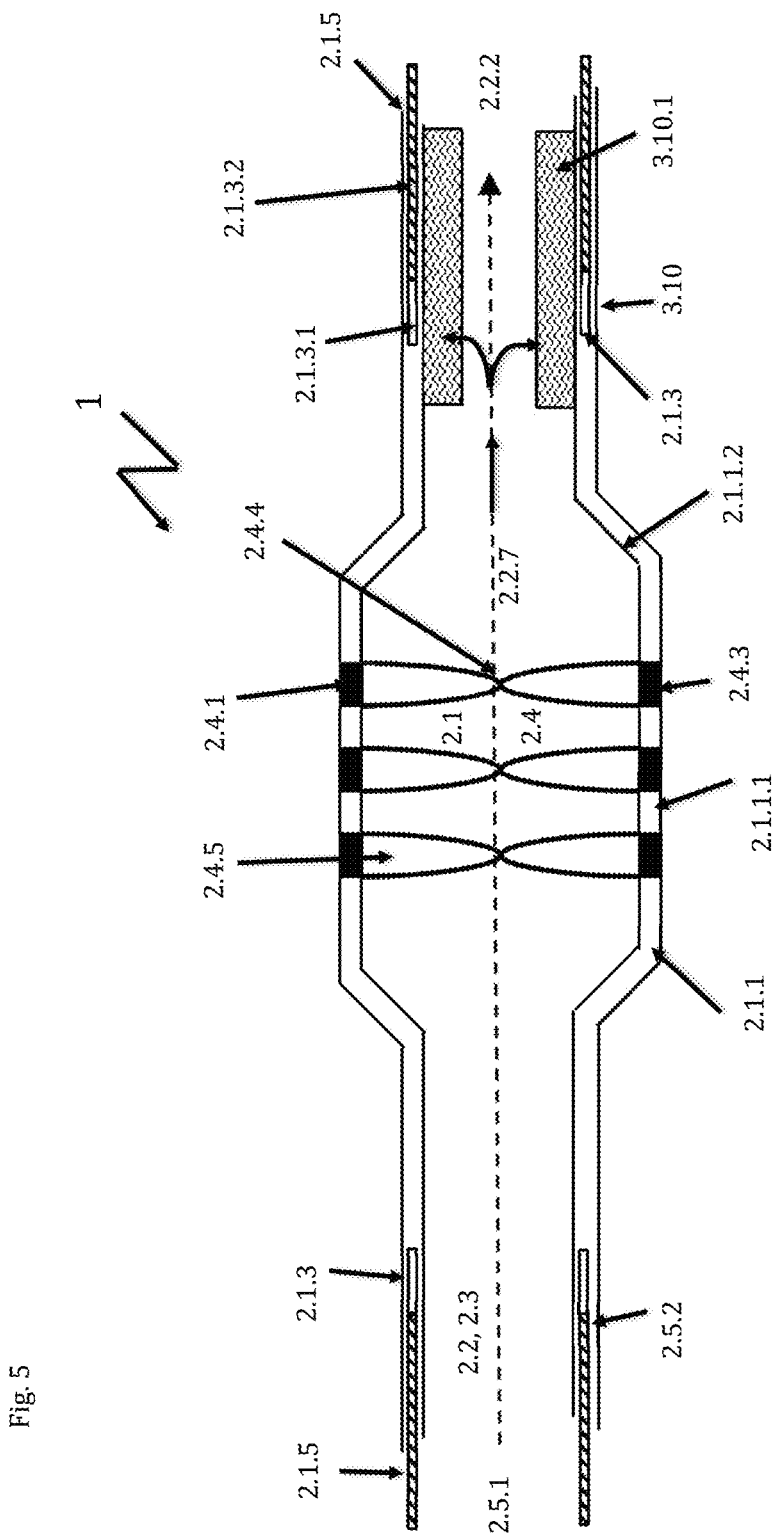
FIG. 5 a plan view of a longitudinal cut through a filter system 1 with clip-on connections and a tube filter 3.3 free of pressure loss.
Figure 6:
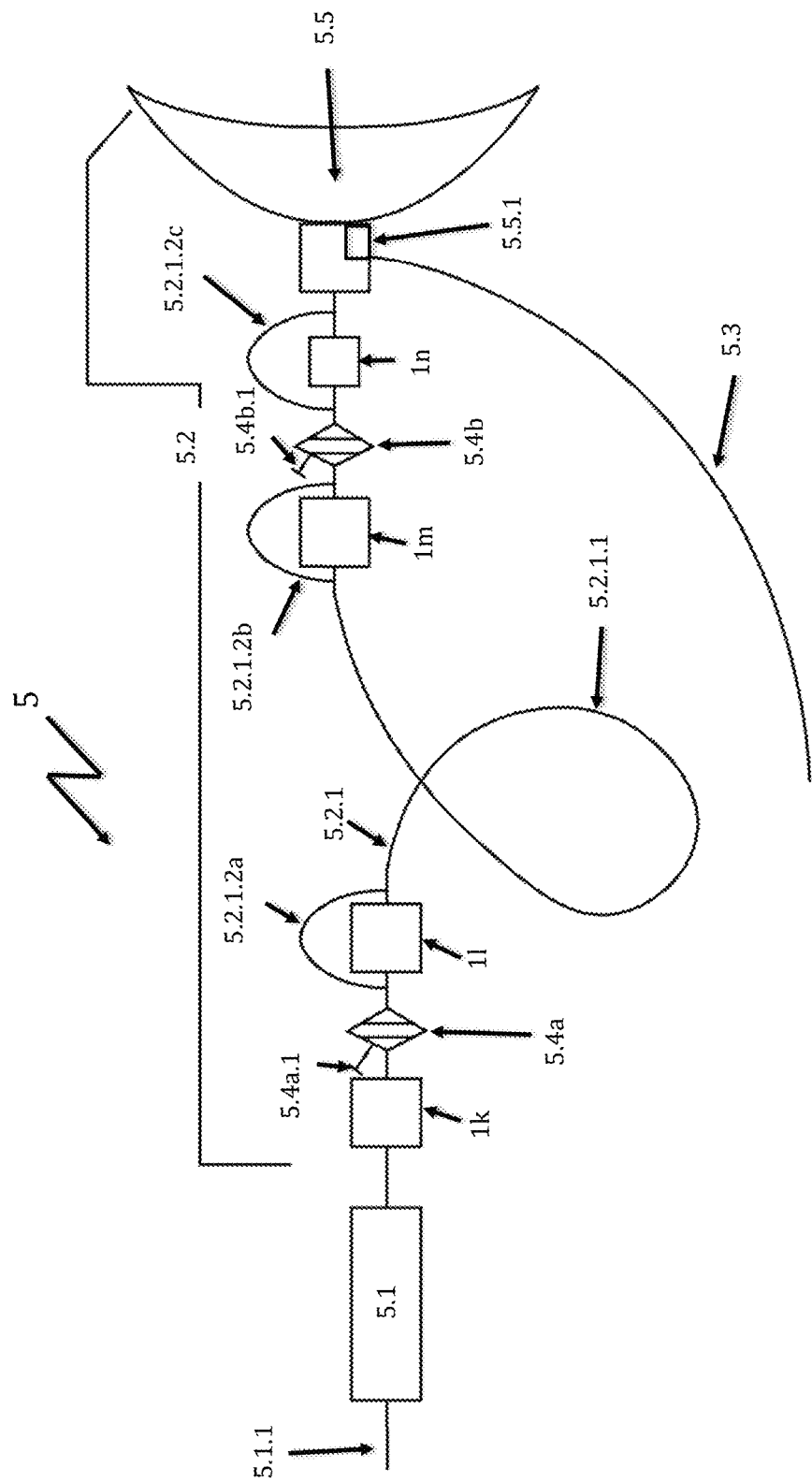
FIG. 6 a plan view of a block diagram of exhaust system for gasoline or diesel engines with installation positions 1a-1j of filter systems 1.
Figure 7:
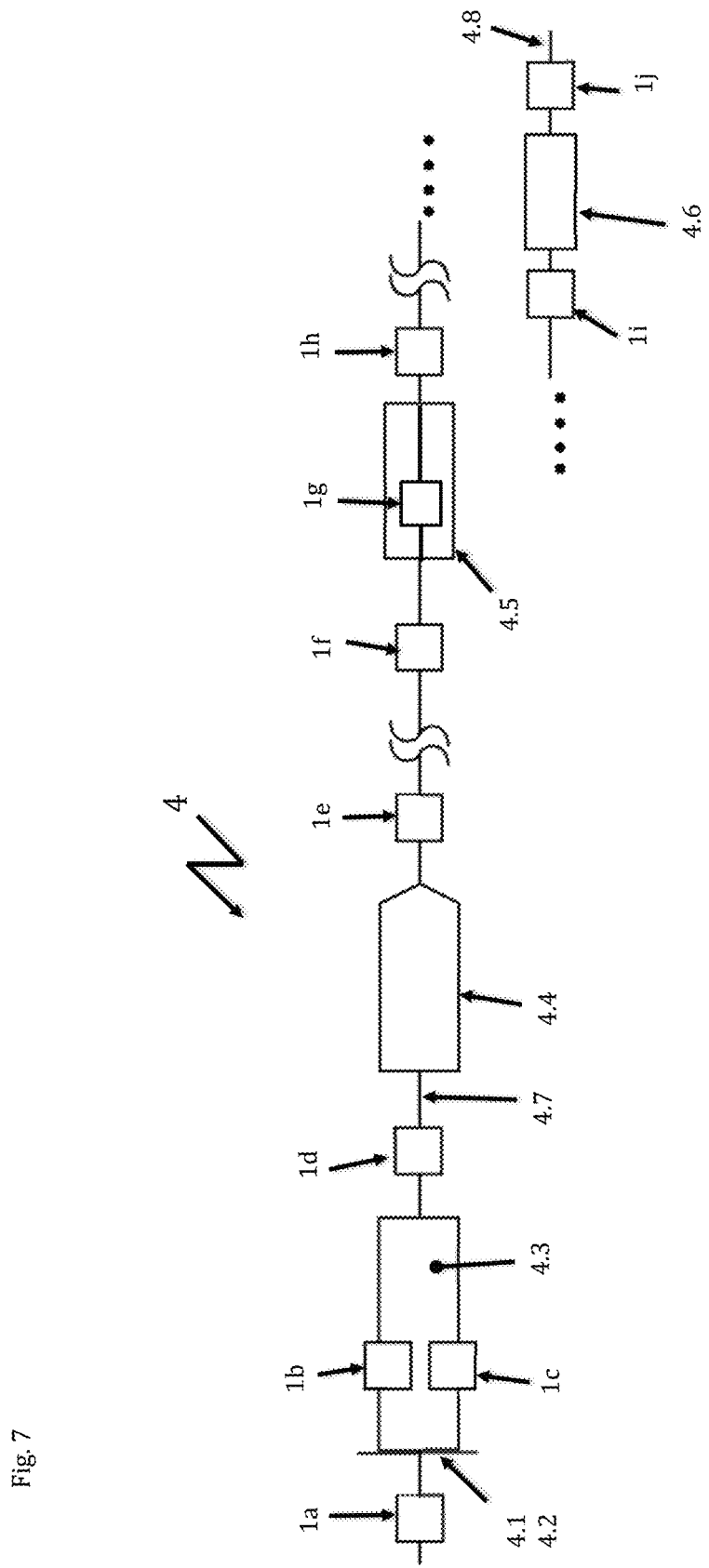
FIG. 7 a plan view of a block diagram of the medical respirator, ventilator or anesthesia machine 5 with installation positions 1k-1n for the filter systems 1.

FIGS. 2 and 3

Filter System 1 with a Low Pressure-Loss

It was essential for the embodiment of the filter system 1 according to the FIG. 2 that the flow tube 2.1 made of ABS according to FIG. 1 could be screwed at its end, as seen in the direction of flow 2.5.1, with an external thread 2.1.6 into the matching internal thread 3.7.2 around the inlet opening 3.7.3 for the entry of the airflow 2.2.1 into the pressure loss-free Venturi pipe section 2.7.1. The inlet opening 3.7.4 was located in the center of the vertical part 3.7.1.1 of the sleeve-shaped closed wall 3.7 around the filter 3.3. The sleeve-shaped wall 3.7 with a wall-thickness of 2 mm thus formed a cylindrical housing 3.7.1 with a length of 160 mm and a diameter of 160 mm. The sleeve-shaped wall, 3.7, the pressure loss-free Venturi pipe section 2.7.1 with a wall thickness of 2 mm, the extension 2.1.2 with a wall-thickness of 2 mm and the recirculation pipe 2.7.5 of the airflow 2.2.2, also with a wall thickness of 2 mm, were made of stainless steel.

A projecting, annular reinforcement 3.7.3 with a horizontal length of 15 mm and a thickness of 5 mm was arranged around the inlet opening 3.7.4 as a carrier for the internal thread 3.7.2 at the end of the flow pipe 2.1, viewed in the flow direction 2.5.1, so that the fluid-type abutment edge 3.7.4.1 "Venturi pipe section 2.7.1//End edge of the wall 2.1.1 of the flow pipe 2.1" was formed. This way, the pressure-loss-free Venturi pipe section 2.7.1 had also a clear span of 40 mm.

At the end of the pressure loss-free Venturi pipe section 2.7.1, as viewed in the flow direction 2.5.1, there was also arranged a protruding, annular reinforcement 3.7.5.1 of a horizontal length of 15 mm and a thickness of 5 mm around its outlet opening 3.7.5. It was used to accommodate the internal thread 3.7.5.2, into which the external thread 2.1.2.1 was screwed around the inlet opening 2.1.2.2 of the extension 2.1.2. As a result, another fluid-type abutment edge 2.1.2.3 "Edge of the wall 2.1.2.4 of the extension 2.1.2// Venturi pipe section 2.7.1 without pressure loss" was formed. Therefore, the extension 2.1.2 also had a clear span of 40 mm. It was 120 mm long and blew the filtered air 2.2.2 into a cleanroom.

The removable part 3.8 of the device for removing the cuff-shaped filter 3.6 comprised the fluid connection of the chimney 3.9 to the recirculation pipe 2.7.5. The chimney 3.9 had a clear span of 30 mm and was arranged vertically and centrally on the horizontal part 3.7.1.2. Its longitudinal axis formed an angle of 90° with the longitudinal axis of the Venturi pipe section 2.7.1 free of a pressure loss. The length of the chimney 3.9 was 40 mm, and went into a pipe bend 2.7.5.1 with a clear span of 30 mm as a part of the recirculation pipe 2.7.5 for the filtered air 2.2.2. The pipe bend 2.7.5.1 of the recirculation pipe 2.7.5 bent vertically downwards at a distance of 40 mm from the vertical part 3.7.1.1 of the wall 3.7 (vertical part 2.7.5.2), broke through the wall 2.1.2.4 of the extension 2.1.2 in a fluid-tight manner and form a further bend 2.7.5.3 into the horizontal, so that the central axis of the horizontal part 2.7.5.4 of the recirculation pipe 2.7.5 was congruent with the longitudinal axis of the extension 2.1.2. The horizontal part 2.7.5.4 had a length of 30 mm and merged into the Venturi nozzle 2.7.5.1 as an outlet opening.

The removable part 3.8 of the device was 20 cm deep and had a rectangular floor plan. It was connected to the rest of the cylindrical housing 3.7.1 with the circumferential flange connection 3.8.1 with the elastomeric seal 3.8.1.1 made of polybutadiene. The circumferential flange connection 3.8.1 was fixed in a fluid-tight manner with clamps 3.8.1.2 encompassing the flange connection 3.8.1. When the removable part 3.8 of the device was removed, the used cuff-shaped filter 3.6 could be replaced by a fresh one.

The material of the cuff-shaped filter 3.6 wrapped itself practically seamlessly around the pressure loss-free Venturi pipe section 2.7.1. This was achieved in that the abutting edges of the filter material 3.6 were designed as a pin-and-groove connection 3.6.1. The vertical sides of the cuff-shaped filter 3.6 rested firmly against the vertical parts 3.7.1.1, so that the airflow 2.2.1 had to make its way through the filter 3.6. The filter 3.6 had a thickness of 50 mm. As a result, the circumferential collecting gap 2.7.6 with a clear span of about 10 mm was formed between the surface of filter material 3.6 and the horizontal part 3.7.1.2 of the wall. The collecting gap 2.7.6 was used to collect and feed the filtered air 2.2.2 to the chimney 3.9.

The pressure loss-free Venturi pipe section 2.7.1 had a fluid-permeable wall. 2.7.2. As seen in the flow direction 2.5.1, the first ring of an outlet openings 2.7.4 encircling the fluid-permeable wall had a diameter of 3 mm and was arranged 20 mm behind the abutting edge 3.7.4.1. The outlet openings 2.7.4 were spaced about 1 mm apart so that in the circumferential ring 31 outlet openings 2.7.4 were arranged one behind the other. The next nine rings of outlet openings 2.7.4 were arranged at a distance of 10 mm from one another, as seen in the flow direction 2.5.1. In front of the first circumferential ring of outlet openings 2.7.4, as seen in the flow direction 2.5.1, a first annular, circumferential adjustment plate 2.7.3 with a width of 20 mm was arranged at an angle of 60° against the flow direction 2.5.1. The additional nine adjustment plates were attached to their base 5 mm in front of the next ring of outlet openings 2.7.4. This configuration resulted in a flow channel 2.4 with a diameter of 10 mm.

By means of the adjustment plates 2.7.3, the particles 2.3.4 in the air 2.2.1 flowing at a speed of about 60 m/sec, with a particle size of 800 nm to 300 μm and a specific particle number N/Vt >99.8% were steered into the outlet openings and intercepted by the cuff-shaped filter 3.6. The airstream 2.2.2 freed from the particles 2.3.4 was passed through the extension 2.1.2 directly into a cleanroom.

The following filter materials were tested:
Medium-filter, smallest filterable particle size: 300 nm, and
Automobile interior filter, smallest filterable particle size: 500 nm.

The filtered air 2.2.2 which had flowed through the filter 3.6, entered the circumferential collecting gap 2.7.6, and was directed to the chimney 3.9 which was part of the recirculation pipe 2.7.5. The collected and recirculated filtered air 2.2.2 was introduced into the extension 2.1.2 as described above.

The air 2.2.2 purified in this way had a specific particle number of $<0.04/m^3 \cdot h$.

The structure of the embodiment of the filter system 1 according to the FIG. 2 is illustrated once again with the aid of the plan view of a cross-cut through the filter system along the section.

AB.

The filter system 1 could be supplied computer controlled with electricity.

FIG. 4 with FIGS. 2 and 3 (in Part)

Filter System 1 with a Low Pressure-Loss

The structure of the filter system 1 according to the FIG. 4 corresponded essentially to the structure of the filter system 1 according to the FIGS. 2 and 3, except that part of the airflow 2.2.1 with the particles 2.3.4 from the circular outlet openings 2.4.7 entered a circumferential collecting gap 2.7.7, which conducted the airflow 2.2.1 via a collecting pipe 2.7.8 to the disc-shaped filter 3 with a thickness of 100 mm and a diameter of 150 mm in the filter housing 3.2. The filter 3 was mounted on a perforated plate 3.2.1.

The filtered air 2.2.2 was blown into an air conditioning system via outlet opening 3.3, 3.4.

In a further embodiment, a coarse filter 3.2.3 was arranged on top of the filter 3, which caught any residues emerging from the filter 3 if necessary.

The coarse filter 3.2.3 was secured by the perforated plate 3.2.2.

FIGS. 5 and 6

Sterilizable Filter System 1 for Medical Devices

The filter system 1 according to the FIG. 5 was 250 mm long. Its closed wall 2.1.1 was 6 mm and consisted of sterilizable polyether sulfone (Ultrason™ E from BASF). The airstream 2.2 with suspended matter 2.3 was conveyed through the 14 mm long inlet pipe with a clear span of 15 mm into the flow channel 2.4. The inlet pipe 2.5.2 had a centrally encircling annular gap 2.1.3 with a clear span 2.1.3.1 of 3 mm as a clip-on connection 2.1.5 for a plastic hose 2.1.3.2. At the end of the inlet pipe 2.5.2, the clear span 2.1.4 of the flow channel 2.4 widened conically over distance of 15 mm to 40 mm and, after a distance of 70 mm, tapered off again over a distance of 20 mm to a clear span of 15 mm and merged into the 110 mm long outlet pipe 3.10.1 with the pressure-loss-free tube filter 3.10. The pressure-loss-free tube filter 3.10.1 consisted of loose fabrics made of high-purity, cellulose threads with a particle size of 600 nm to 100 μm which fitted closely to the inner wall of the outlet pipe 3.10.1 and caught the particles 2.3.4 of a particle size of 600 nm to 100 μm, so that a filtered airflow 2.2.2 with a specific number of particles N/Vt below the detection limit exited. The outlet pipe 3.10 had also a circumferential annular gap 2.1.3 with a clear span 2.1.3.1 of 3 mm as a clip-on connection 2.1.5 for a plastic hose or a metal pipe.

The flow channel 2.4 had a square cross-section. Into its two horizontal closed walls 2.1.1 and its two vertical closed walls 2.1.1, 2 pairs of associated piezoelectric ultrasonic exciters 2.4 of the MCUSD14A40S0RS type from multicomp were glued-in fluid tight with polydimethylsiloxane adhesive so that they were exactly planar with the inside 2.1.1.2 of the closed wall 2.1.1 of the flow tube 2.1.

The filter system 1 according to FIG. 5 were outstandingly suitable for medical devices, in particular for ventilators or as an anesthesia device 5. FIG. 6 shows the diagram of such a ventilator 5.

The filter systems 1 according to FIG. 5 could be inserted into the installation positions 1*k* to 1*n* of an inspirator 5.2. For example, a filter system 1*k* could be inserted behind the air metering device 5.1 and in front of the ventilation filter 5.4*a*, as seen in the flow direction 2.5.1. Another filter system 1 could be inserted behind the ventilation filter 5.4*a* and in front of the ventilation hose 5.2.1 with a goose gargle

5.2.1.1. If necessary, the filter system 1l could be circumvented by a bypass1 5.2.1.2a. This was particularly the case when anesthetics and drugs were fed to the ventilation filter 5.4a via the dosing connection 5.4a.1 and nebulized. An additional filter system 1m could be installed after the goose gargle 5.2.1.1 and in front of the ventilation filter 5.4b. The filter system 1m could also be bypassed by the bypass2 5.2.1.2b during the supply of anesthetics and pharmaceuticals by the dosing connection. 5.4b.1 into the ventilation filter 5.4b. The third filter system 1n could be installed behind the ventilation filter 5.4b and before the connection pipe 5.5.1 for the breathing mask 5.5 in the expirator 5.3. The filter system 1n could also be bypassed by the bypass3 5.2.1.2c.

The filter systems 1k-1n could be controlled and supplied with power using built-in chips and power packs.

With the ventilator or the anesthesia device 5, particularly critical cases of patients could be ventilated with high-purity ear, the risk of contamination with microorganisms and allergens being effectively eliminated. Another advantage of the filter system 1 according to the Figure was that it could be combined with customary and known inline humidification units (heat and moisture exchange units, HME) and/or active humidifiers so that patients could be ventilated with humidified air at body temperature.

FIG. 7

The Equipment of Exhaust Systems 4 with Filter Systems 1

To solve exhaust gas problems, high-temperature-stable filter systems 1 made of stainless steel, for example with the structure shown in the FIG. 1 him or the FIGS. 2 and 3, could be used. As filter materials for the filters 3, fabric made of ceramic threads or metal threads were used. These filter systems could be installed in the installation positions is to 1j in the exhaust systems 4. In detail, the filter system 1a was installed behind the connection 4.1 of the exhaust system 4 on the gas line engine or behind the soot filter and the connection 4.2 and the exhaust system 4 on a diesel engine. Furthermore, the filter system 1b and 1c could be installed in the two pipes of the Y-pipe 4.3 and the catalytic converter 4.4. In addition, the filter system 1e and 1f could be installed in the pipe 4.7 between the catalytic converter 4.4 and the front silencer 4.5. The front silencer 4.5 could also include the filter system 1g. Furthermore, the filter system 1h and 1i could be inserted in front of the exhaust outlet 4.8.

The filter systems 1a to 1j could be supplied with power individually and computer-controlled from the vehicle's, electrics and electronics.

By means of such exhaust systems 4, the engine exhaust gases 2.2 could be cleaned to such an extent that they were practically free of suspended matter 2.3 and NOx and ammonia.

FIG. 8

Respiratory Protection Masks 6 with Filter Systems 1

Figure 8:
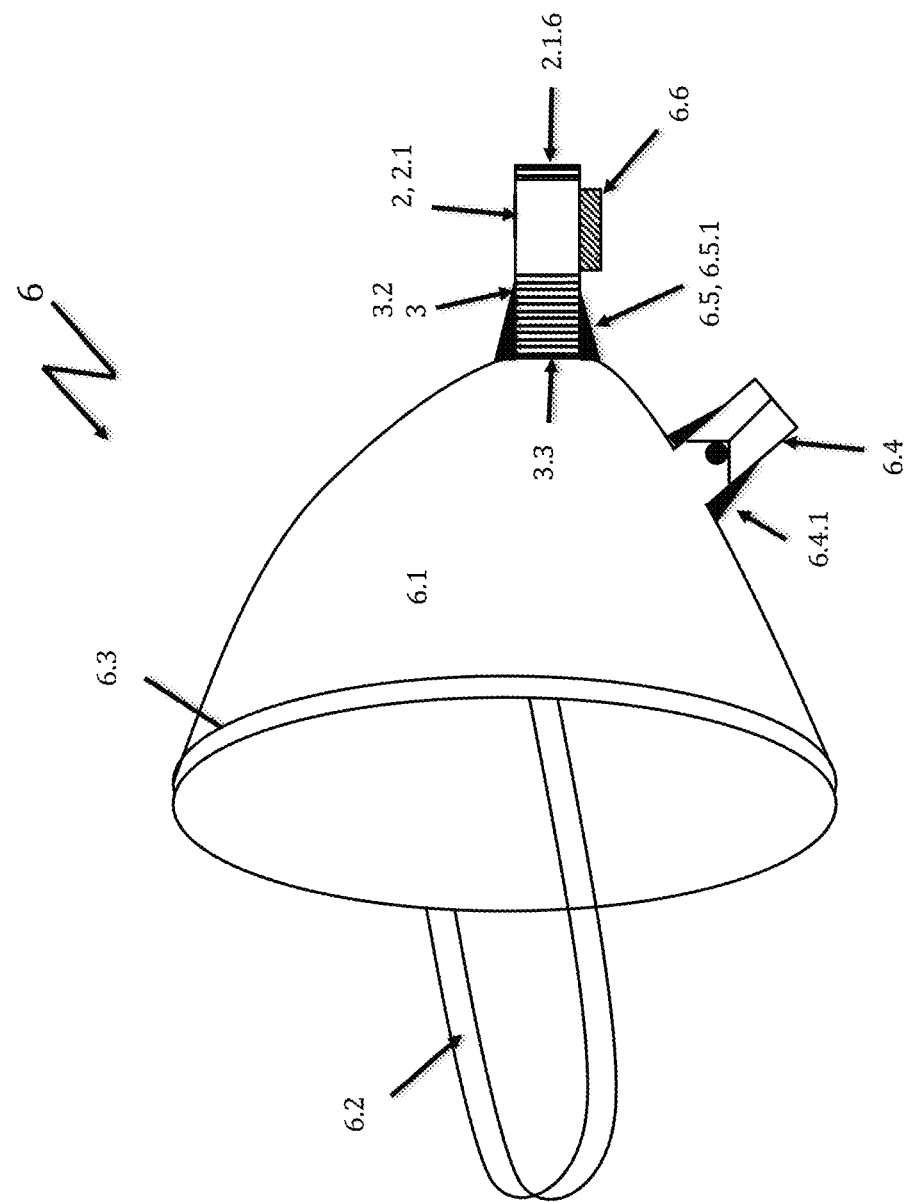
FIG. 8 a perspective view of a breathing mask 6 with a filter system 1 as an inspirer and an expirer with a check valve 6.4.1.

The respirator protection masks 6 according to FIG. 8 comprised an air-permeable mouth and nose cover made of materials such as thermoplastics, elastomers or impregnated fabrics. The breathing mask 6 could be attached to the heated with a flexible holder 6.2. For better adaption to individual faces, the mouth and nose cover 6.1 contained a flexible edge 6.3 made of soft elastomers. The filter system 1 with a clip-on holder 6.5 made of hard rubber, which holder was attached to a reinforcing ring 6.5.1, was fastened at mouth and nose level. The filter system 1 had—as shown in principle in FIG. 1—a pre-filter 2.1.6, a device 2 with a flow pipe 2.1 for reducing the specific particle numbers N/Vt of hard-to-filter suspended matter 2.3 and the fluid connection 2.7 of the flow pipe with the replaceable filter 3 in the filter housing 3.2 with an outlet opening 3.3 for the filtered air 2.2.2. A light, rechargeable power pack 6.6 was also attached to the filter system as an energy source for the ultrasonic exciter and receiver 2.4.1. The exhalation took place via an expirator 6.4 with a check valve 6.4.1.

In particular, the respiratory protection masks 6 provided an effective protection against infections with microorganisms such as bacteria and fungi and against infections with viruses.

Figure 9:
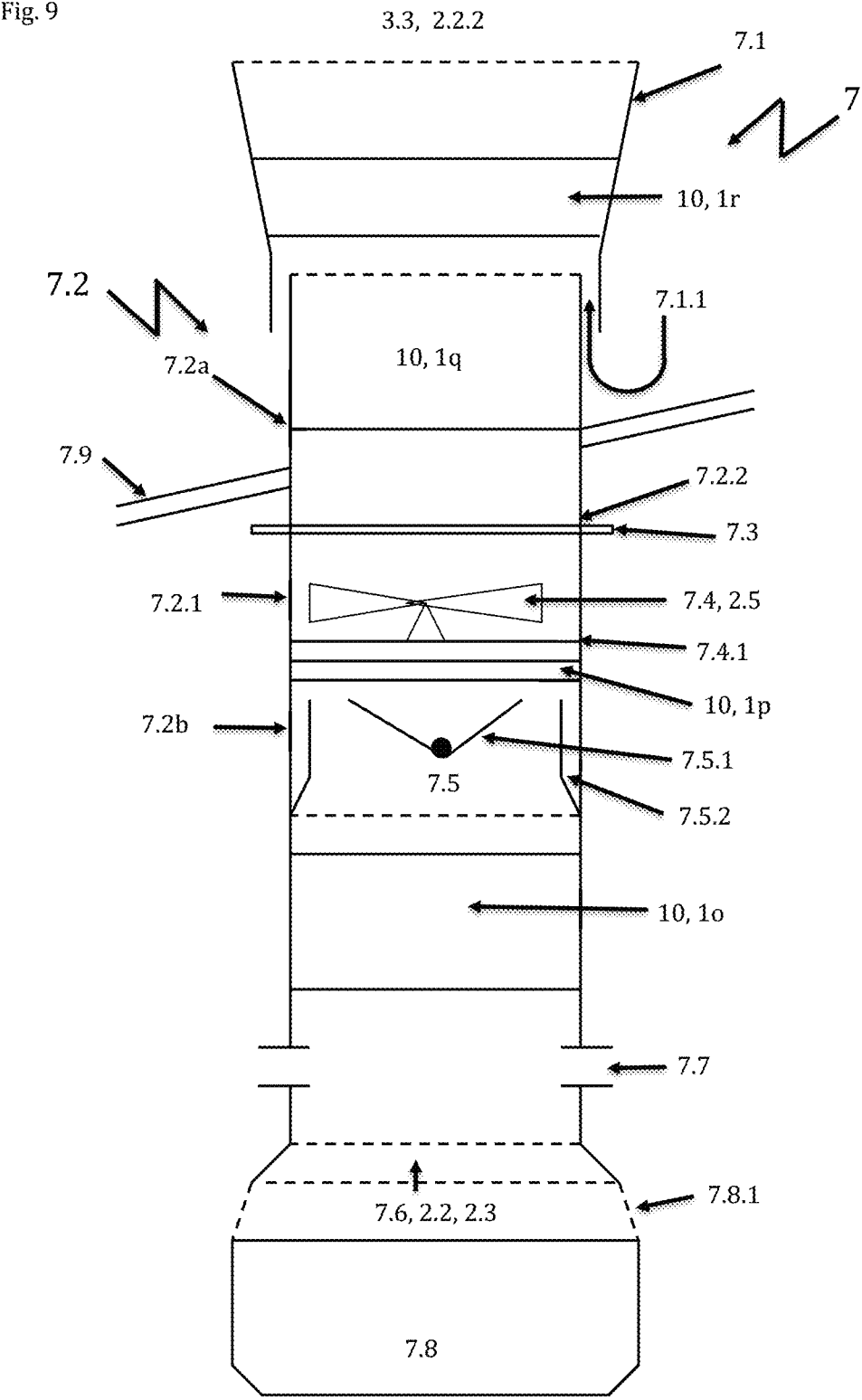
FIG. 9 the plan view of a longitudinal cut through a barn ventilation chimney 7 with installation positions 1o-1s for the filter systems 1.
Figure 12:
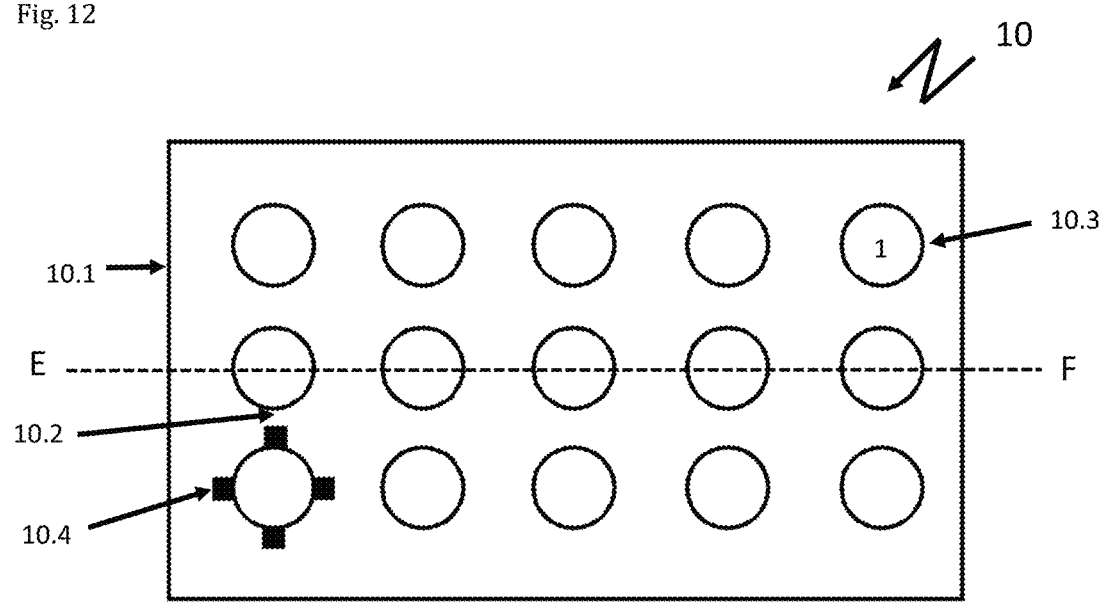
FIG. 12 a plan view of a cross-cut through a rack frame 10 as a holder of filter systems 1.
Figure 13:
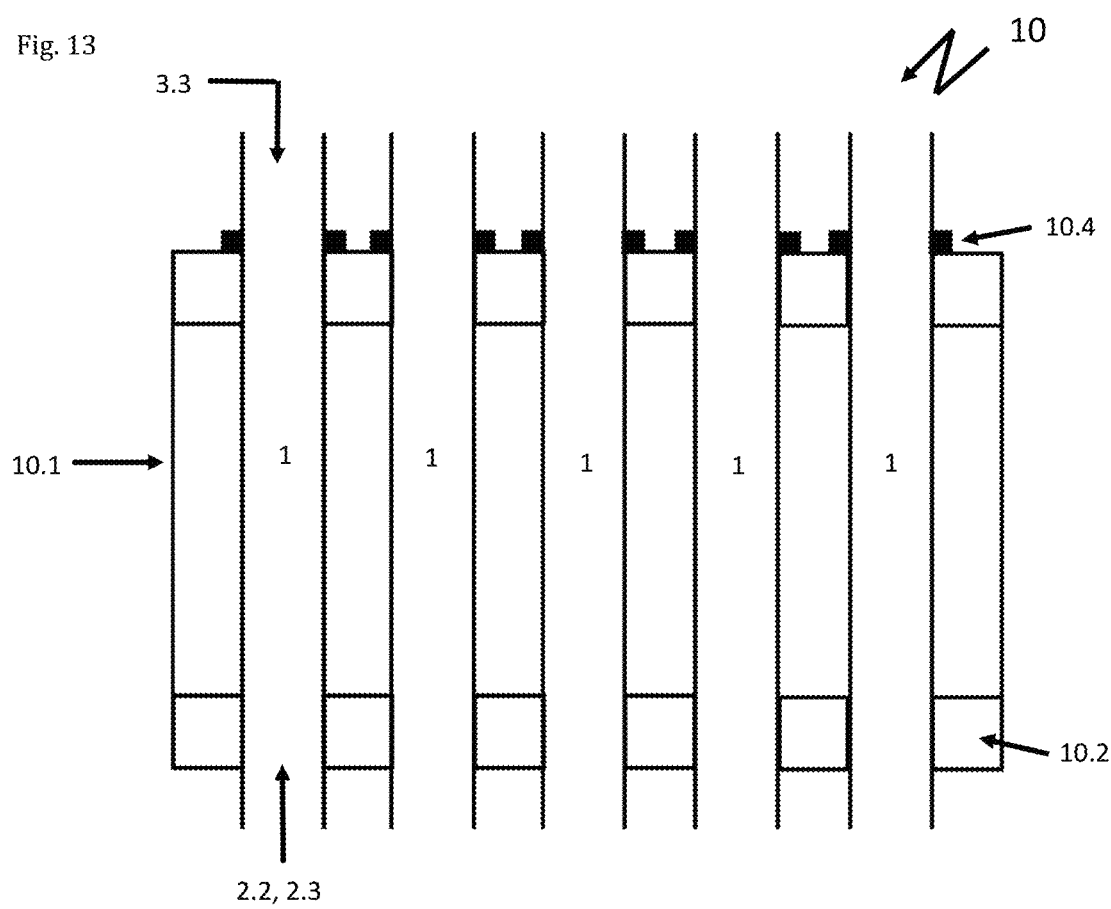
FIG. 13 a plan view of a longitudinal cutalong the cutting line C-D through the rack frame 10 of FIG. 12.

FIG. 9 in Conjunction with the FIGS. 12 and 13

Barn Ventilation Chimney 7 with Filter Systems 1

The barn ventilation chimney 7 according to FIG. 9 had a diffuser 7.1 with an outlet opening 3.3 for the filtered air 2.2.2 free of suspended matter and ammonia, as viewed from the top of to the bottom, i.e., counter to the flow direction 2.5.1. Moreover, the diffuser 7.1 also had an annular entry 7.1.1 for atmospheric air in order to increase the suction effect of the diffuser 7.1. A ventilation pipe 7.2, with an upper part 7.2a and the lower part 7.2b with non-insulated pipe walls 7.2.1 was arranged under the diffuser 7.1. The lower part 7.2b was located below the roof 7.9 and was connected to the upper part 7.2a on the plug-in connection 7.2.2 which was fastened with a pipe clamp 7.3. A motor-driven horizontal fan 7.4 was fastened with a fastening strut 7.4.1 below the plug-in connection 7.2.2. Ventilation flaps 7.5 with flap blades 7.5.1 and air openings 7.5.2 were arranged below the fan 7.4. The barn air 2.2 contaminated with suspended matter 2.3 and ammonia entered the barn ventilation chimney 7 at the air inlet nozzle 7.6. The airflow 2.2, 2.3 was reinforced from time to time by lateral flow nozzles 7.7. Below the inlet nozzle 7.6, the water collecting pan 7.8 was arranged on detachable retaining chains 7.8.14 for collecting condensation water.

According to the invention, frames or racks 10 similar to the FIGS. 12 through 13 were arranged in the barn ventilation chimney 7 at the installation locations 1o to 1r, but in a cylindrical shape with a circular cross-section and the vertical outer wall 10.1. The rack frames 10 also had an upper and lower horizontal web 10.2 with circular openings 10.3 for receiving and holding filter systems 1 according to the FIG. 1. The filter systems 1l thus were arranged in the barn ventilation chimney 7 vertically to the flow direction 2.5.1, i.e. the outlet openings 3.3, as viewed in the flow direction 2.5.1, were at the top in the direction of the diffuser 7.1. Here and in the devices 10 and 11 described below, closable flaps were arranged at the respective installation positions in the walls through which the rack frames 10 could be pushed into the devices 10 and 11 (not shown).

The individual filter system 1 in the frame 10 could be controlled individually electrically and electronically. For example, with low levels of ammonia-containing air 2.2, 2.3, i.e. when the cattle barn was only partially occupied, only the filter system 1 in one or two rack frames 10—for example, the rack frame 10 at the installation position 1o and/or the rack frame 10 at the installation position 1q—could be controlled and provided with electricity.

An additional advantage was that with the help of barn ventilation chimneys 7 the humidity in animal barns could be kept at a comfortable level for the animals.

FIG. 10

Thermally Insulated Barn Ventilation Chimney 8

Figure 10:
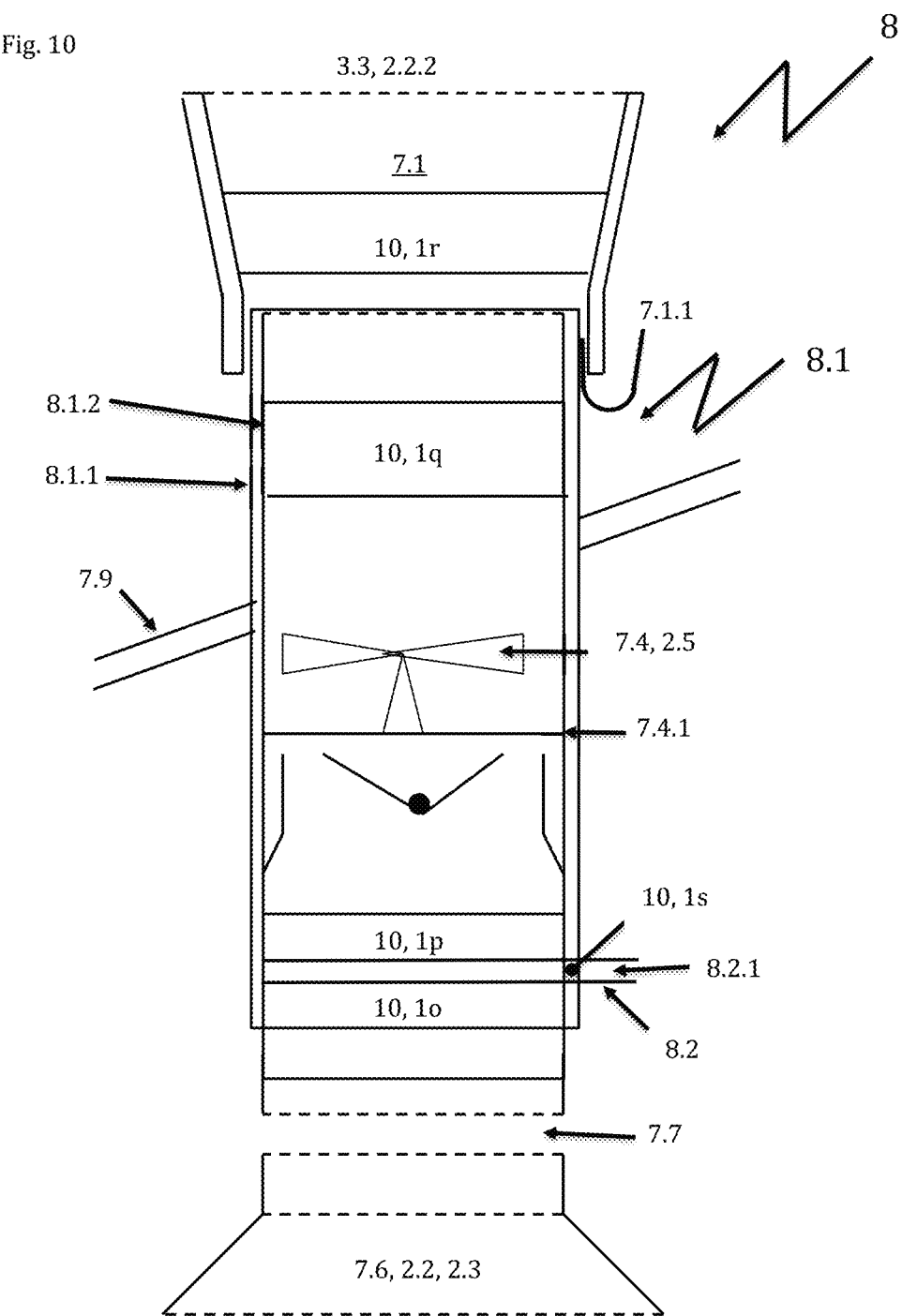
FIG. 10 a plan view of the longitudinal cut through a further embodiment of a barn ventilation chimney 8 with installation positions 1o-1s for the filter systems 1.

In its construction, the thermally insulated barn ventilation chimney 8 according to the FIG. 10 was similar to the non-insulated barn ventilation chimney 7 according to the FIG. 9 with the difference that the pipe wall 8.1.2 of the insulated ventilation pipe 8.1 was provided with the insulation 8.1.1 made of non-combustible foam cement according to the German patent application DE 10 2016 012 746.5 and that the barn ventilation chimney 8 at the installation position 1s comprised an air supply line 8.2 for the supply of roof space air 8.2.1. As a result, the formation of condensation in the thermally insulated barn ventilation chimney 8 could be effectively prevented. Another advantage was that with the help of the barn ventilation chimneys 8 the humidity in animal barns could be kept at a comfortable level for the animals.

FIG. 11

Circulating Air Cleaner 9 in the Animal Barn

Figure 11:
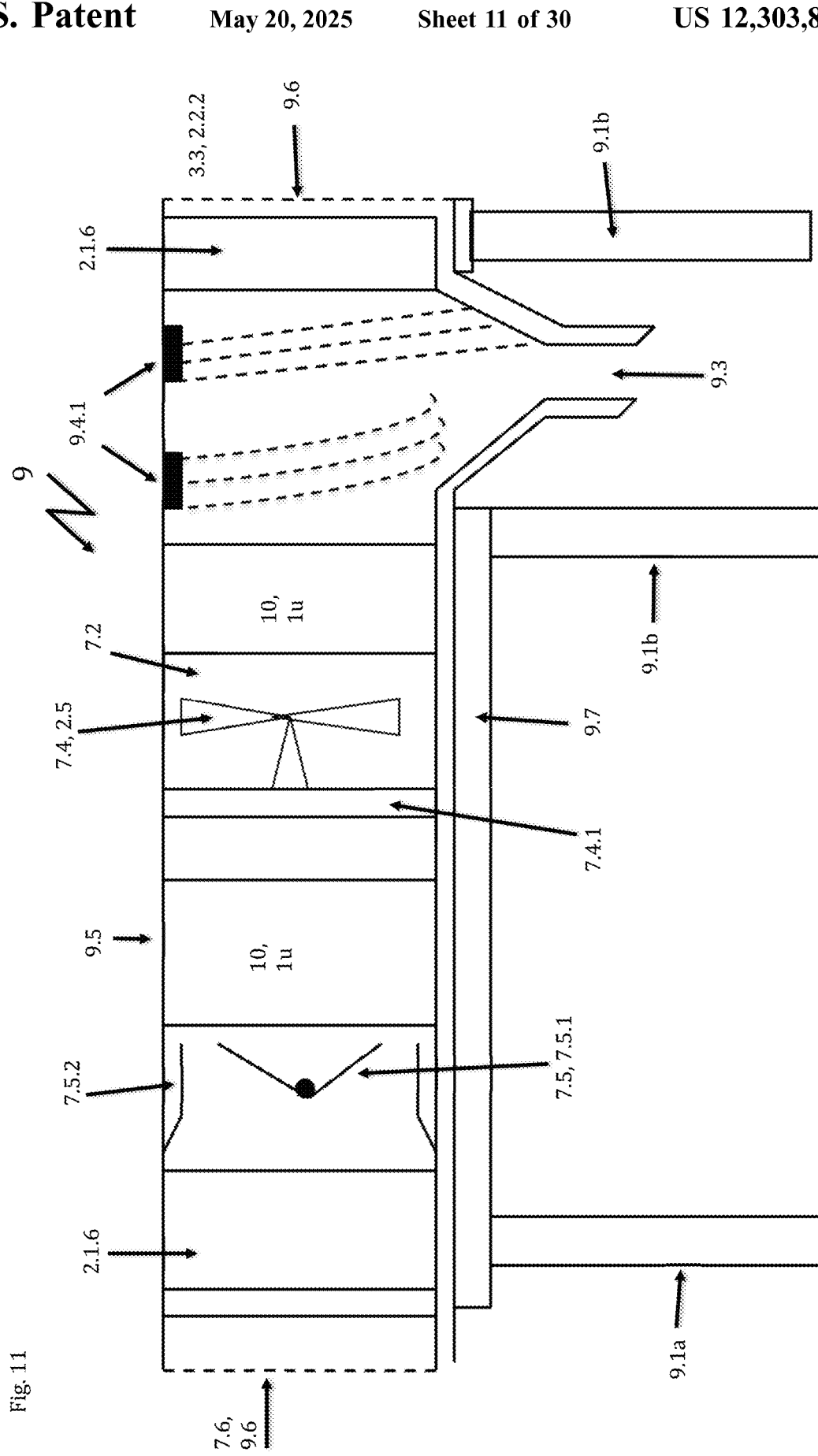
FIG. 11 a plan view of a longitudinal cut through a horizontally mounted air cleaner 9 in an animal barn with the installation positions 1t-1v for the filter systems 1.

The 5 m long circulating air cleaner 9 with a clear span of 1 m according to FIG. 11 was mounted essentially horizontally with a slight incline on two long pedestals 9.1a and four short pedestals 9.1b and an associated, horizontal, trough-shaped support 9.7. The pedestals 9.1a and 9.1b as well as the support 9.7 were vibration-dampened (not shown) so that the animals were not disturbed by unusual noises. The load-bearing components of the circulating air cleaner 9, in particular the 5 mm thick wall 9.5, were made of stainless steel because of the corrosive atmosphere in the animal barn. The wall 9.5 had a sound-absorbing coating made of acoustic foam (not shown). The circulating air cleaner 9 comprised, as seen in the flow direction 2.5, an air inlet opening 7.6, which was protected by a perforated plate 9.6, and a pre-filter 2.1.6 against the ingress of course materials such as parts of feed, straw or husks. The rack frames 10 described in the FIG. 9 with the horizontally mounted filter system 1 according to FIG. 1 were installed at the installation positions 1t to 1v. The airflow 2.2 with the suspended particles 2.3 was conveyed through the circulating air cleaner 9 with the aid of an electrically driven, vertically mounted fan 7.4 attached to a vertical fastening strut 7.4.1 as a conveyor device for the air streams 2.2, 2.2.1 and 2.2.2. The airflow was regulated via the ventilation flaps 7.5 with the flap blades 7.5.1 in the air openings 7.5.2. Here, too, the filter systems 1 could be individually supplied with electricity. Behind the last installation position 1v, several transverse vertical drainage nets. 9.4 with a round circumference made of polyethylene threads were fastened using the semicircular fastening clamp rings 9.4.1. They increased the dripping of the condensation water carried along with the airstream 2.2.2. The condensation water flowed in the ventilation pipe, 7.2 through a water drainage channel line 9.2 into a water drainage pipe 9.3 and could be collected for further use or for disposal. The outlet 3.3 of the ventilation pipe 7.2 was protected from undesired ingress of coarse particles by an outlet filter 2.1.6 and another perforated plate 9.6.

Due to the circulating air cleaner 9, the concentration of suspended matter 2.3 and noxius substances, in particular, ammonia, in the barn could be kept permanently low. This protected the animals from infections so that they stayed healthy and grew faster. In addition, the humidity could be kept at a comfortable level for the animals.

FIGS. 12 and 13

The Rack Frame 10

The cylindrical rack frames 10 have already been described above in conjunction with FIG. 9. The FIGS. 12 and 13 now show box-shaped or cuboid rack frames 10. As the plan view from above in FIG. 12 shows, the rack frame 10 comprised a vertical outer wall 10.1 and a horizontal web or web plate 10.2 with round openings for receiving and holding filter systems 1 according to FIG. 1. The longitudinal cut along the cutting line CD in FIG. 13 again clarifies the structure of the rack frame 10 with an upper and lower web plate 10.2 and the protruding brackets 10.4 attached to the outside of the filter systems 1.

The rack frame 10 is preferably made of impact-resistant plastics such as ABS.

FIGS. 14 and 15

Box-Shaped Receiving Device 11 for the Rack Frame 10

In order to be able to install the box-shaped rack frame 10 according to the FIGS. 13 and 14 in the ventilation pipe, 7.2, or another pipe with a round, oval, elliptical, or otherwise shaped pipe wall 7.2.1, the box-shaped receiving device according to FIGS. 14 (longitudinal section) and 15 (perspective view) was installed in the ventilation pipe 7.2. The box-shaped receiving device. 11 had three vertical walls 11.1. A lockable, vertical service door 11.2 with the door leaf 11.2.1 and door hinges 11.2.2 was arranged on the other vertical side. The top was formed by a circumferential ceiling 11.4 and the underside by a circumferential floor 11.3. In the frame 10, the filter systems 1 according to the FIG. 1 were arranged in the flow direction 2.5.1, so that the air 2.2.2 escaped from their outlet openings 3.3.

The box-shaped receiving device 11 made it possible to easily replace the rack frame 10 if necessary.

Figure 16:
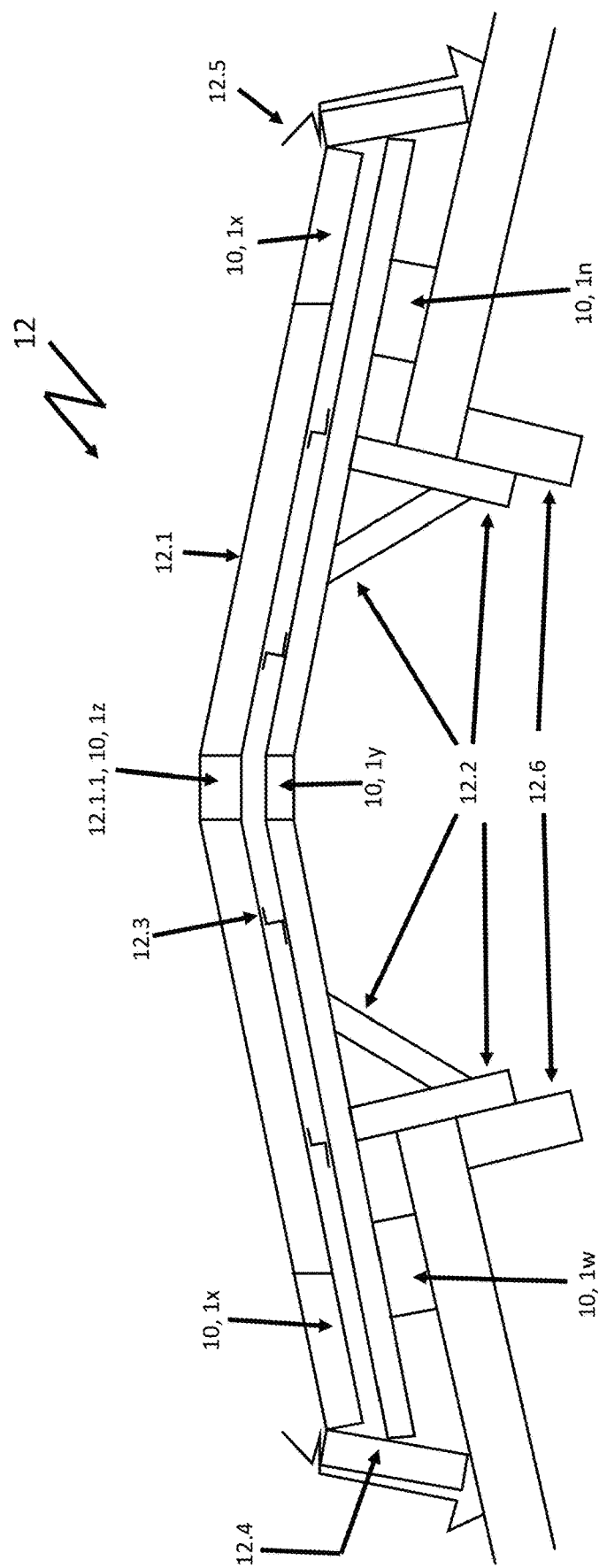
FIG. 16 a plan view of a cross-cut through a barn roof 12 with installation positions 1w-1z for the filter systems 1.

FIG. 16 Conjunction with FIGS. 13 and 14

Barn Roof Hood

The barn roof hood 12 for animal barns and farms or in zoological gardens comprised a transparent light hood 12.1 with a centrally arranged exhaust gap 12.1.1, aluminum struts 12.2 arranged underneath with aluminum Z-purlins 12.3 and aluminum wind deflectors 12.4 with aluminum storm angles 12.5. The arrows 12.6 symbolize the airflows with their flow directions 2.5.1. This arrangement was connected with the roof material 12.7. At the installation positions 1w to 1z, appropriately dimensioned rack frames 10 with filter systems 1 according to FIG. 1 were built in, through which the airflows 12.6 were directed. As a result, only air 2.2.2 free of suspended matter 2.3 and noxious substances such ammonia came through the stable roof hood 12.

This was in particular a significant advantage for animal barns in zoological gardens that were located, for example, in cities.

FIGS. 17, 18 and 19

Fluid-Tight Assemblies 13 and Their Uses

In order to have particularly spatially variable arrangements 13 of filter systems 1 with standing and/or modulated ultrasonic waves and/or their harmonics 2.4.2, the fluid-tight two-sided arrangement 13 each provided with an exciter-receiver 2.4.1 for ultrasound (cf. FIG. 1) was developed. The arrangement 13 comprised of fluid-type capsule 13.2 with a flow profile made of plastic, such as, for example, polypropylene of a length of 40 mm and a diameter of 20 mm. In the capsule 3.2, a circuit board 13.1 was arranged, on which the ultrasonic sources 2.4.1 were arranged offset. Ultrasonic sources 2.4.1 were glued fluid-tight into the wall 3.7 with silicone adhesive 13.3. The electrical energy was applied by an encapsulated, miniaturized, inductively chargeable power pack 13.6. Furthermore, the arrangement 13 comprised an eyelet connection for the upper and the lower hanging wire 13.4 at its lower and upper end.

Several arrangements 13 were hung next to one another in the flow channel 2.4 at a Venturi support plate 13.5.1, so that the lower ultrasonic sources 2.4.1, as seen in the flow direction 2.5.1, emitted standing ultrasonic waves 2.4.2 between each other and that the upper ultrasonic sources 2.4.1, as seen in the flow direction 2.5.1, also emitted standing ultrasonic waves 2.4.2 between each other during the operation of the arrangement 13. Any number of further rows of arrangements 13 could be hung under this arrangement 13, which was suspended directly from the Venturi support plate 13.5, so that, as it were, a quipu configuration resulted. The bottom row of arrangements 13 could be attached to a fluid-tight grid with the lower hanging wires 13.4, so that the arrangements 13 did not change their spatial position in the flow channel 2.4 during operation.

The Venturi support plate 13.5.1 had Venturi funnel walls 13.5.2 with central fluid passages 13.5.11. The filter 3 was arranged above the Venturi support plate 13.5.1.

In this way, filter systems 1 with flow channels 2.4 of a width of 2 m and more and a height of 3 m and more could be built.

Figure 20:
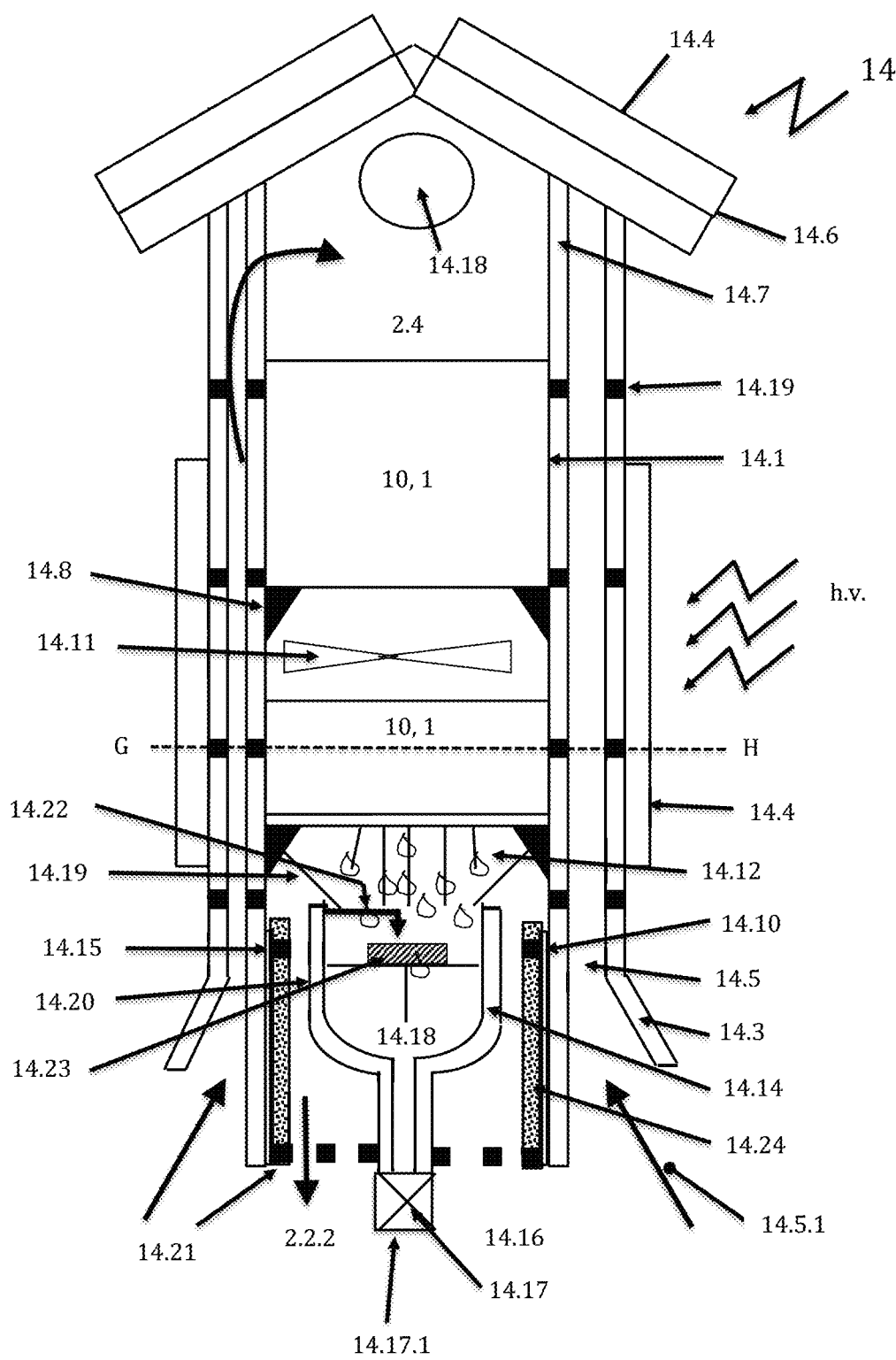
FIG. 20 a plan view of the longitudinal cut through a self-sufficient, vertical water extraction system 14 for arid areas with vertical filter systems 1.

FIGS. 20, 21 and 22

Self-Sufficient, Vertical Water Extraction System 14 for Arid Areas

The self-sufficient, vertical water extraction system 14 comprised of vertical wooden pipe 14.1 with a length of 2 m and wall thickness of 15 mm made from two vertical halves of a pipe 14.1.1, which were fastened to one another with circumferential tongue-and-groove press-on fasteners 14.19. Each of the two vertical halves of a pipe 14.1.1 of the wooden pipe 14.1 could be provided with insulation made of, for example, cement foam (not shown). The vertical pipe 14.1 was surrounded at a distance of 100 mm by a circumferential vertical chimney wall 14.3 made of wood. The chimney wall 14.3 consisted of two vertical halves of a pipe 14.3.3, which abutted on two vertical abutting edges 14.3.2 and were also held together by tongue and groove press-on fasteners 14.19. The circumferential chimney wall 14.3 was connected to the wooden pipe 14.1 by the connecting struts 14.3.1. The connecting struts 14.3.1 had a circular outline could be removed by inserting them into the corresponding recesses in the wall of the vertical wooden tube 14.1 and in the surrounding chimney wall 14.3. On the outside of the chimney wall 14.3, a photovoltaic device 14.4, which had to abutting edges, could also be attached. With this configuration, the water extraction system 14 could be easily disassembled for maintenance. The arrangement of circumferential chimney wall 14.3 and wooden pipe 14.1 formed a circumferential chimney 14.5, in which air 2.2 flowed upwards. The lower end of the chimney wall 14.3 was expanded to form a circumferential entrance followed 14.5.1, which promoted the flow of air 2.2. The chimney 14.5 ran up to the removable protective roof 14.6, which protruded beyond the chimney wall 14.3 and thus suppressed the ingress of dust. The vertical wooden tube 14.1 reached up to 300 mm below the removable protective roof 14.6. The opening formed in this way was protected by a circumferential pre-filter 14.7.

The removable protective roof 14.6 carried a photovoltaic device 14.4 on its outer surface, which device was charged by the power pack 14.18.

The airflow 2.2, symbolized by the arrows 2, was sucked into the flow channel 2.4 and moved downwards by the horizontally arranged fan 14.11 operated by an electric motor fed by the power pack 14.18. In the flow channel 2.4, two rack frames 10 (in the instant case with a circular circumference; cf. FIGS. 13 and 14) with filter systems 1 according to the FIG. 1 were arranged with the outlet openings 3.3 for the air 2.2.2 pointing downwards. The rack frames 10 rested on a horizontal circumferential projection 14.8. Due to this configuration, the rack frames 10 with the filter systems 1 could be removed without any problems during the maintenance of the water extraction system 14. The configuration is illustrated once again with the aid of cross-cut along the cutting line EF in FIG. 21 and with the aid of the enlarged cut V of the connecting area of the filter system 14 according to the FIG. 22.

The water in the air 2.2 was condensed by the filter systems 1 to form water droplets 14.13 which dripped into the water collecting vessel 14.14 along the drip threads 14.12 made of polypropylene and were collected there. The water collecting vessel, 14.14 was supported on the circumferential retaining ring 14.10 with the aid of its support ring 14.15 which had circular holes. At its lowest point, the water collecting vessel 14.14 had a drainpipe 14.16 with a drain faucet 14.17 controlled by an actuator (not shown). The drain faucet 14.17 could be opened automatically with suitable electronic and mechanical actuators in order to discharge the water 14.13 into the water pipe 14.17.1 until he maximum level of the water 14.13 in the water collecting vessel 14.14 was reached, after which the drain faucet 14.17 could be closed again automatically. To control the actuator of the drain faucet 14.17, a float 14.23 rested on the surface of the water 14.13. When the water 14.13 had risen high enough, the float 14.23 touched the sensor and actuator 14.22, which opened the outlet 14.17.

The water collecting vessel 14.14 was stored on a perforated plate 14.21, the openings of which were fluidly connected to the openings of the support ring 14.15 so that the dry air 2.2.2 could flow out of the perforated plate 14.21. The arrangement with the water collecting vessel 14.14 was surrounded by an insulation 14.24 made of glass wool.

The self-sufficient vertical water extraction system 14.14 could be hung on a rod at a distance from the ground with the help of suitable holding devices. The holding devices and the rods (not shown) were designed to withstand sandstorms.

The self-sufficient vertical water extraction system 14 also supplied continuously clean drinking water in desert areas such as the Atacama Desert and the Namib Desert, in which fog forms at night due to the adjacent cold ocean currents.

Figure 23:
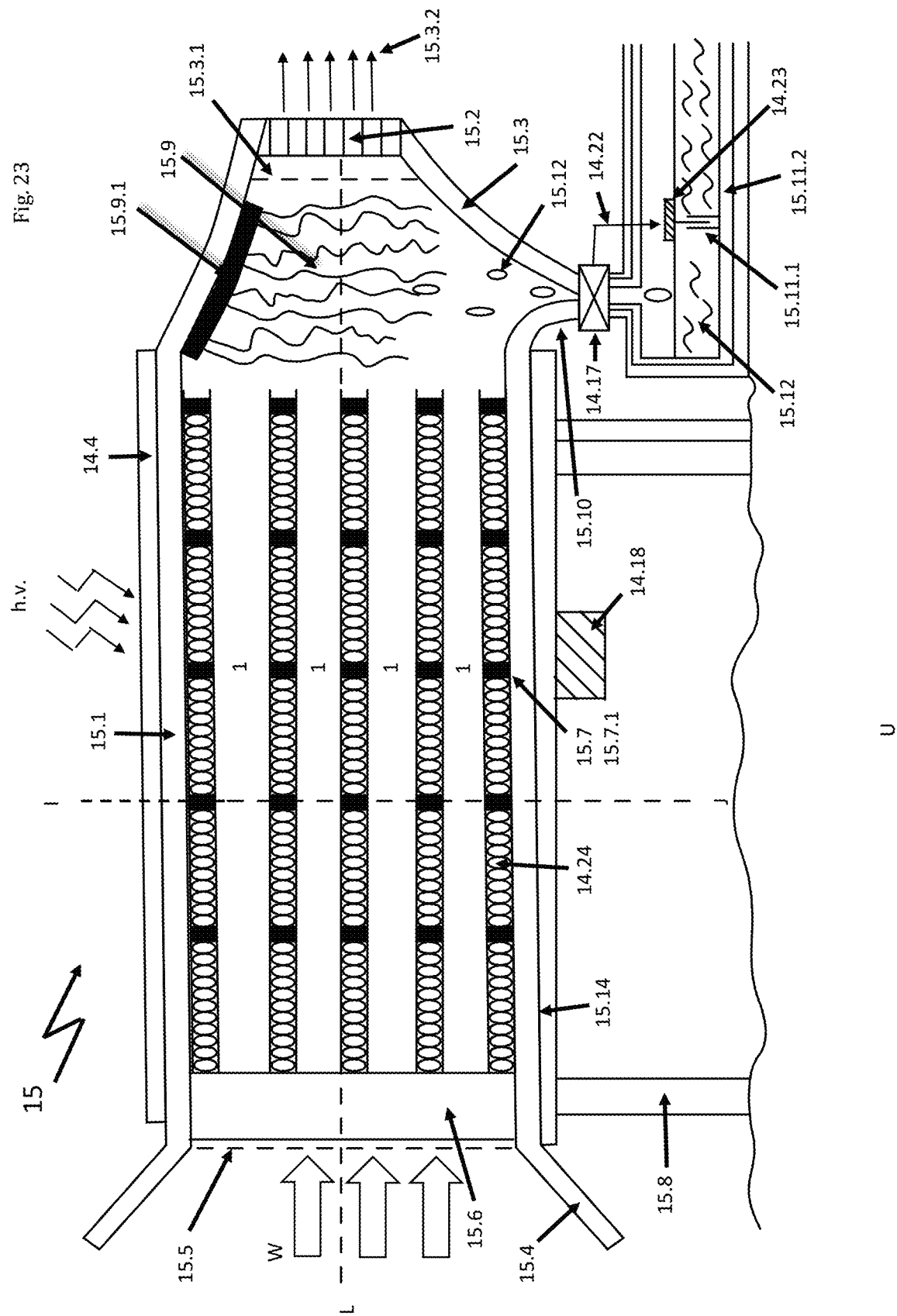
FIG. 23 a plan view of the longitudinal cut through a self-sufficient, horizontally, inclined water extraction system 15 for arid areas of with horizontal filter systems 1.
Figure 24:
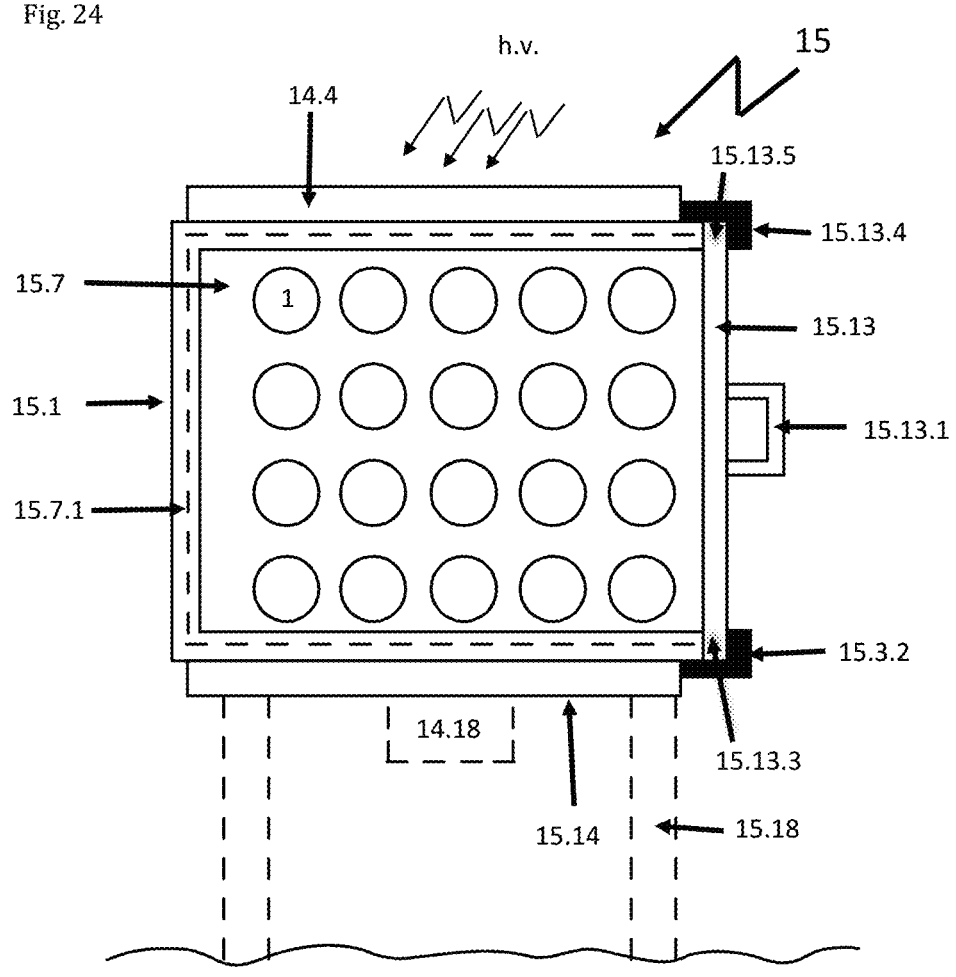
FIG. 24 a plan view of the cross-cut along the cutting line GH through the self-sufficient, horizontally inclined water extraction system 15 with vertical filter systems 1.

FIGS. 23 and 24 24

Self-Sufficient, Horizontal Water Extraction System 15 Installed in a Slanted Position The water extraction system 15, which was operated at times only by the wind (arrow W, main direction of the wind) had a length of 2 m and comprised a container 15.1 with a box-shaped cross-section measuring 1 m×1 m×1 m for the filter systems 1 according to the FIG. 1. It had a funnel-shaped, widened collection opening 15.4. The essentially horizontally mounted filter systems 1 and their flow channels 2.4 were protected by a stone guard grille 15.5 and a pre-filter 15.6. The entire water extraction system 15 was mounted slightly inclined of the subsurface U with the aid of raised pedestals 15.8 on the support plate 15.14. The filter systems 1 were stored skid-proof in five square, perforated plates 15.7 made of wood. In order to hold the edges of the perforated plates 14.17, the recesses 15.7.1 were provided in the walls 15.1.1 in the top, the bottom and one vertical side (cf. FIG. 24). The flow generated by the wind in the flow channels 2.4 was amplified or generated during a calm by a vertically arranged Air Multiplier (Dyson) 15.2, which was operated by an electric motor fed by the power pack 14.18. The power pack 14.18 was fed by the photovoltaic device 14.4 on the upper horizontal side of the container 15.1. In front of the vertical Dyson 15.2, draining threads 15.9 made of Teflon were attached to an adhesive attachment 15.9.1. The drainage threads 15.9 conducted the condensed water 15.12 exiting the filter systems 1 by a drainpipe 15.10, and a training faucet 14.17 controlled by an actuator or sensor 14.22 into an insulated canister 15.11 with a double wall (evacuated double wall 15.11.2). The actuator 14.22 was triggered by the contact of the sensor 14.22 with the float 14.23, which was held in the appropriate position with the help of a float guide 15.11.1. The double-walled canister 15.11 also had a pressure equalization with a check valve (not shown).

The configuration is illustrated once again with the aid of FIG. 24 which shows a cross-cut along the cutting line IJ through the container 15.1. Each perforated plate 15.17 held four rows of five filter systems 1 and was positioned with two horizontal side edges and one vertical side edge in the corresponding recesses 15.7.1. In one vertical side, the container 15.1 had a horizontally displaceable, vertical side wall 15.13 with a handle 15.13.1. The lower sliding edge 15.13.3 ran in the lower sliding profile 15.13.4. As a result, the horizontally displaceable, vertical side wall 15.13 could be opened for maintenance purposes, and the perforated plates, 15.7 with the filter systems 1 could, for example, be exchanged.

The self-sufficient, horizontal water extraction system 15 also provided continuously clean drinking water in desert areas such as the Atacama Desert and the Namib Desert, in which fog forms at night due to the adjacent cold ocean currents.

FIG. 25

Airworthy Equipped Filter System 1

Figure 25:
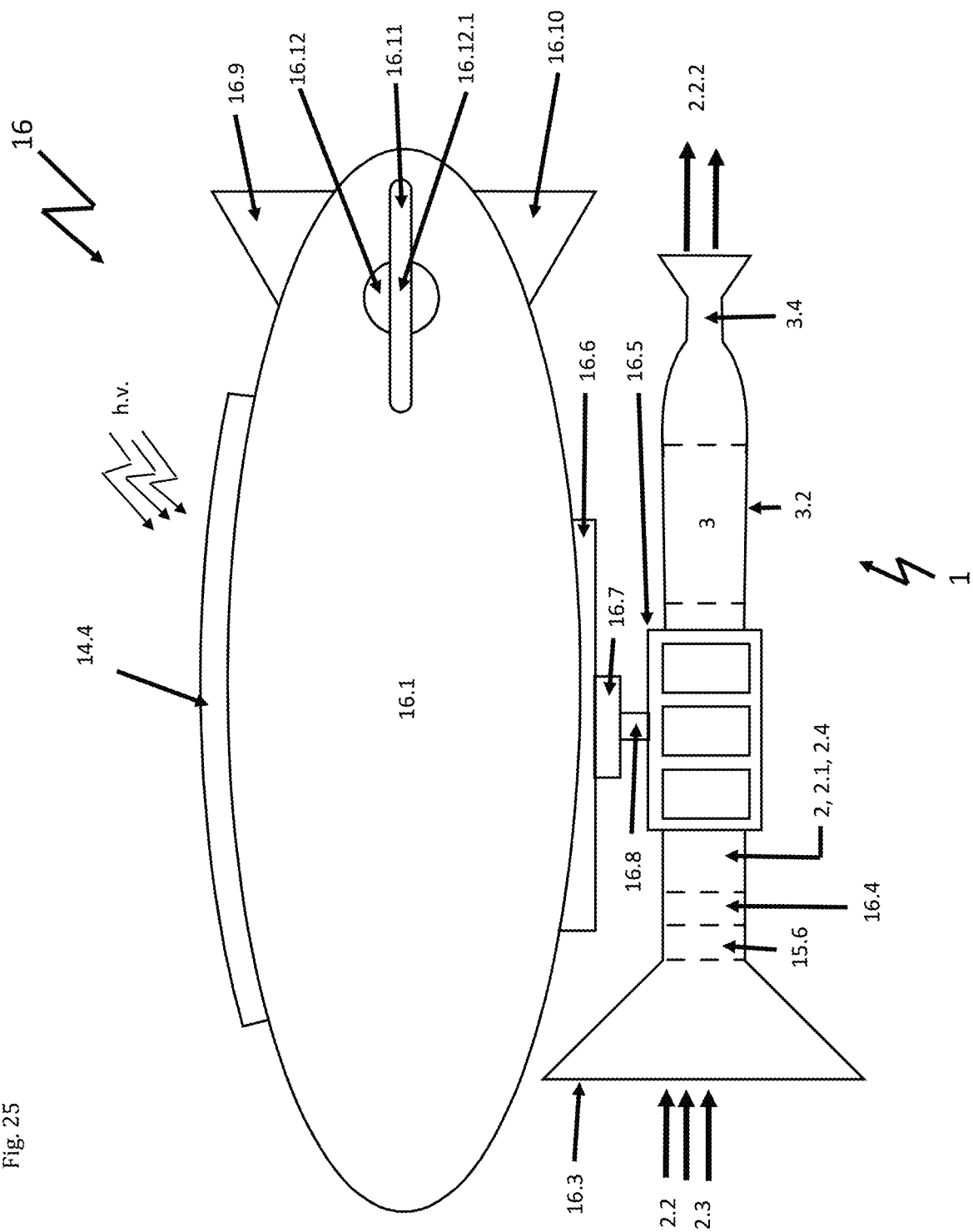
FIG. 25 a side view of a filter system 1 equipped to be airworthy.

The flying machine 16 according to FIG. 25 without an own drive comprised as a flying object 16.1a 15 m long, helium-filled blimp 16.1 without a drive which could be steered by remote control. Five filter systems 1 each with a circular diameter of 40 cm, the length of 1.5 m and, as seen in the flow direction 2.5.1, a collecting funnel 16.3 with a circular opening of the diameter of 1 m, and Air Multiplier (Dyson) 16.4 as suction and blower, a pre-filter 15.6, a device 2, and filter 3 and a Venturi nozzle 3.4 were suspended below the blimp 16.1 from suspensions 16.5. The suspensions 16.5 were rotatably connected to a rotating rod 16.8 with an actuator and rotating motor 16.7, which was attached to a holder 16.16 on the blimp 16.1. The blimp 16.1 had a rudder 16.9, and two elevators 16.11 rotatable about the axis of rotation with electric servomotors 16.12. In addition, the blimp 16.1 had a stabilizer 16.10 on its underside.

The filter systems 1 could also be used as the drives.

As a source of electric energy for the filter systems 1, batteries rechargeable batteries and power packs that can be recharged by photovoltaics and thermoelectric elements (TEE) with a radioactive energy source (not shown) could be used. Furthermore, the airworthy equipped filter systems 1 could be equipped with swiveling cameras and webcams (not shown).

The airworthy equipped filter systems 1 were used to clean the atmosphere. 2.2 of suspended matter. 2.3 and noxious substances that were generated in particular in building fires, forest fires, peat fires, explosions, volcanic eruptions, reactor accidents and sandstorms. They could also be used, to collect atmospheric samples up to and in the stratosphere. Last but not least, they could be used for radioactive decontamination.

The filters 3 could be exchange after landing, after which the filters, 3 were disposed off in accordance with regulations. Or they could be mechanically beaten and/or washed and dried and then reused, whereby the material that resulted from the beating and/or washing was also disposed off in accordance with regulations.

FIG. 26

Filter Systems 1 Equipped to be Airworthy

A remote-control drone 16.2 with four propellers, each of which was driven by an angle-adjustable electric motor as a drive 16.2.2 was used as the flying machine with its own drive 16.2. The energy sources mentioned in FIG. 25 could be used for the electric motors 16.2.2. The electric motors were connected to one another by a rigid linkage 16.2.3 as connecting body. The filter system 1 was attached to the rigid linkage 16.2.3 as described in the FIG. 25 with a rigid suspension 16.5 which was connected to the rigid linkage 16.2.3 with the connecting struts 16.5.1. In this case, the filter system 1 did not have an Air Multiplier (Dyson) 16.4 because the airflow 2.2 through the flow channel 2.4 resulted from the flight speed of the drone 16.2. The central control and a webcam 16.2.4 were arranged in the center of the rigid linkage 16.2.3.

Figure 26:
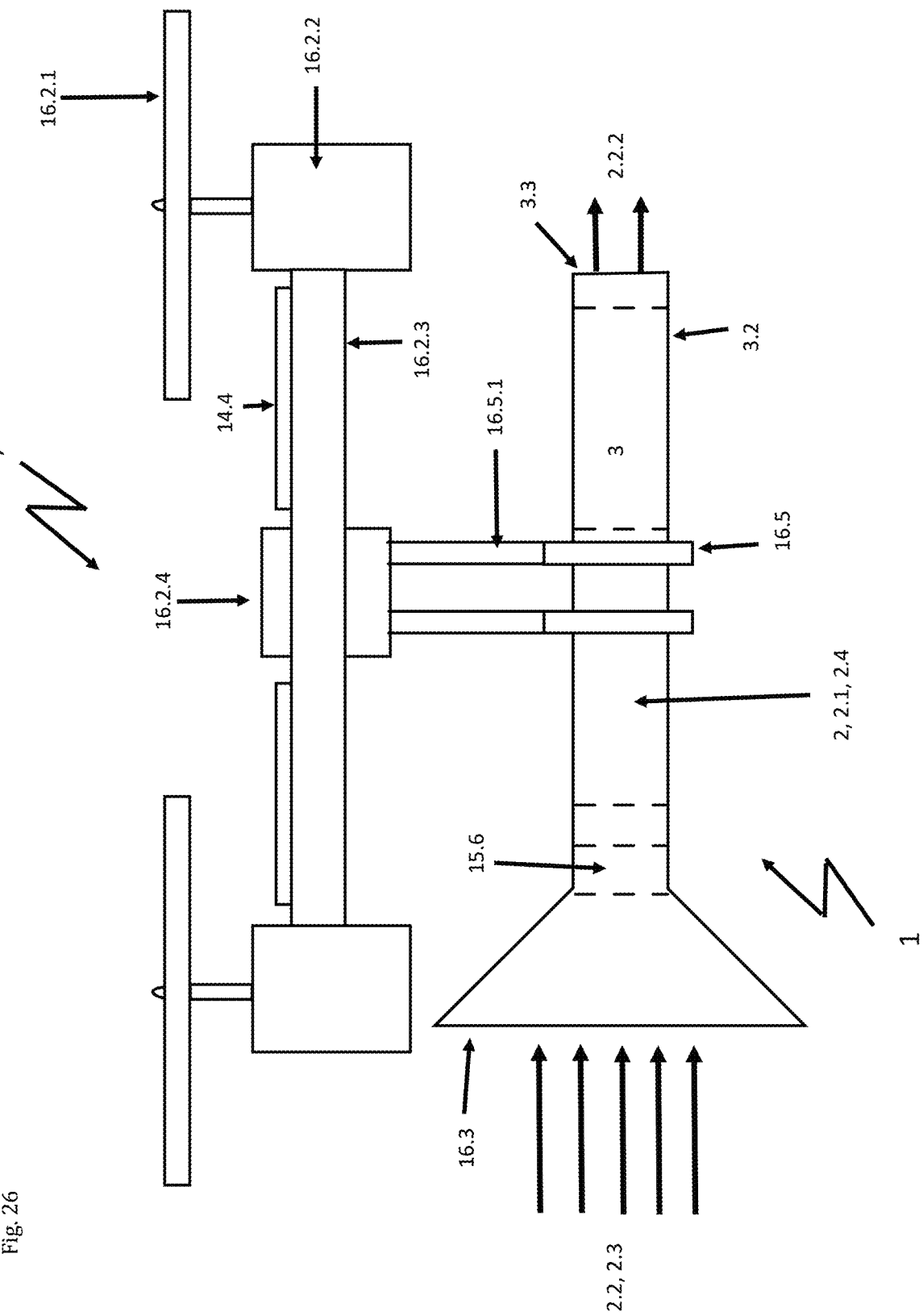
FIG. 26 a side view of a further embodiment of a filter system 1 equipped to be airworthy.
Figure 27:
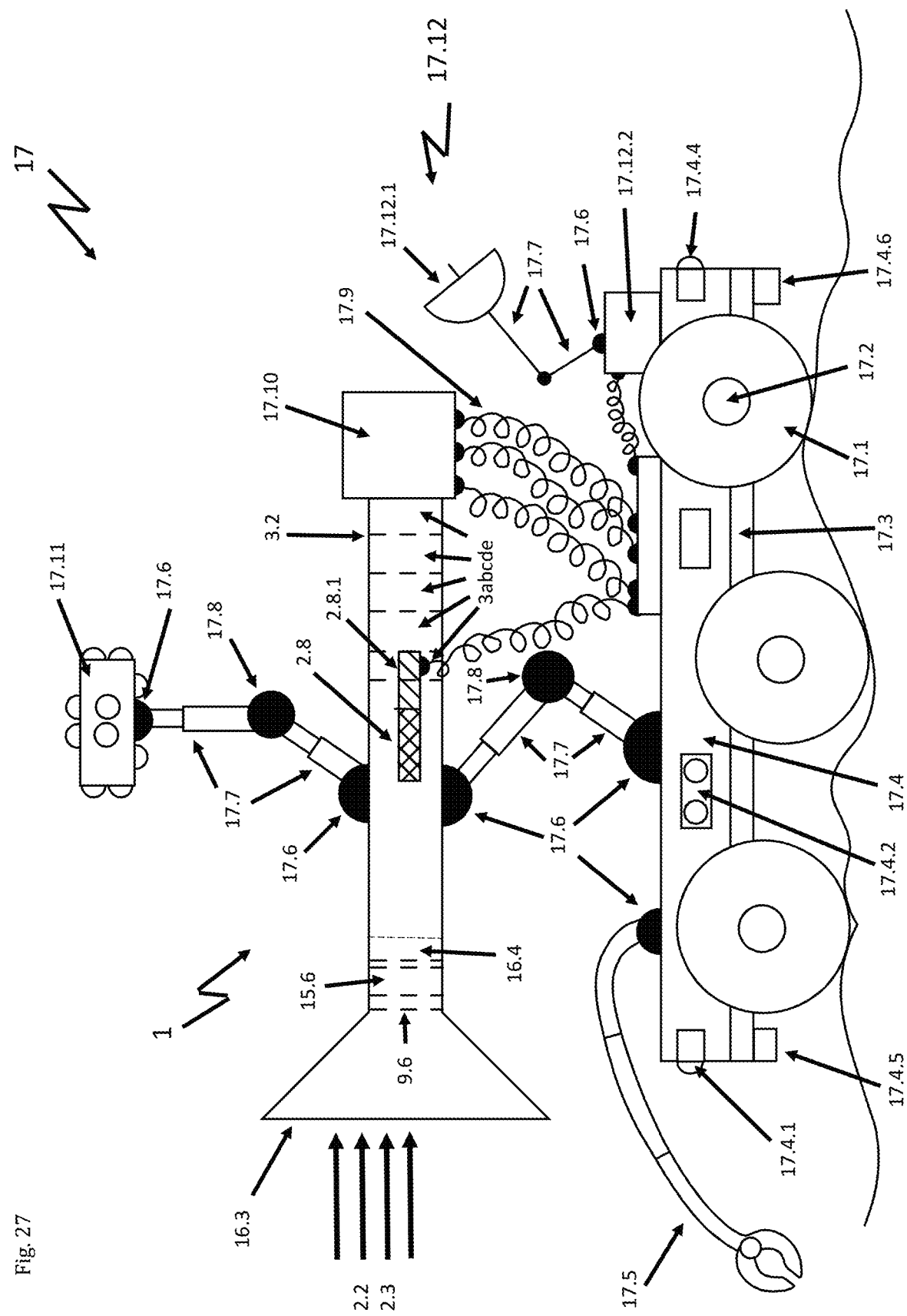
FIG. 27 a side view of a robot vehicle 17 with the filter system 1.
Figure 28:
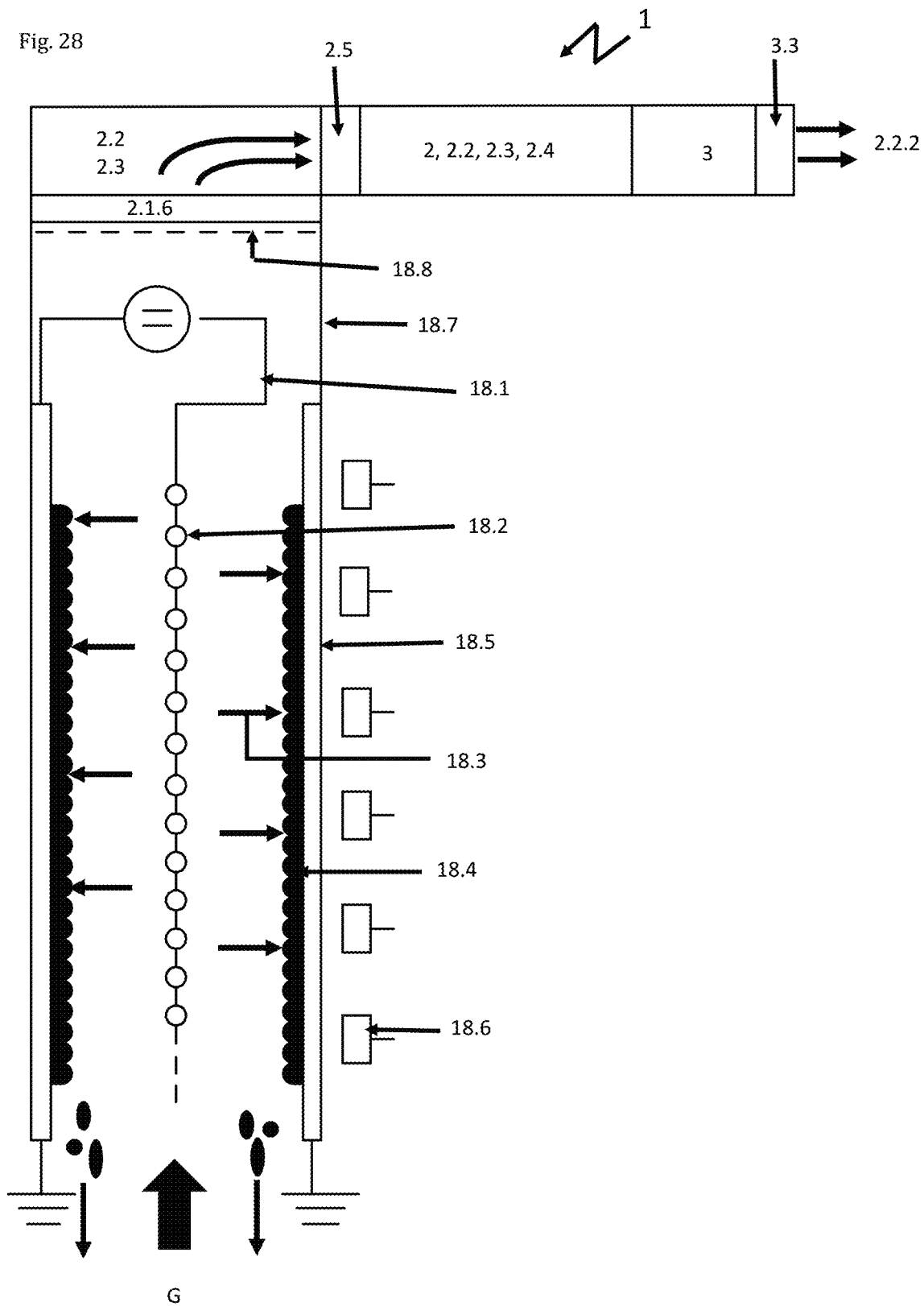
FIG. 28 a plan view of a longitudinal cut through an electric dust separator or an electrostatic device 18 with a downstream filter system 1.

The great advantage of the airworthy equipped filter system 1 according to the FIG. 26 was that, depending on the intended use and the load-bearing capacity of the drones 16.2, filter systems 1 of different sizes could be used. For example, filter systems 1 with drones 16.2 could be flown into buildings that were in high risk of collapsing.

FIG. 27

Mobile Equipped Filter System 1

The remote-controlled robot vehicle 17 with the filter system 1 according to the FIG. 1 in conjunction with, for example, FIG. 25 could be used in particular for the sample taking and decontamination, in particular in the dark, in danger zones and contaminated areas such as buildings in danger of collapsing, burned buildings and areas, areas endangered by explosions, areas contaminated by noxae or radioactively contaminated areas or buildings.

The robot vehicle 17 had for individually controllable balloon wheels 17.1 on individual wheel suspensions which were driven by individually controllable electrical motors 17.2. The independent wheel suspensions were movable with the platform 17.3 and were connected without vibrations with the help of hydraulic shock absorbers. On the platform 17.3 was a control device 17.4 with computer, energy source and actuators 17.6 for the telescopic rods 17.7 movable in the X-Y-Z direction with the joints 17.8 of the filter system 1 and the six-sided headlight, night vision webcam and laser arrangement 17.11 also movable in the X-Y-Z direction.

The filter system 1 had, as seen in the flow direction 2.5.1, a collecting funnel 16.3, a perforated plate 9.6, a pre-filter 15.6, a Dyson 16.4 and a device 2 with a device 2.8 with a corresponding storage vessel 2.8.1, with the help of which device 2.8 particles 2.3.4 with a particle size >400 nm to 500 µm were metered into the flow channel 2.4. The filter system 1 also had in the filter housing 3.2 the filters 3a to 3e with different separating effects from the µm range to the nanometer range arranged one behind the other in the flow direction 2.5.1. This was followed by an analyzing unit 17.10, which, depending on the version, was equipped with spectrometers, gas chromatographs, Geiger counters, particle measuring devices and mass spectrometers. The data obtained were transmitted via the flexible data lines 17.9 to the connection strip 17.9.1 on the unit 17.4 and evaluated therein by the computers.

The unit 17.4 had two arrangements 17.4.1 in the corners, each for a forward headlight, a mobile webcam and laser. Moreover, it also had two opposing arrangements 17.4.2, each with a side headlight, a laser and an extendable webcam as well as two opposing sidelights 17.4.3. Against the direction of travel, two arrangements 17.4.4 with reverse headlights, laser and extendable webcam were also installed in the corners. Last but not least, the unit 17.4 had front look-down headlight and a front extendable webcam 17.4.5 as well as a corresponding rear look-down headlight and a rear extendable webcam 17.4.6.

A flexible, extendable gripper 17.5 and the transmitter and receiver 17.12 with a parabolic antenna 17.12.1 movable in the X-Y-Z direction and a decoder and a memory 17.12.2 were also arranged on the unit 17.4.

FIG. 28

Electrostatic or Plate Electrostatic Precipitator with a Vibration-Free Mounted Filter System 1 According to FIG. 1

On an electrostatic device 18 of the usual and known design with a wire electrode 18.1, spray electrodes 18.2 and a separation electrode 18.5, an electrically insulated wall 18.7, an electrically insulated pre-filter and an electrically insulated perforated plate 18.8, a filter system 1 according to FIG. 1 was installed electrically insulated and vibration-free with the help of hydraulic shock absorbers. In the electrostatic device 18, the dust particles carried in by the flowing exhaust gas G (black arrow) of a biomass heating plant was electrically charged and deposited on the separation electrode 8.5 as the dust layer 18.4 (cf. 18.3). After enough dust had accumulated in the dust layer 18.4, it was knocked off with a tapping mechanism 18.6 and fell down into the collecting container (not shown).

However, it was found that the dust in the nanometer range, in particular the respirable nanoparticles, escaped from the electrostatic device 18. However, they could be intercepted in the filter system 1 with 99.9% effectiveness, so that air 2.2.2 free of suspended matter 2.3 and noxious substances left the system.

Figure 29:
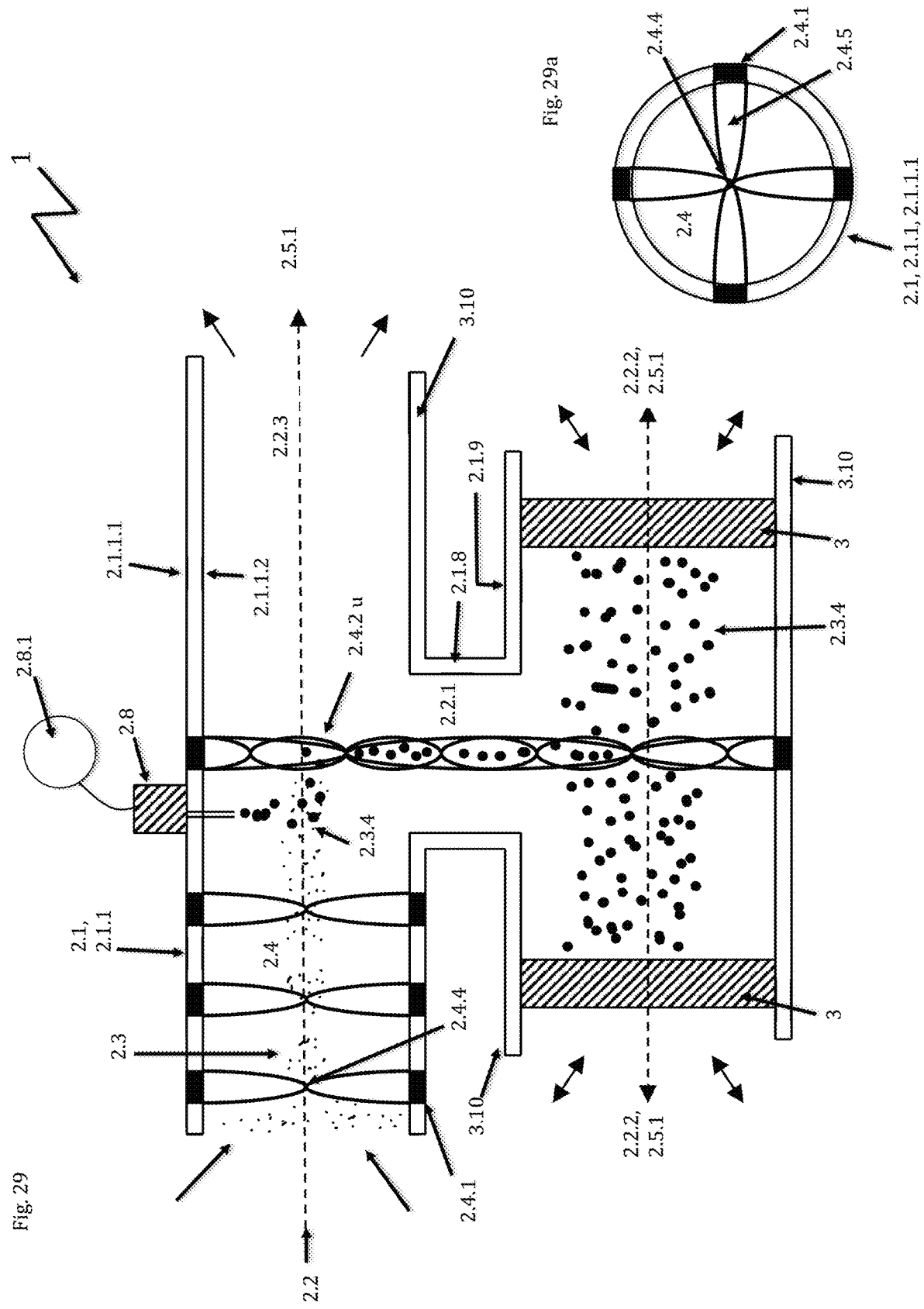
FIG. 29 a plan view of the longitudinal cut through a filter system 1 with a branch 2.1.8 of the flow tube 2.1 and a filter tube 2.9.1 parallel to the flow tube 2.1.

FIGS. 29 29 and 29 29A

Filter System 1 with a Low Pressure Drop

Air 2.2 contaminated with suspended matter 2.3 was sucked into a 50 cm long flow tube 2.1 with a clear span of 5 cm as described in conjunction with FIG. 1. The flow tube 2.1 had 10 pairs of piezoelectric ultrasonic exciters 2.4.1 arranged in a cross shape in the closed wall 2.1.1. The arrangement is illustrated in FIG. 29a. Thus, a standing ultrasonic wave 2.4.2 was formed between two mutually opposed ultrasonic exciters 2.4.1, the common wave node 2.4.4 of which lay on the centerline of the flow pipe 2.1. In this way, a flow channel 2.4 was formed, in which the suspended matter 2.3 was transported in the flow direction 2.5.1. This way, the particles of the suspended matter 2.3 were pressed together, so that their particle size increased and a fluid 2.2.1 was formed. As seen in the flow direction 2.5.1 after the last double pair of crosswise arranged standing ultrasonic waves 2.4.2, particles 2.3.4 were metered by means of a metering device 2.8 from a storage vessel 2.8.1 into the flow channel 2.4. This increased the particle size of the suspended matter 2.3 to 800 nm to 200 µm. In the further course, as seen in the flow direction 2.5.1, a further ultrasonic exciter 2.4.1 was arranged centrally above the inlet opening of a 10 cm long, tubular, vertical branch 2.1.8 with the clear span of 4 cm behind the last double pair. The vertical junction 2.1.8 was fluidly connected with a flow-through filter tube 2.1.9 parallel to the flow tube 2.1 at half of the length of the filter tube 2.1.9. The filter tube 2.1.9 had two opposing HEPA filters with two outlet tubes 3.10, and a further ultrasound source 2.4.2, which corresponded to the ultrasonic exciter 2.4.1 arranged vertically above it. A superimposition 2.4.2U of standing ultrasonic waves 2.4.2 with several wave nodes 2.4.4 and their standing harmonics were formed between these two ultrasonic exciters 2.4.1. Thereby, 99.9% of the particles 2.3.4 contained in the fluid 2.2.1 where deflected at an angle of 90° out of the flow tube 2.1 into the filter tube 2.1.9, where the fluid flow 2.2.1 split and flowed through the filters 3. These filtered the particles 2.3.4 also efficiently, that the specific number of particles N/Vt in the air currents 2.2.2 emerging from the outlet pipes 3.10 in the flow direction 2.5.1 was below the detection limit.

In the flow pipe 2.1, the air 2.2.3 passing through the superposition 2.4.2U was discharged via the outlet pipe 3.10. The air 2.2.3 had only 0.1% of the originally present particles 2.3.4.

The filter system 1 according to the FIGS. 29 and 29a had an advantageously low pressure drop, so that large amounts of air 2.2 could be cleaned.

Figure 30:
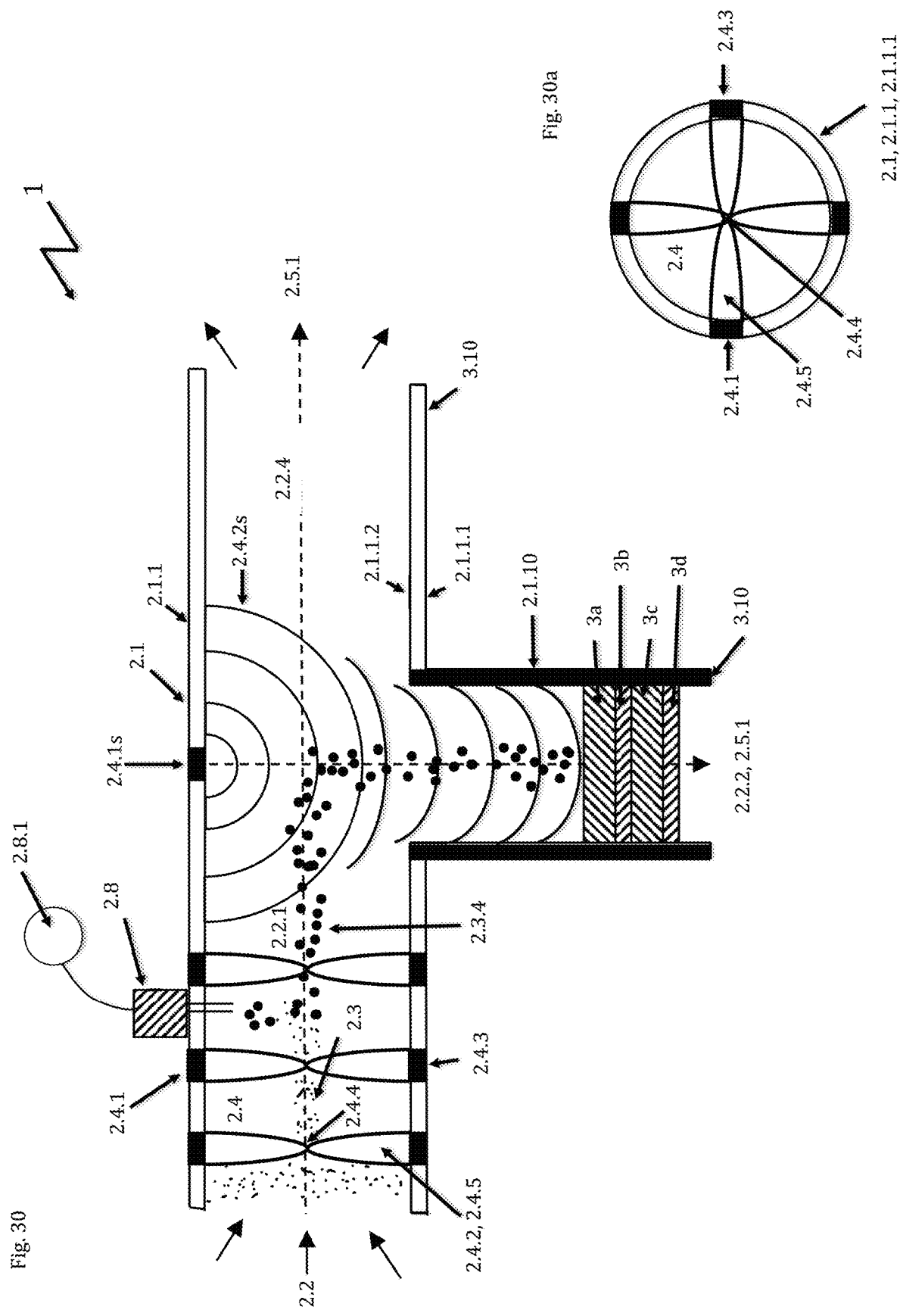
FIG. 30 a plan view of the longitudinal cut through a filter system 1 with a branch 2.1.10 of the flow tube 2.1.
Figure 33:
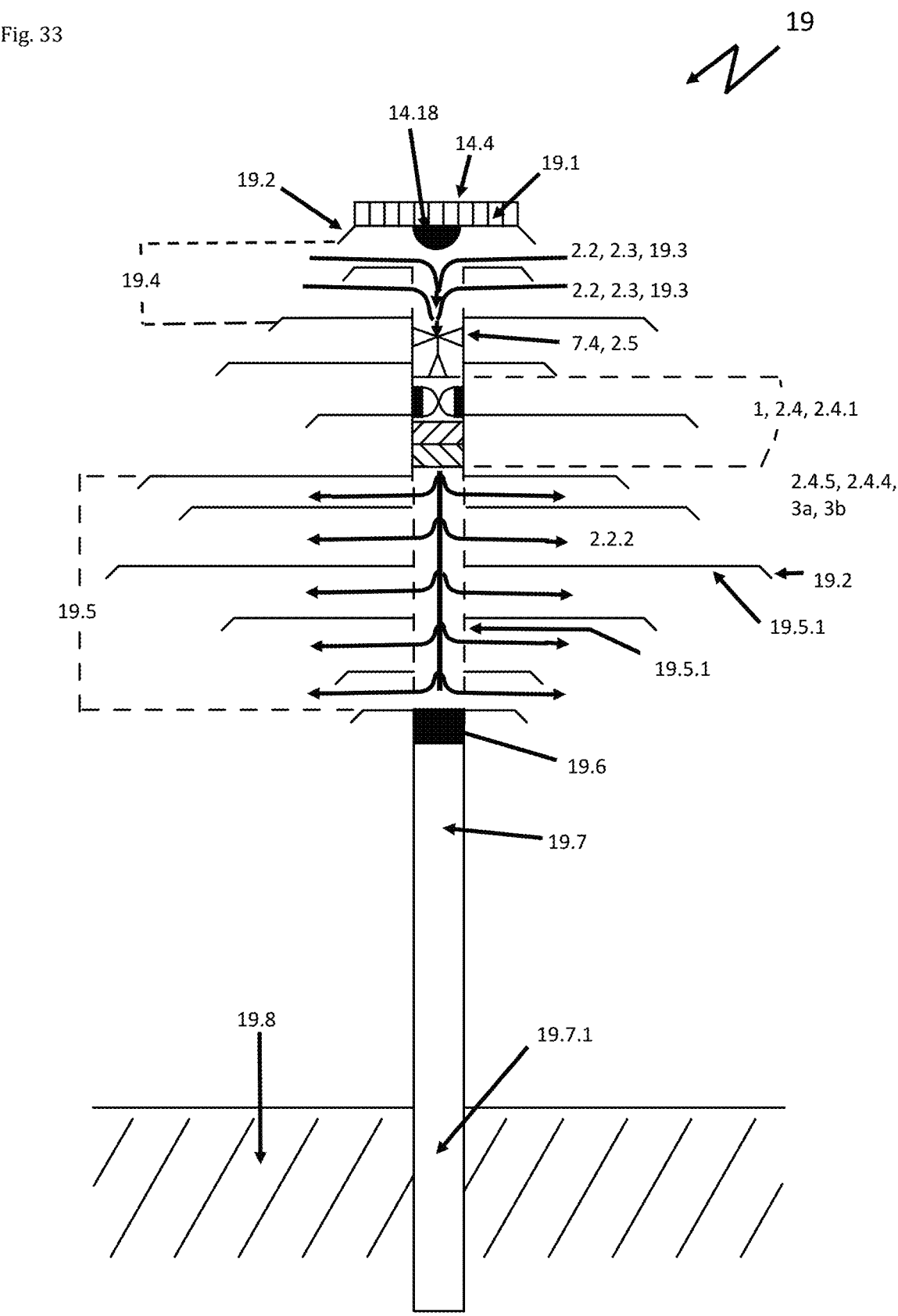
FIG. 33 a plan view of the longitudinal cut through a "fresh air tree" 19.
Figure 34:
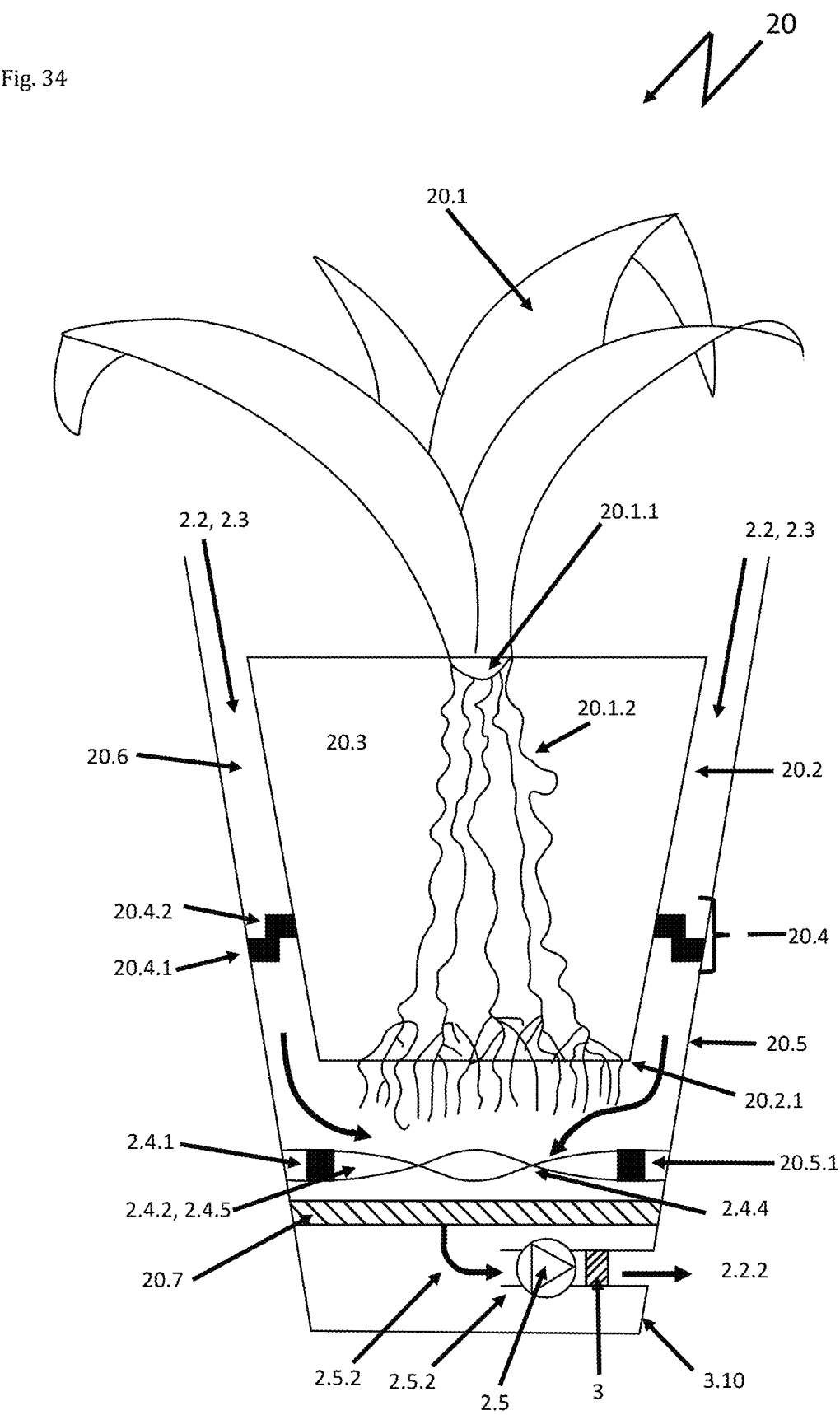
FIG. 34 a plan view of the longitudinal cut through a plant pot 20 as an air cleaner.
Figure 35:
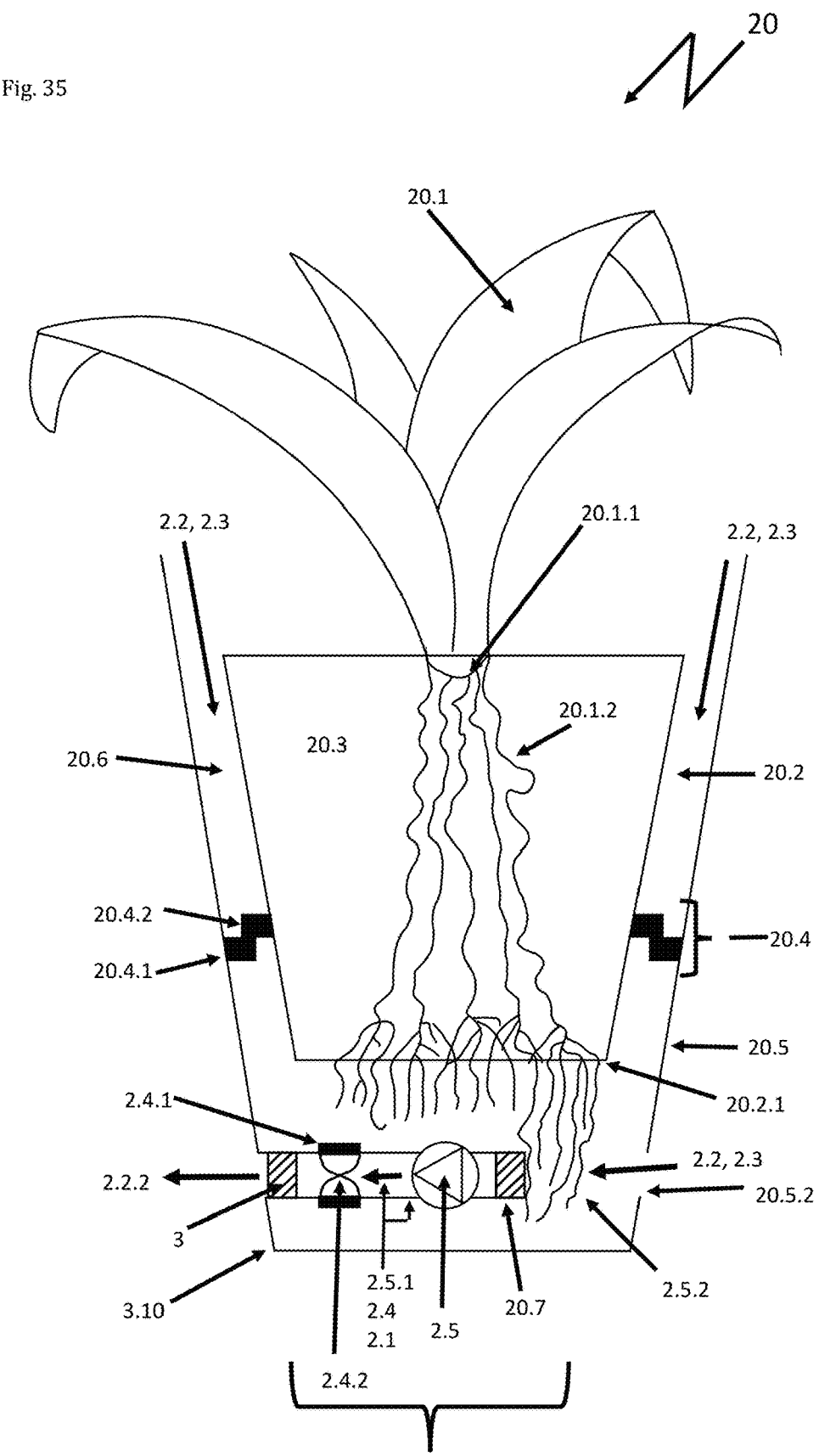
FIG. 35 a plan view of the longitudinal cut through a plant pot 20 as an air cleaner.

FIGS. 30 and 30A

Filter System 1 with a Shockwave Generator 2.4.1S

The structure of the flow tube 2.1 of the filter system 1 according to the FIGS. 30 and 30a corresponded to the structure of the flow tube 2.1 of the filter system according to the FIGS. 29 and 29*a*. The main difference was that the metering device 2.8 four metering the particles 2.3.4 into the flow channel 2.4, as viewed in the flow direction 2.5.1, was arranged in front of the last double pair of standing ultrasonic waves 2.4.1 arranged in a cross-wise manner. This enabled the particles 2.3.4 in the fluid to be focused again before they were exposed to the shock waves 2.4.2S generated by an electrohydraulic shockwave generator 2.4.1S. The hydraulic shockwave generator 2.4.2S was fastened in the middle above the inlet opening of the filter tube 2.1.10 reinforced against the effects of shock waves 2.4.2S in the closed wall 2.1.1. Due to the shock waves 2.4.2S, 99.99% of the particles 2.3.4 were steered at an angle of 90° with respect to the original flow direction 2.5.1 into the filter tube 2.1.10 onto a filter arrangement 3*a*; 3*b*; 3*c*; 3*d* of horizontally arranged filters with different separation efficiencies. The separation efficiency of the filter arrangement ranged from a minimum particle size of 50 μm (3*a*), a minimum particle size of 1 μm (3*b*), a minimum particle size of 800 nm (3*c*) to a minimum particle size of 400 nm (3*d*). In order to protect the filters, 3 from the effects of the shock waves 2.4.1S, the filters, 3 were fastened with the aid of metal grids (not shown).

The filtered air 2.2.2 emerged from the exit 3.10 and contained the particles 2.3.4 in a specific particle number N/Vt below the detection limit. The fluid 2.2.4 cleaned by the shock waves 2.4.2S and exiting via the second outlet pipe 3.10 had only 0.01% of the originally present particles 2.3.4.

FIGS. 31 and 31 *a*

Filter System 1 with Transverse Ultrasonic Waves 2.4.2T

In a 60 cm long flow tube 2.1, six pairs of opposing sound sources 2.4.1 for transverse ultrasonic waves 2.4.2T on the one hand and reflectors 2.4.3 on the other hand were fastened one behind the other on the inside 2.1.1.2 of the closed wall 2.1.1 in the flow direction 2.5.1. FIG. 31*a* illustrates this arrangement on the basis of the cross-cut along the cutting line KL. In addition, four pairs VK of offset sound sources 2.4.1 for transverse ultrasonic waves 2.4.2T were arranged one behind the other. The air 2.2 with the suspended matter. 2.3 was blown through the flow pipe 2.1 in the flow direction 2.5.1. The suspended matter 2.3 collected in the pressure nodes 2.4.4, where they aggregated and agglomerated. Thus, particles 2.3.4 with the particle size of 800 nm to 2 μm resulted in the fluid 2.2.1, which particles 2.3.4 could be separated using a medium filter 3, with an efficiency of 99.99%, so that in the fluid 2.2.2 that emerged through the outlet pipe 3.10, the particle concentration was, at most, 0.01%.

The advantage of this filter system 1 was that it was suitable for cleaning particularly polluted air 2.2; 2.3.

FIGS. 32 and 32*a*

Filter System 1 with Transverse Ultrasonic Waves 2.4.2T

In a 60 cm long flow tube 2.1 with the clear span of 5 cm, twelve ultrasonic exciters 2.4.1 for transverse ultrasonic waves 2.4.2T which are arranged one behind the other, as viewed in the flow direction 2.5.1, at the distance of 4 cm each. FIG. 32*a* illustrates this arrangement on the basis of the cross-cut along the cutting line MN. Also in this case, the suspended matter 2.3 accumulated in the pressure nodes 2.4.4 and were agglomerated and aggregated in the further course, so that the fluid 2.2.1 with particles 2.3.4 resulted, which were separated by the filter arrangement 3 (smallest filterable particle size 1.5 μm), 3*b* (smallest filterable particle size 800 nm) and 3*c* (smallest filterable particle size 400 nm) with an efficiency of 99.999%. This filter system 1 was also excellently suited for the cleaning of particularly contaminated air 2.2; 2.3.

FIG. 33

Self-Sufficient Fresh Air Tree 19

For reasons of weight, the fresh air tree 19 consisted essentially of anodized aluminum and had the height of 5.5 m from the surface of the ground 19.8. The largest disc 19.5.1, which was slightly inclined towards the ground 19.8 encircled the hollow support tube 19.7 ("trunk"), was colored leaf-green and had a surrounding leaf-green drip edge 19.2 and a diameter of 2 m. The additional leaf-green colored discs 19.5.1 with a circumferential leaf-green drip edge 19.2 had any desired smaller diameters.

The trunk 19.7 of the clear span of 30 cm had a dark brown paint with a bark structure and was anchored on length of 2 m in the area 19.7.1 in the ground 19.8. After trunk height of 2.5 m, the outlet area 19.5 for the clean air 2.2 was fixed with a precisely fitting plug-in fastening 19.6. The outlet area 19.5 had six discs 19.5.1 arranged one above the other, between which the cleaned air 2.2.2 emerged from vertical slots.

The filter system 1 with ultrasonic exciters 2.4.1 and standing ultrasonic waves 2.4.2 as well as with filters 3*b* (smallest filterable particle size, 400 nm) and 3*a* (smallest filterable particle size 1 μm) was fixed in an exchangeable manner on the outlet area 19.5 (the device for changing the filters is not shown). For the sake of appearance, three discs 19 5.1 were also arranged one above the other in the area of the filter system 1.

The intake area 19.4 for the air 2.2 with the suspended matter 2.3 was located above the filter system 1. The air 2.2; 2.3 was sucked-through vertical slots protected by mosquito nets as suction openings with the help of a fan 7.4 operated by an electric motor.

Above the intake area 19.4, a disk-shaped, leaf-green colored cover 19.1, on which a photovoltaic system 14.4 supplying a power pack 14.18 with electricity, was attached.

In order to reinforce the natural impression of the fresh air tree 19, dark brown branch structures could be painted or embossed into the discs.

The self-sufficient fresh air tree was ideally suited to be set up in busy squares and along, busy roads in order to efficiently supply the area with purified air 2.2.2.

FIG. 34

Plant Pot as an Air Purifier

The plant pot 20 comprised a pot 20.2 made of plastic, in which a plant 20.1 with tubers 20.1.1 and roots 20.1.2 grew in the plant soil 20.3. The part 20.2 had a root-permeable base, through which the root system 20.1.2 emerged into a cavity as the flow channel 2.4. The pot 20.2 was stored in a plastic cache pot or planter 20.5 with the aid of support pins 20.4. Thereby, the support pins 20.4.1 with a semicircular cross-section were attached to the inside of the planter 20.5, wherein the corresponding support pins 20.4.2 with a circular cross-section which were mounted on the outside of the pot 20.2 were engaged. With this arrangement, a circumferential air duct was formed between the pot 20.2 and the inside of the planter 20.5, through which air duct 20.6 contaminated air 2.2; 2.3 was sucked in. The air duct 20.6 contained several ultrasonic exciters 2.4.1, which were fastened by brackets 20.5.1 opposite to one another and between which horizontal, standing ultrasonic waves 2.4.2 with at least two wave nodes 2.4.4 were formed. The resulting fluid 2.2.1 was sucked through a biochar filter or VOC filter 20.7 and freed from volatile organic compounds. Below the biochar filter 20.7, a horizontally mounted inlet pipe 2.5.2 was located which led to a battery-operated fan as a conveyor device 2.5, which sucked-in the fluid 2.2.1 and conveyed it to filter 3 with the smallest filterable particle size of 400 nm. Behind the filter 3, the cleaned air 2.2.2 emerged through the outlet pipe into the environment.

The plant pots 20 could be varied widely in terms of their sizes, their colors and their plants 20.1 and could thus be adapted to the spatial and decorative conditions in an excellent manner. In addition, plants 20.1 could be used that were able to absorb pollutants from the air and to release larger amounts of oxygen into the environment. The overall result was a "green" cleaning of the air in the room.

FIG. 35

Plant Pot as an Air Purifier

The plant pot 20 according to FIG. 35 differed from the plant pot according to FIG. 34 in that a horizontal filter system 1 was attached below the root-permeable base 20.2.1 in the cavity formed by the planter 20.5, and the pot 20.2, whereby the air 2.2; 2.3 was sucked in on the one hand through the air duct 20.6 and on the other hand through an opening 20.5.2 in the planter 20.5 and through a biochar filter 2.7 into the horizontal filter system 1 with the help of a ventilator as a conveyor device 2.5. The particle size in the pre-cleaned airstream 2.2; 2.3 was increased to 600 mm to 1.5 μm, after which the particles 2.3.4 were separated by the filter 3 with the smallest filterable particle size of 400 nm with an efficiency of >99.9 percent. The filtered air 2.2.2 was released into the environment via the outlet pipe 3.10.

The plant pots 20 according to FIG. 35 had the same advantages as the plant pots 20 according to FIG. 34.

The invention claimed is:

1. A filtration method without using a reflector, comprising:

(I) conveying fluids containing particles having a particle size of from 400 μm to ≤500 μm into and through a flow pipe and/or a wall-free flow area through a flow channel with a volume flow of $10^{-2}$ mL/sec to $10^5$ mL/sec;

(II) generating a standing acoustic ultrasonic field having an energy input into the flow channel of 0.25 W to 1 KW by means of ultrasonic waves of the frequency of 20 KHz to 800 MHz in the flowing fluids, whereby in the case of the wall-free flow area, the standing acoustic ultrasonic field is generated by at least two pairs of mutually associated and mutually opposing exciters of ultrasonic waves, wherein the imaginary connecting lines between the respective pairs intersect at an angle of 90°, in the case of the flow pipe, the standing acoustic ultrasonic field is generated by at least two pairs of mutually associated and mutually opposing exciters of ultrasonic waves, which pairs are arranged on the outside and/or on the inside and/or in the respective closed wall itself so that the imaginary connecting lines between the respective pairs intersect at an angle of 90°, (III) monitoring, modulating, and stabilizing the standing acoustic ultrasonic field by means of a feedback loop;

(IV) (a) conveying the fluids with a volume flow of $10^{-2}$ mL/sec to $10^5$ mL/sec in a conveying direction into and through the flow pipe and/or into and through the wall free flow area and through a fluid connection of the flow pipe and/or of the wall-free flow area to a filter having a smallest filterable particle size of 50 nm to 1000 nm and being permeated by the fluids, while (b) metering particles having a particle size of from 400 nm to ≤500 μm into the flow channel;

whereby the flowing fluids with particles of particle sizes of 400 pm to ≤50 nm having a specific particle number (N/Vt)≤20%; and/or with particles of particle sizes of ≥200 nm to ≤400 nm having a specific particle number (N/Vt) ≤20%; and/or with particles of particle sizes of ≥50 nm to ≤200 nm having a specific particle number (NNt) ≥80%; and/or with the particles having a particle size of from 400 pm to ≤500 μm having a specific particle number (N/Vt) ≥80% are formed by aggregation and agglomeration of the particles having a particle size of 400 pm to ≤500 μm;

(V) separating the particles having a particle size of 400 nm to ≤500 μm from the flowing fluids by the filter, after which the filtrated fluids emerging from the filter have a total specific particle number (N/Vt) below the respective detection limit and/or up to 0.1%, (VI) (a) channeling the particles having a particle size of 400 nm to <500 μm out of the flow channel into a branch of the flow pipe or of the wall-free flow area, while (b) exposing the particles to shock waves or standing longitudinal waves; and (VII) filtering the particles by means of a further filter, wherein N is particle number, V is volume in cubic meters, t is time in hours, and wherein the percentages given above are each based on the respective specific starter numbers (N/Vt) of the respective particles being 100%.

2. The filtration method according to claim 1, wherein the fluids containing particles include organic, inorganic and/or biogenic, gaseous, gel-like, liquid and/or solid particles with a particle size of 400 pm to ≤500 μm and/or of other molecularly dispersed noxae from liquid, gel-like and/or gaseous fluids and/or for their chemical conversion in these fluids;

wherein the fluids are selected from the group consisting of air, industrial gases, raw gases, medical gases, exhaust gases, water, waste water, organic solvents, solutions, edible oils, lubricating oils, gear oils, crude oils, foods, coolants, dispersions, suspensions and/or emulsions;

wherein the particles are selected from the group consisting of finely divided turbid matter, liquid waste, fermentation residues, animal waste, slurry, slaughterhouse waste, liquid manure, excrement, kitchen waste, biowaste, radioactive and non-radioactive, organic, inorganic, organic-inorganic and biogenic particles, cigarette smoke, cigar smoke, electric cigarette smoke, fiber materials, biogas plant waste, surface coating agents, varnish residues, sewage sludge, effluents, paints, varnishes, sealing materials, polymer waste, macromolecules, acid aerosols, mercury vapors, gas bubbles formed by cavitation in fluids, cells, organelles, blood cells, viruses and microorganisms, prions, spores, pollen, seeds, insect eggs, parts of insects, flour dusts, fine dusts that occur in road traffic, shipping and air traffic, welding, soldering, mechanical abrasion, leaks in systems, renovation work, the demolition of buildings, woodworking, stone methoding, plastic methoding and metalworking, laser cutting and the surface and underground mining of coal, minerals and metals as well as in building fires, forest fires, peat fires, fires in pipelines, crude oil production systems, natural gas production systems, mines, coal seams and chemical systems, mechanical and chemical decomposition, explosions, volcanic eruptions, reactor accidents and sandstorms; and wherein the molecularly dispersed noxae are selected from the group consisting of partially halogenated and perhalogenated organic compounds, sulfur dioxide, sulfur trioxide sulfuric acid, hydrochloric acid, hydrocyanic acid, sulfur hexafluoride and other gaseous fluorides NOx nitrous gases, nitrous oxide, ammonia, amines, phosphines, phosgene, pseudohalogens, halogens, halogen oxides, peroxides, peroxide radicals, radioactive compounds and nuclides, oxygen radicals and ozone.

3. The filtration method according to claim 1, wherein the fluids containing particles are used for the coagulation of protein, for the production of blood plasma, for repressing of gels, for increasing the reaction rate of chemical reactions the destruction of microorganisms, the recycling as well as the cleaning, drying and/or cooling of room air, the recycling as well as the cleaning, drying and/or cooling of the air in air conditioning systems, fume cupboards, clean rooms, ultraclean rooms, personal locks and overpressure and vacuum chambers, the recycling as well as the for cleaning, drying and/or cooling of air, gases and liquids for human and veterinary use, the cleaning of cell cultures, the recycling as well as for the cleaning, drying and/or cooling of the atmosphere in manned spacecraft, the recycling and the purification, drying and/or cooling of the air in automobiles, trucks, buses, trains, ships, airplanes, animal barns and toilet facilities, the recycling and cleaning of exhaust gases from internal combustion engines, the cleaning of the atmosphere, the collection of gaseous, solid and liquid terrestrial samples, the collection of atmospheric samples up to and in the stratosphere, the collection of gaseous, solid and liquid planetary and atmospheric samples on planets with an atmosphere, radioactive decontamination, the extraction of liquid water from the terrestrial atmosphere, the protection of filter membranes, water filters and gas filters from particles, the dissolution and detachment of filter cake from filters and membranes as well as for the post-cleaning of exhaust gases from electric dust separators, venturi washers, optical separators, gas separators, gas washers, SCR catalysts, OCR catalysts and electrostats.

4. The filtration method according to claim 1, wherein the fluids containing particles are used for increasing the speed of chemical reactions, in and on dust protection curtains, in and on devices for clinical and extra-clinical intensive and respiratory care, in lower anesthesia devices in and on devices for converting ammonia and NOx int~ nitrogen, in and on devices for the ventilation of clean rooms, ultraclean rooms, personal locks, fume cupboards, negative and positive pressure chambers, in and on gas masks and breathing masks, in and on devices to protect against viruses, microorganisms, insect eggs and insect parts, in and on devices, to protect against smog, VOG, car exhaust fumes, dust, aerosols and combustion gases, in and on cigarettes, cigars and electric cigarettes, in and on vacuum cleaners, in and on suction systems of welding torches, laser cutters and grinding devices, in and on the exhaust systems of combustion motors, in and on devices for protection against welding spatter, welding mist, spray paint overspray and dust explosions, in and on ventilation systems of animal stalls and toilet facilities and in devices, apparatus and systems for removing fine dust and noxious substances in the event of mechanical abrasion, in the event of leaks in systems renovation work, in woodworking, in stone working as well as in garbage incineration, building fires, forest fires, peat fires, fires of pipelines, crude oil production plants, natural gas production plants, mines, coal seams and chemical plants, mechanical and chemical decomposition, explosions, volcanic eruptions, reactor accidents and sandstorms, in and on aircrafts, in and on remote-controlled robotic vehicles for collecting dust samples on earth and on other celestial bodies with atmospheres and for radioactive decontamination, in and on plants for extraction of water from the atmosphere, in and on systems with electrical dust collectors and electrostats, in and on electrical appliances, washing machines, tumble dryers, refrigerators, vertical freezers and chest freezers, PCs, laptops, notebooks, iPads and servers, in and on plant-based air purifiers as well in and on passively drifting or powered surface and underwater swimming devices for collecting microplastics in sea water, in lakes and rivers.

* * * * *